United States Patent
Roy et al.

(10) Patent No.: US 10,319,227 B2
(45) Date of Patent: Jun. 11, 2019

(54) ROADWAY WORK AREA SAFETY TRUCK

(71) Applicant: ROYAL TRUCK & EQUIPMENT, INC., Coopersburg, PA (US)

(72) Inventors: Robert H Roy, Emmaus, PA (US); Andrew Washburn, Coopersburg, PA (US); Joseph T Piggott, Easton, PA (US); Siddharth Balasubramanian, Bethlehem, PA (US)

(73) Assignee: Royal Truck & Equipment, Inc., Coopersburg, PA (US)

( * ) Notice: Subject to any disclaimer, the term of this patent is extended or adjusted under 35 U.S.C. 154(b) by 0 days.

(21) Appl. No.: 15/913,562

(22) Filed: Mar. 6, 2018

(65) Prior Publication Data

US 2018/0261088 A1 Sep. 13, 2018

Related U.S. Application Data

(63) Continuation-in-part of application No. 15/197,685, filed on Jun. 29, 2016, now abandoned.

(Continued)

(51) Int. Cl.
*E01F 9/70* (2016.01)
*G08G 1/01* (2006.01)
(Continued)

(52) U.S. Cl.
CPC ............... *G08G 1/09* (2013.01); *B60W 30/08* (2013.01); *E01F 9/662* (2016.02); *E01F 9/70* (2016.02);
(Continued)

(58) Field of Classification Search
CPC ......... E01F 15/148; E01F 15/086; E01F 9/70; H04N 7/188; G08G 1/09; G08G 1/08;
(Continued)

(56) References Cited

U.S. PATENT DOCUMENTS

| 3,157,267 A | 11/1964 | Asbury | 198/7 |
| 3,232,408 A | 2/1966 | Asbury | 198/7 |

(Continued)

FOREIGN PATENT DOCUMENTS

| WO | WO 94/16150 | 7/1994 | ............... E01F 9/01 |
| WO | WO 99/40554 | 8/1999 | |

(Continued)

*Primary Examiner* — Hoi C Lau
(74) *Attorney, Agent, or Firm* — David A. Burge

(57) ABSTRACT

A safety truck includes: an over-cab storage rack to store nested stacks of barrel-type safety barriers ("traffic delineators"); a man basket ("safety module") mounted within an inset formed in a flat bed of the safety truck along the left or right side thereof to provide a support platform below the flat bed to enable personnel to ergonomically place the barrel-type safety barriers on a roadway; a sign cage mounted to the flat bed to store components of warning signs; a display board that includes speed detection radar to detect a speed of a vehicle approaching the safety truck, at least one display device to display a message readable from behind the safety truck, and a camera to capture an image of the approaching vehicle; and/or a truck-mounted attenuator (TMA) connected to the rear of the safety truck to absorb kinetic energy of the approaching vehicle colliding with the TMA.

22 Claims, 48 Drawing Sheets

Related U.S. Application Data

(60) Provisional application No. 62/631,840, filed on Feb. 18, 2018, provisional application No. 62/638,818, filed on Mar. 5, 2018, provisional application No. 62/186,036, filed on Jun. 29, 2015.

(51) Int. Cl.
*G08G 1/04* (2006.01)
*E01F 15/14* (2006.01)
*B60W 30/08* (2012.01)
*G01S 7/04* (2006.01)
*G08G 1/09* (2006.01)
*G09F 27/00* (2006.01)
*G01S 13/92* (2006.01)
*G09F 21/04* (2006.01)
*G08G 1/017* (2006.01)
*G08G 1/08* (2006.01)
*E01F 9/662* (2016.01)
*B60W 50/14* (2012.01)
*G09F 9/33* (2006.01)

(52) U.S. Cl.
CPC .......... *E01F 15/148* (2013.01); *G01S 7/04* (2013.01); *G01S 13/92* (2013.01); *G08G 1/0129* (2013.01); *G08G 1/0175* (2013.01); *G08G 1/04* (2013.01); *G08G 1/08* (2013.01); *G09F 21/048* (2013.01); *G09F 27/004* (2013.01); *G09F 27/005* (2013.01); *B60W 2050/146* (2013.01); *B60W 2420/52* (2013.01); *B60W 2550/20* (2013.01); *G09F 9/33* (2013.01); *G09F 2027/001* (2013.01)

(58) Field of Classification Search
CPC ........... G08G 1/54; G08G 1/056; H04W 4/80; B60P 3/122; B60P 3/10; G09F 27/005; B60Q 1/503; B60Q 1/268; B60Q 1/50; B60Q 1/444
See application file for complete search history.

(56) References Cited

U.S. PATENT DOCUMENTS

| | | | |
|---|---|---|---|
| 3,733,096 A | 5/1973 | Kassbohrer | B60R 19/10 293/63 |
| 3,776,400 A | 12/1973 | Schwartz | B62D 33/08 214/38 |
| D229,784 S | 1/1974 | Carter | D29/2 |
| 3,788,268 A | 1/1974 | Hiatt et al. | 116/28 |
| 3,907,353 A | 9/1975 | Dinitz | B60R 21/14 293/81 |
| 3,952,690 A | 4/1976 | Rizzo et al. | E01F 9/01 116/63 |
| D243,073 S | 1/1977 | Kulp et al. | D10/109 |
| D243,075 S | 1/1977 | Kulp et al. | D10/109 |
| 4,008,915 A | 2/1977 | Walker | B60R 19/04 293/60 |
| 4,083,033 A | 4/1978 | Kulp et al. | E01F 9/00 340/114 |
| 4,190,275 A | 2/1980 | Mileti | B60R 19/04 293/102 |
| 4,190,276 A | 2/1980 | Hirano et al. | B60R 19/06 293/133 |
| 4,219,141 A | 8/1980 | Lovy | B60R 7/00 224/273 |
| 4,272,114 A | 6/1981 | Hirano et al. | B60R 19/04 293/133 |
| 4,319,778 A | 3/1982 | Leonard et al. | B60P 3/34 296/166 |
| 4,321,989 A | 3/1982 | Meinzer | F16F 7/12 188/377 |
| 4,597,706 A | 7/1986 | Michit | B65G 57/03 414/30 |
| 4,635,891 A | 1/1987 | Friton | B60R 19/02 293/1 |
| 4,635,981 A | 1/1987 | Friton | B60R 19/02 293/1 |
| 4,642,007 A | 2/1987 | Marshall et al. | B62D 23/00 410/78 |
| 4,658,941 A | 4/1987 | Gottwald et al. | F16F 7/12 188/377 |
| 4,674,431 A | 6/1987 | Cory | G08B 23/00 116/63 |
| 4,710,053 A | 12/1987 | Kulp et al. | E01F 9/00 404/9 |
| 4,711,481 A | 12/1987 | Krage et al. | B60R 19/34 293/133 |
| 4,747,515 A | 5/1988 | Kasher et al. | B65G 59/06 221/116 |
| 4,770,420 A | 9/1988 | Gottwald et al. | B60R 19/22 293/104 |
| 4,925,334 A | 5/1990 | Beard | E01F 9/10 404/9 |
| 4,973,190 A | 11/1990 | Erwin et al. | E01F 9/00 404/10 |
| 5,052,732 A | 10/1991 | Oplet et al. | B60R 19/26 293/102 |
| 5,054,648 A | 10/1991 | Luoma | B65G 65/18 221/185 |
| 5,199,755 A | 4/1993 | Gertz | B60R 19/04 293/120 |
| 5,201,599 A | 4/1993 | Kulp et al. | E01F 13/00 404/6 |
| 5,208,585 A * | 5/1993 | Sprague | E01F 15/086 116/63 T |
| 5,209,540 A | 5/1993 | Metler | B60P 3/42 296/3 |
| 5,213,464 A | 5/1993 | Nicholson et al. | B65G 59/06 414/440 |
| 5,231,393 A | 7/1993 | Strickland | G08G 1/01 340/936 |
| 5,234,280 A | 8/1993 | Cowan | E01F 9/00 404/6 |
| 5,244,334 A | 9/1993 | Akita et al. | B65G 67/02 414/502 |
| 5,248,129 A | 9/1993 | Gertz | B60R 19/34 256/13.1 |
| 5,403,112 A | 4/1995 | Carney, III | F01F 13/00 404/6 |
| 5,476,301 A | 12/1995 | Berkich | B60P 3/00 296/3 |
| 5,525,021 A | 6/1996 | Larguier | B60P 1/40 414/551 |
| 5,642,792 A | 7/1997 | June | F16F 7/12 188/377 |
| 5,697,657 A | 12/1997 | Unrath, Sr. | B60R 19/38 293/118 |
| 5,846,045 A | 12/1998 | Johnson et al. | B60R 9/00 414/462 |
| 5,868,520 A | 2/1999 | Kulp et al. | E01F 13/00 404/6 |
| 5,905,434 A * | 5/1999 | Steffan | B60Q 1/50 116/28 R |
| 5,947,452 A | 9/1999 | Albritton | B60R 19/34 256/13.1 |
| 6,019,542 A | 2/2000 | Bent et al. | E01F 13/02 404/6 |
| 6,024,341 A | 2/2000 | Gertz | A01K 3/00 256/13.1 |
| 6,056,498 A | 5/2000 | Velinsky et al. | E01F 9/01 414/555 |
| 6,092,959 A | 7/2000 | Leonhardt et al. | E01F 15/00 404/6 |
| 6,182,600 B1 | 2/2001 | Brown et al. | E01F 9/012 116/63 |
| 6,183,042 B1 | 2/2001 | Unrath | B60J 7/00 296/189 |

(56) References Cited

U.S. PATENT DOCUMENTS

| | | | |
|---|---|---|---|
| 6,183,942 B1 | 2/2001 | Kim et al. | G03F 7/42 430/331 |
| 6,203,079 B1 | 3/2001 | Breed | B60R 19/40 293/119 |
| 6,204,778 B1 | 3/2001 | Bergan et al. | G08G 1/01 340/936 |
| 6,244,637 B1 | 6/2001 | Leonhardt et al. | B60R 19/02 293/102 |
| 6,435,369 B1 | 8/2002 | Poursayadi | A24F 1/00 221/185 |
| D466,269 S | 11/2002 | Falland | D34/39 |
| 6,478,505 B1 | 11/2002 | Kulp et al. | E01F 15/00 404/6 |
| 6,481,920 B1 | 11/2002 | Leonhardt et al. | E01F 15/00 404/6 |
| 6,579,034 B1 | 6/2003 | Welch et al. | E01F 15/00 404/6 |
| 6,581,992 B1 | 6/2003 | Gertz | B60R 19/14 293/133 |
| D481,965 S | 11/2003 | Feit et al. | D10/113 |
| 6,668,989 B2 | 12/2003 | Reid et al. | F16F 7/12 188/377 |
| D486,089 S | 2/2004 | Mettler et al. | D10/109 |
| D487,365 S | 3/2004 | Bourne | D6/462 |
| 6,726,434 B2 | 4/2004 | Orthaus et al. | E01F 9/01 414/539 |
| 6,752,582 B2 | 6/2004 | Garcia | E01F 9/014 414/467 |
| 6,786,673 B2 | 9/2004 | Kulp et al. | E01F 15/00 404/6 |
| 6,809,656 B2 | 10/2004 | Mitchell et al. | G08G 1/02 340/936 |
| 6,866,284 B2 | 3/2005 | Carlson | B60R 19/38 280/474 |
| 6,905,282 B2 | 6/2005 | Leonhardt et al. | E01F 15/00 404/6 |
| 6,926,324 B1 | 8/2005 | Gertz | B60R 19/34 293/133 |
| 6,942,263 B2 | 9/2005 | Welch et al. | B60R 19/34 293/133 |
| 7,101,143 B2 | 9/2006 | Orthaus et al. | B65G 57/30 414/788.2 |
| 7,112,004 B2 | 9/2006 | Alberson et al. | E01F 15/00 404/6 |
| 7,243,964 B1 | 7/2007 | Gertz | B60R 19/18 293/133 |
| 7,341,397 B2 | 3/2008 | Murphy | 404/6 |
| 7,354,180 B2 | 4/2008 | Sawhney et al. | G09F 19/22 362/388 |
| 7,410,321 B1 | 8/2008 | Schiefferly et al. | B60R 21/00 404/6 |
| 7,431,532 B2 | 10/2008 | Lidster | E01F 9/01 404/6 |
| 7,438,337 B1 | 10/2008 | Gertz | B60R 19/18 293/133 |
| 7,441,817 B1 | 10/2008 | Unrath, Sr. | B60R 19/38 293/118 |
| 7,581,918 B2 | 9/2009 | Jordan | B60P 1/00 414/503 |
| 7,690,687 B2 | 4/2010 | Reid et al. | B62D 7/22 280/784 |
| 7,708,324 B2 | 5/2010 | Murray et al. | B60R 19/26 293/133 |
| 7,737,912 B2 | 6/2010 | Graef et al. | G09G 5/00 345/1.1 |
| 7,766,403 B2 | 8/2010 | Alvarsson et al. | B60R 19/34 293/133 |
| 7,802,829 B2 | 9/2010 | Maus | B60R 19/24 293/133 |
| 7,871,220 B2 | 1/2011 | Albriton | E01F 15/00 404/6 |
| 7,874,572 B2 | 1/2011 | Buehler et al. | A01B 59/041 280/474 |
| 7,931,317 B2 | 4/2011 | Kern | B60R 19/18 293/118 |
| 8,074,761 B2 | 12/2011 | LaTurner et al. | B60R 19/34 180/274 |
| 8,136,281 B2 | 3/2012 | MacDougall | G09F 21/104 40/590 |
| 8,246,068 B2 | 8/2012 | MacDougall | B60D 1/54 280/491.1 |
| 8,246,091 B1 | 8/2012 | Jayasuriya et al. | B60R 19/26 293/133 |
| 8,267,445 B1 | 9/2012 | Jayasuriya et al. | B60R 19/26 293/133 |
| 8,322,945 B2 | 12/2012 | Griebeweg et al. | E01F 15/00 404/6 |
| 8,500,360 B1 | 8/2013 | Jones | E01F 9/013 404/9 |
| 8,657,525 B2 | 2/2014 | Groeneweg et al. | E01F 15/10 404/6 |
| 8,740,241 B2 | 6/2014 | Groeneweg | E01F 13/00 280/423.1 |
| 8,757,640 B2 | 6/2014 | Schaufelberger et al. | B62B 7/12 280/30 |
| 8,794,172 B2 | 8/2014 | Bromm et al. | E01F 9/012 116/63 P |
| 8,845,229 B2 | 9/2014 | Groeneweg et al. | E01F 15/10 280/1 |
| 8,870,251 B1 | 10/2014 | Kulp et al. | B60R 19/56 293/133 |
| 9,056,572 B2 | 6/2015 | Hemphill et al. | B60P 1/02 414/508 |
| 9,273,437 B2 | 3/2016 | Groeneweg et al. | E01F 15/14 280/411.1 |
| 9,365,987 B2 | 6/2016 | Christiansen et al. | E01F 9/0126 180/6.2 |
| 9,339,845 B2 | 7/2016 | Buehler et al. | E01F 15/14 293/118 |
| 9,481,969 B2 | 11/2016 | Groeneweg et al. | E01F 15/00 404/6 |
| 9,489,841 B1 * | 11/2016 | Huggins | G08G 1/056 |
| 9,566,923 B2 | 2/2017 | Wylezinski et al. | B60R 19/24 291/118 |
| 9,732,482 B2 | 8/2017 | Groeneweg | E01F 13/022 280/423.1 |
| 9,739,328 B1 | 8/2017 | Degroot et al. | F16F 7/123 404/6 |
| 10,112,528 B1 * | 10/2018 | Mazuir | B60Q 1/444 |
| 2002/0005826 A1 | 1/2002 | Pederson | G09G 3/32 345/82 |
| 2003/0147733 A1 | 8/2003 | Shimomato | B60P 1/00 414/501 |
| 2004/0120760 A1 | 6/2004 | Carlsson | E01F 13/00 404/6 |
| 2004/0155811 A1 | 8/2004 | Albero et al. | G01S 13/93 342/70 |
| 2005/0046207 A1 | 3/2005 | Rossmann | B60R 19/34 |
| 2005/0072331 A1 | 4/2005 | Moses | B61C 11/00 105/392.5 |
| 2006/0012487 A1 * | 1/2006 | Gibson | G08B 5/006 340/815.45 |
| 2007/0071584 A1 | 3/2007 | Beckstead et al. | B60P 1/04 414/467 |
| 2007/0183874 A1 | 8/2007 | Garcia | B60P 1/00 414/437 |
| 2007/0216521 A1 | 9/2007 | Guensler et al. | B60Q 1/00 340/439 |
| 2009/0097914 A1 | 4/2009 | Flynn | E01F 9/012 |
| 2009/0166998 A1 * | 7/2009 | Groeneweg | E01F 15/148 280/408 |
| 2009/0256697 A1 * | 10/2009 | Tallinger | B60Q 1/2611 340/472 |
| 2010/0109287 A1 | 5/2010 | MacDougall | B62D 63/06 280/491.1 |

(56) References Cited

U.S. PATENT DOCUMENTS

| | | | | |
|---|---|---|---|---|
| 2011/0012751 | A1 | 1/2011 | Jones | G08C 19/00 |
| | | | | 340/825.69 |
| 2011/0163517 | A1* | 7/2011 | Groeneweg | B60P 3/00 |
| | | | | 280/423.1 |
| 2012/0319413 | A1 | 12/2012 | Andres et al. | B60R 19/34 |
| | | | | 293/133 |
| 2014/0111323 | A1* | 4/2014 | Strout | B60Q 1/268 |
| | | | | 340/425.5 |
| 2015/0225913 | A1* | 8/2015 | Groeneweg | E01F 15/148 |
| | | | | 212/299 |
| 2016/0378482 | A1 | 12/2016 | Roy | G08G 1/09 |
| 2016/0379492 | A1* | 12/2016 | Roy | G08G 1/09 |
| | | | | 340/907 |
| 2017/0154524 | A1 | 6/2017 | Beaulieu | G08G 1/07 |
| 2017/0210284 | A1 | 7/2017 | Donan | B60Q 1/46 |
| 2017/0246988 | A1* | 8/2017 | Ihedinmah | B60Q 1/503 |
| 2017/0287233 | A1* | 10/2017 | Nix | G07C 5/008 |
| 2018/0001817 | A1* | 1/2018 | Adams | B60Q 9/00 |
| 2018/0194352 | A1* | 7/2018 | Avedisov | B60W 30/16 |
| 2018/0261088 | A1* | 9/2018 | Roy | G09F 27/005 |
| 2019/0048543 | A1* | 2/2019 | Roy | E01F 9/70 |

FOREIGN PATENT DOCUMENTS

| | | | | |
|---|---|---|---|---|
| WO | WO 2005/010279 | 2/2005 | | |
| WO | WO 2013/172713 | 11/2013 | | E01F 9/014 |
| WO | WO 2017/079803 | 5/2017 | | G05D 1/02 |

* cited by examiner

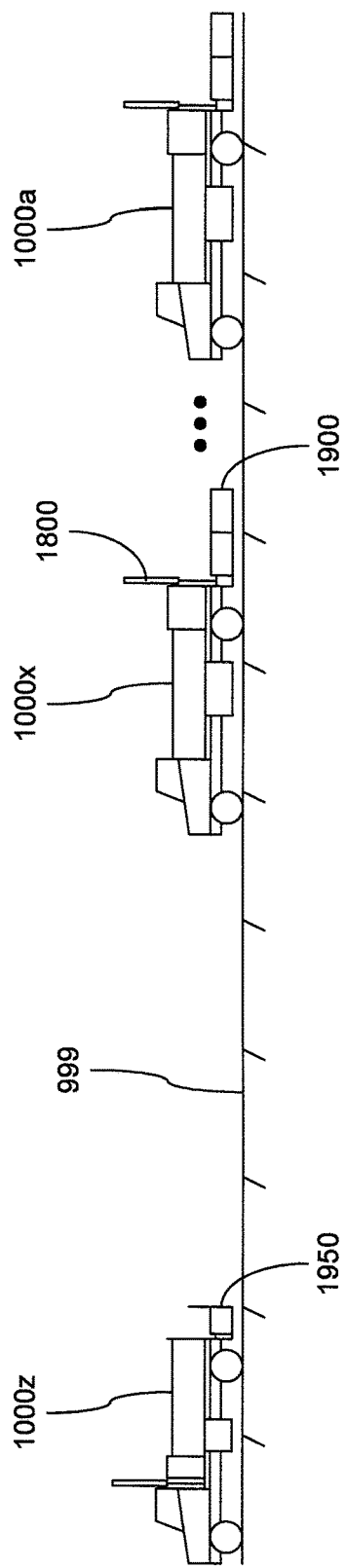

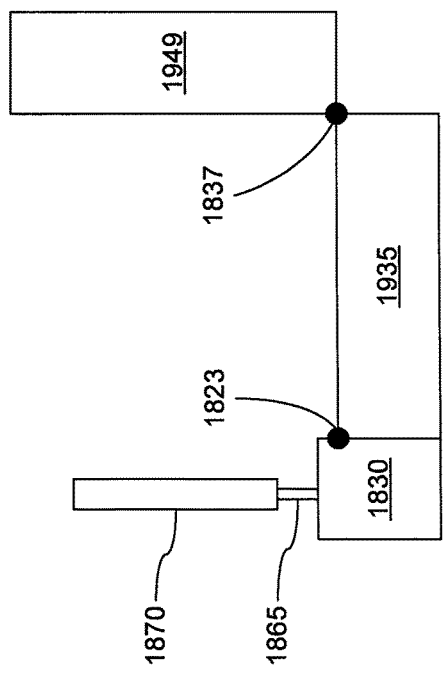
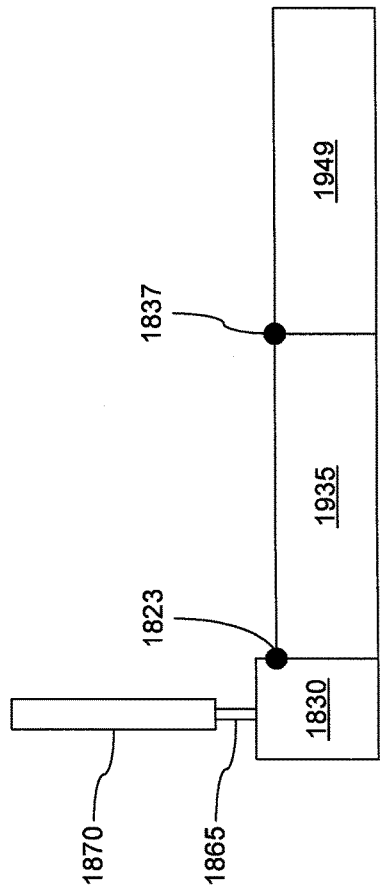
FIG. 10D
FIG. 10E

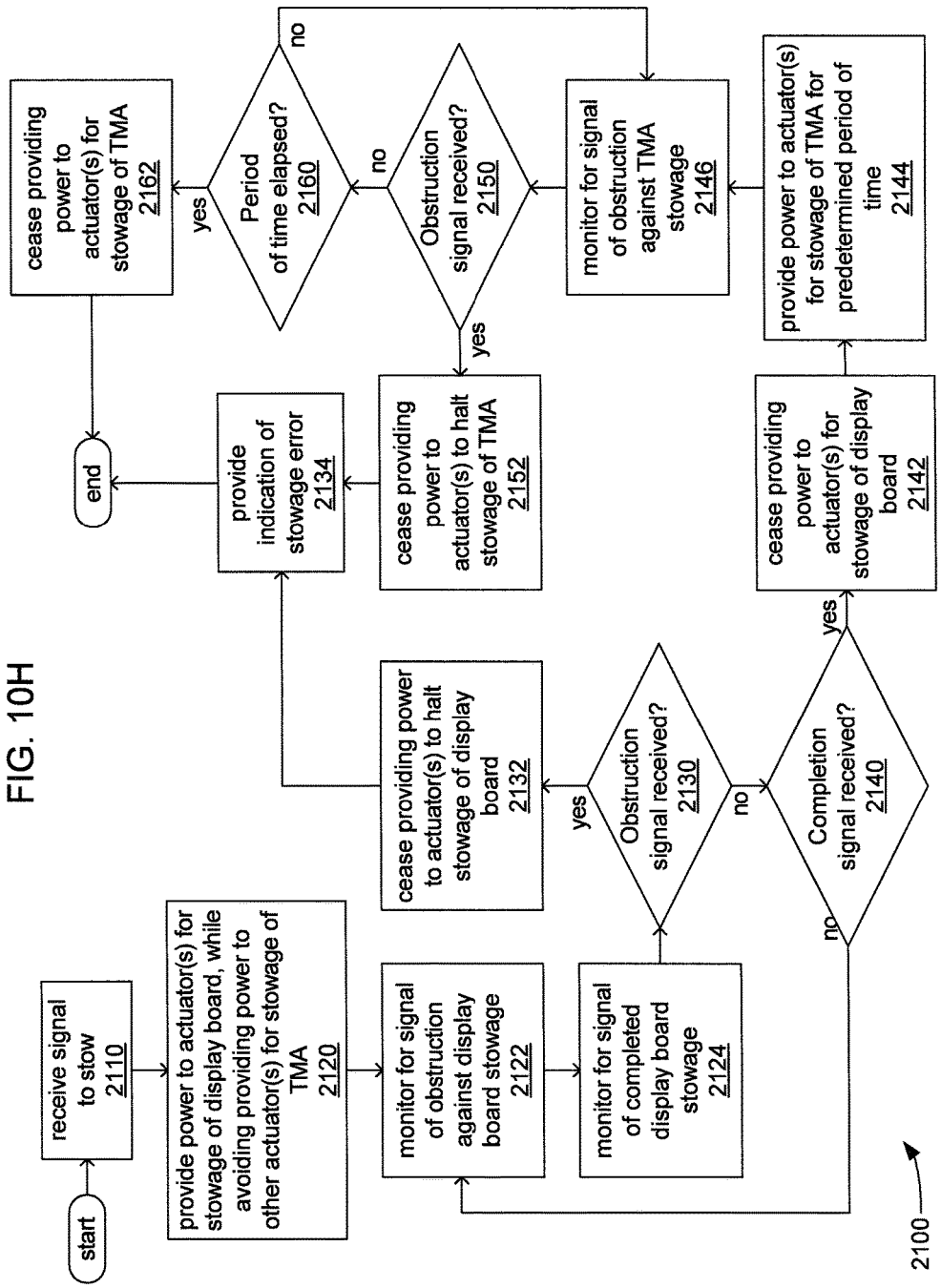

ROADWAY WORK AREA SAFETY TRUCK

REFERENCE TO RELATED APPLICATIONS

This Utility patent application claims the benefit of the filing date of Provisional Application Ser. No. 62/631,840 filed Feb. 18, 2018 by Robert H. Roy, Andrew C. Washburn, Joseph T. Piggott and Siddharth Balasubramanian, and entitled TRUCK MOUNTABLE OVER-CAB RACK FOR TRANSPORTING NESTED STACKS OF BARREL-TYPE TRAFFIC DELINEATORS, the disclosure of which is incorporated herein by reference in its entirety. This Utility patent application also claims the benefit of the filing date of Provisional Application Ser. No. 62/638,818 filed Mar. 5, 2018 by Robert H. Roy, Andrew C. Washburn, Joseph T. Piggott and Siddharth Balasubramanian, and entitled TRUCK MODULE FOR ASSISTING WORKMEN TO PLACE AND RETRIEVE TRAFFIC DELINEATORS ALONGSIDE HIGHWAY WORK SITES, the disclosure of which is also incorporated herein by reference in its entirety. This Utility patent application is additionally a continuation-in-part of, and claims the benefit of the filing date of, Utility patent application Ser. No. 15/197,685 filed Jun. 29, 2016 by Robert H. Roy, and entitled ALL IN ONE SAFETY DISPLAY, which is a non-provisional of, and claims the benefit of the filing date of, Provisional Application Ser. No. 62/186,036 filed Jun. 29, 2015 by Robert H. Roy, and entitled ALL IN ONE SAFETY DISPLAY, the disclosures of each of which are also incorporated herein by reference in their respective entireties.

BACKGROUND

The present invention relates to the field of occupational and traffic safety, specifically for the transportation and construction industries. More specifically, the present invention relates to safety at roadway work sites where repair and/or new construction work is undertaken in close proximity to vehicular traffic.

Where repair and/or construction work is performed on or adjacent a portion of a busy roadway, it may be deemed preferable from a safety standpoint to simply close that portion of roadway to entirely eliminate the possibility of accidents occurring that involve roadway vehicles, construction vehicles, construction machinery and/or construction workers. Unfortunately, closing a portion of roadway is often deemed to be impractical and/or impossible—with the result that construction work must be undertaken on or adjacent to a portion of roadway where there is still vehicular traffic. As is well known to those skilled in the art, this opens the door to instances in which vehicular traffic may collide with construction vehicles, construction equipment and/or construction personnel as a result of impatient, distracted, sleep-deprived, intoxicated and/or otherwise impaired motorists who drive near to and alongside roadway work sites.

Various prior art measures have been undertaken to at least mitigate the resulting dangers of injury and death to construction workers, including and not limited to, scheduling repair and/or construction work during nights or during other hours when there is reduced vehicular traffic, reduced work site speed limits accompanied by increased fines for violators, brightly colored work zone warning signage and/or flashing warning lights, brightly colored and/or heavy concrete safety barriers, positioning of police vehicles nearby with their lights flashing, etc. Additionally, advisory signs are often positioned well ahead of the times when repair and/or construction work is to begin to provide advance notice to motorists who regularly travel through places where the repair and/or construction work is to be performed. Such measures are typically intended to encourage motorists to slow down as they drive through a portion of roadway at which a work site is located, and/or to watch more carefully and to be more prepared to respond to collision dangers that may arise. Unfortunately, despite such efforts, numerous incidents still occur each year in which impatient, inattentive and/or impaired motorists somehow do not see or respond appropriately to such warnings, thereby leading to vehicles barreling into roadway work sites. Although such measures as the placement of heavy concrete safety barriers are typically intended to provide some physical protection to construction workers from being hit by such a vehicle in such situations, the kinetic energy of a vehicle traveling on a roadway may very well overcome such protective efforts, especially on highways where vehicles typically travel at higher speeds.

Further, depending on the size of a roadway work site and/or other aspects of the repair and/or construction work to be done, the task of setting up warning signage and/or safety barriers can take considerable time and/or manpower away from the actual performance of the repair and/or construction work itself. By way of example, on a highway where motorists routinely drive vehicles at relatively high speeds, warning signage and/or safety barriers may need to be installed beginning as far as a mile or two ahead of the actual roadway work site. Providing such advance notice to motorists may require the transport and placement of relatively large quantities of warning signs, cones, barrels and/or concrete safety barriers, thereby requiring many vehicles in addition to considerable manpower.

It will be noted that in the above-referenced Provisional Application Ser. No. 62/638,818 filed Mar. 5, 2018 (which Provisional Application has already been incorporated herein by reference), the terms "cones" and "barrels" which are also mentioned in the present application (for example in the sentence just above) are referred to as "traffic delineators."

Additionally, such extensive safety preparations may prove to be ill-suited to situations in which the repair and/or construction work that is performed is of a constantly and/or frequently moving or "rolling" nature. By way of example, the filling of potholes with asphalt, the replacement of lane-dividing reflectors built into roadway surfaces, and the painting of roadway lines often require a relatively small crew of construction personnel who move relatively slowly, but often continuously, along consecutive miles of roadway with only one or two construction vehicles as they perform their work. The initial placement and frequent subsequent movement of large sets of warning signs and/or safety barriers may actually entail more work requiring more resources than the repair and/or construction work that is being performed.

As an alternative to warning signage set up at fixed positions and/or the use of concrete safety barriers to provide protection, at least where the construction work that is performed is of such a rolling nature, trucks have sometimes been used that carry warning signage and/or a truck-mounted attenuator (TMA). The attachment of warning signage directly onto a truck enables far larger warning signs to be made more mobile, such that signs with larger display surfaces, and/or larger and more visible arrays of warning lights to be used. In particular, with regard to warning lights, truck mounted warning signs often have easier access to larger amounts of electric power to support the use of larger and/or brighter lighting components.

As is explained the referenced provisional applications, the terms "crash truck" and "safety truck" are often used interchangeably to refer to a relatively massive truck that has a TMA connected to a rear end region of the truck so as to extend rearwardly from the truck. The carrying of a TMA by a truck may allow a truck to serve as what may be referred to as a "crash truck" or "safety truck" in which that truck provides a more easily movable form of larger and heavier safety barrier than a concrete safety barrier thereby providing greater protection to construction personnel in situations where distracted, impatient and/or impaired motorists may still drive (i.e., "crash") their cars or other vehicles into roadway work sites in spite of the presence of sufficient warning signage.

In this document, (and, as is familiar to those skilled in the arty, the abbreviation "TMA" will be understood to refer to an elongate structure that is typically mounted onto (or is otherwise "connected to") the back (i.e., "a rear end region") of a relatively massive roadway vehicle such as a "crash truck" or a "safety truck" so as to extend farther rearwardly from the truck to which the TMA is attached to thereby become the first component of the truck to which the TMA is attached that is physically encountered by a colliding roadway vehicle. TMAs, so positioned, are intended to become THE component of a so-called "crash truck" or "safety truck" that absorbs much, if not all, of the kinetic energy exerted on the truck as a result of an impact from a colliding vehicle. In essence, a TMA provides the truck with a sacrificial "crumple zone" that is intended to incur at least the majority of the damage that would otherwise be inflicted on the truck, itself, as a result of being collided with by another vehicle traveling at typical roadway speeds.

As will also be familiar to those skilled in the art, some of the best examples of TMAs currently available are designed to be crumpled in a controlled manner that spreads out the time during which an impact occurs to thereby reduce the magnitude of the forces exerted on a safety truck at any given moment in an effort to minimize the damage that is done to the truck. Also, such spreading out of the duration of the impact may aid in saving the lives of persons in the colliding vehicle. The most effective TMAs can reduce the severity of a collision occurring at highway speeds to a level somewhat on par with a collision occurring at speeds typically associated with residential roads.

Unfortunately, in spite of the use of such well-designed TMAs, the amount of kinetic energy imparted to a safety truck during an impact by a vehicle traveling at highway speeds may still cause the safety truck to be moved from its original position by a considerable distance. Thus, the provision of a safety truck with warning signage and a TMA does not represent a full and complete solution to the challenge of making safer the performance of repair and/or construction work at a roadway work site.

SUMMARY

The present invention addresses such needs and deficiencies as are explained above by providing a flexibly configurable safety truck, as well as systems and methods for employing one or more of such safety trucks to enhance the safety of roadway work sites. More specifically, a safety truck may incorporate various features to enable its use in performing any of a variety of safety enhancing functions in preparing, protecting and/or clearing roadway work sites. A plurality of such safety trucks arranged one after another, in series, (for example as shown in FIG. 1G hereof) may be employed to enhance the safety of either stationary roadway work sites or roadway work sites that are of a rolling nature wherein construction work is performed along a relatively lengthy stretch of roadway.

A safety truck embodying a practice of the present invention may provide one or more so-called "man baskets" that each provide a lowered support surface atop which construction personnel may stand to more ergonomically place or collect warning signage and/or safety barriers, sign cage(s) into which components of warning signage may be stowed, and/or an over-the-cab rack for the storage of barrel-type safety barriers that may be employed as traffic delineators.

A safety truck embodying a practice of the present invention may incorporate a system of cameras, speed detection radar, reprogrammable lighted signage, various sensors and/or a digital recording system to record various conditions around a roadway work site, including conditions leading up to and following a collision with the safety truck.

A safety truck embodying a practice of the present invention may also incorporate a wireless base station of a wireless communications system that enables construction personnel associated with the operation of the safety truck to wirelessly communicate with each other, and such wireless communications may also be recorded by the digital recording system as an aid to providing context to events that may be recorded by the digital recording system.

A safety truck embodying a practice of the present invention may incorporate one or more frame-mounted weights to increase the overall mass of the safety truck to an extent deemed desirable to increase its inertia against the kinetic energy imparted to the safety truck by a colliding vehicle.

It will be noted that in referenced Provisional Application Ser. No. 62/638,818 filed Mar. 5, 2018, what are referred to in the present application as "man baskets" (for example in the previous paragraph hereof) are alternatively referred to as "safety modules."

A safety truck embodying the present invention may also incorporate a plurality of mounting points to enable a wide variety of safety enhancing accessories, or combinations thereof, to be releasably attached to the safety truck as part of configuring the safety truck to address the differing safety needs and/or to perform differing safety functions at different roadway work sites. Among such accessories may be a rumble strip basket, a display board integrating reprogrammable signage along with speed detection radar and/or camera(s), a safety basket to also provide an area having a lowered floor level atop which construction personnel may stand to more ergonomically place or collect warning signage and/or safety barriers, and/or a TMA. Input from such a display board may be employed by a control system of such a safety truck to predict an impending collision and/or other impending danger to construction personnel, and may act to provide a warning to construction personnel. Moreover, a display board and TMA, or a display board and safety basket, may be combined to form a single safety enhancing accessory that automatically enforces one or more deployment requirements to aid in ensuring the correct usage of their safety features. The speed detection radar of a display board may be programmable to detect separate speeds of separate vehicles where each vehicle occupies a separate lane of a roadway.

A plurality of safety trucks, each equipped with a TMA, may be positioned end-to-end in series to use the mass of the trucks and TMAs to provide a plural-layer safety barrier to prevent the entry of a vehicle traveling at high speed into a roadway work site. Plural ones of such safety trucks may be capable of communicating wirelessly with each other to exchange information thereamong for recording and/or to enable wireless communications among their base stations to enable construction personnel associated with different ones of the plural safety trucks to communicate wirelessly with each other. Plural ones of such safety trucks may also cooperate to relay warning indications of collisions in progress, impending collisions, and/or other dangers to the safety of construction personnel.

BRIEF DESCRIPTION OF THE DRAWINGS

A fuller understanding of what is disclosed in the present application may be had by referring to the description and claims that follow, taken in conjunction with the accompanying drawings, wherein:

FIG. 1G is an elevational view of an embodiment of a set of plural safety trucks arranged in series and operated in a cooperative manner.

FIGS. 10B, 10C, 10D, 10E and 10F are simplified elevational views of the combination of the display board and the TMA of FIG. 10A that, taken together, depict a sequence of operations performed to transition between a stowed state and a deployed state.

FIG. 10H is a flowchart of an embodiment of operations performed to stow the combination of the display board and the TMA of FIG. 10A.

DETAILED DESCRIPTION

Figure 1A:
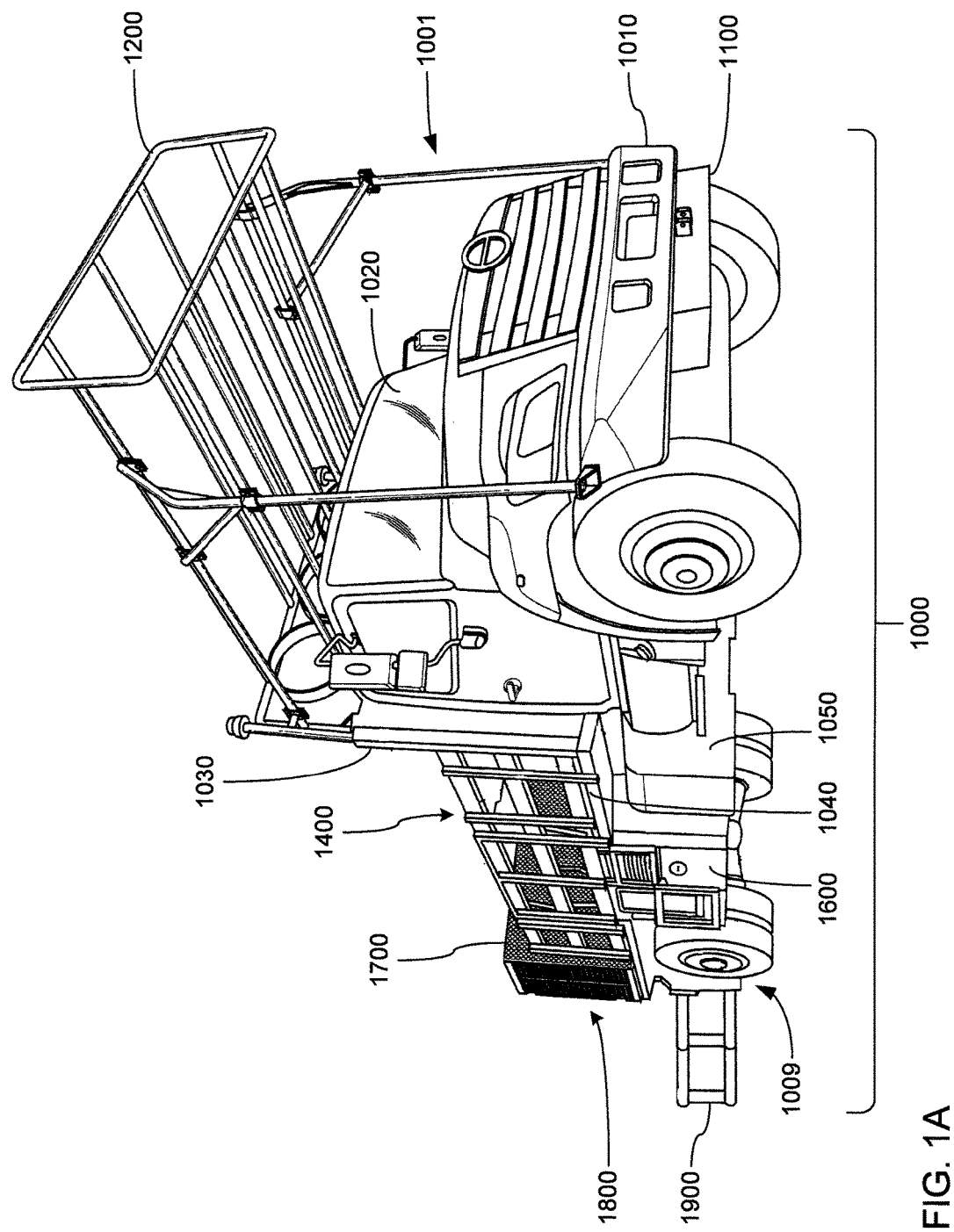
FIG. 1A is a perspective view, from the front and the right side, of a first example embodiment of a safety truck, showing a front-mounted hitch for a rumble strip basket, an over-cab barrel-type safety barrier storage rack, a portion of a flat bed incorporating at least one relatively wide man basket, a rear-mounted sign cage, and a TMA in a deployed state.
Figure 1B:
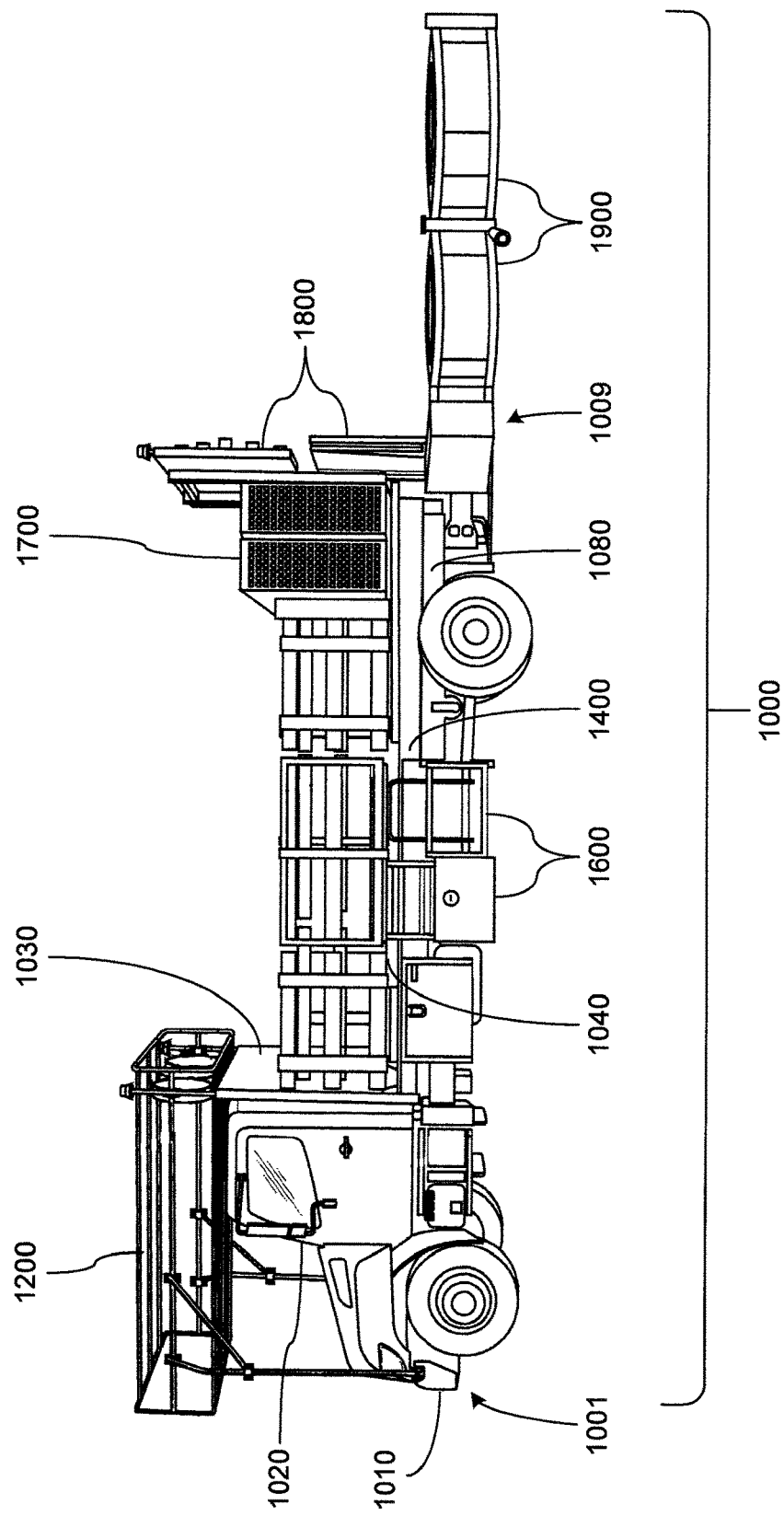
FIG. 1B is an elevational view of the safety truck of FIG. 1A additionally showing a display board in a deployed state.
Figure 1C:
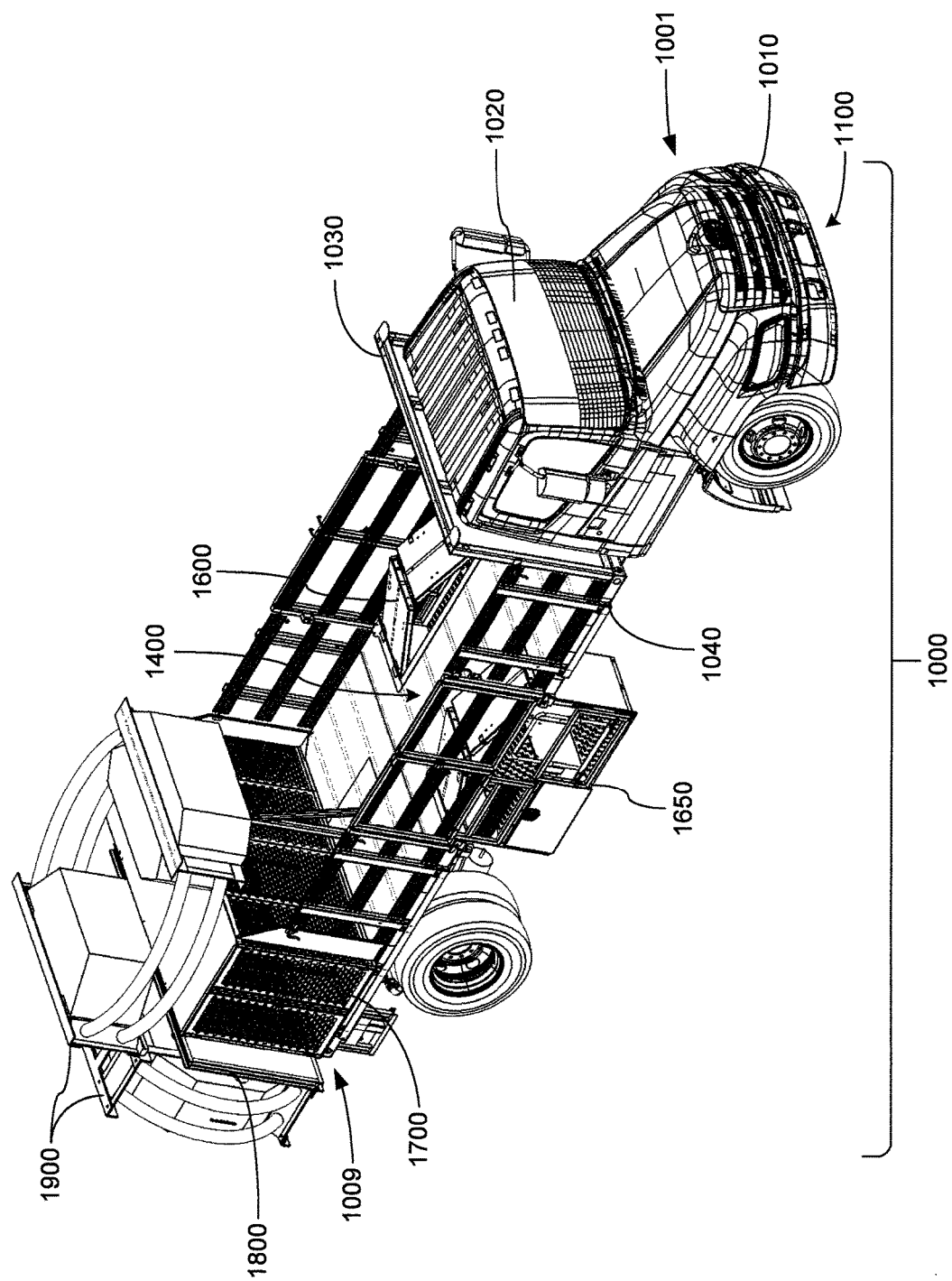
FIG. 1C is a perspective view, from above, the front and the right side, of a second example embodiment of a safety truck, showing a flat bed incorporating a pair of the relatively wide man baskets, the rear-mounted sign cage, and both the TMA and the display board in a stowed state.
Figure 1D:
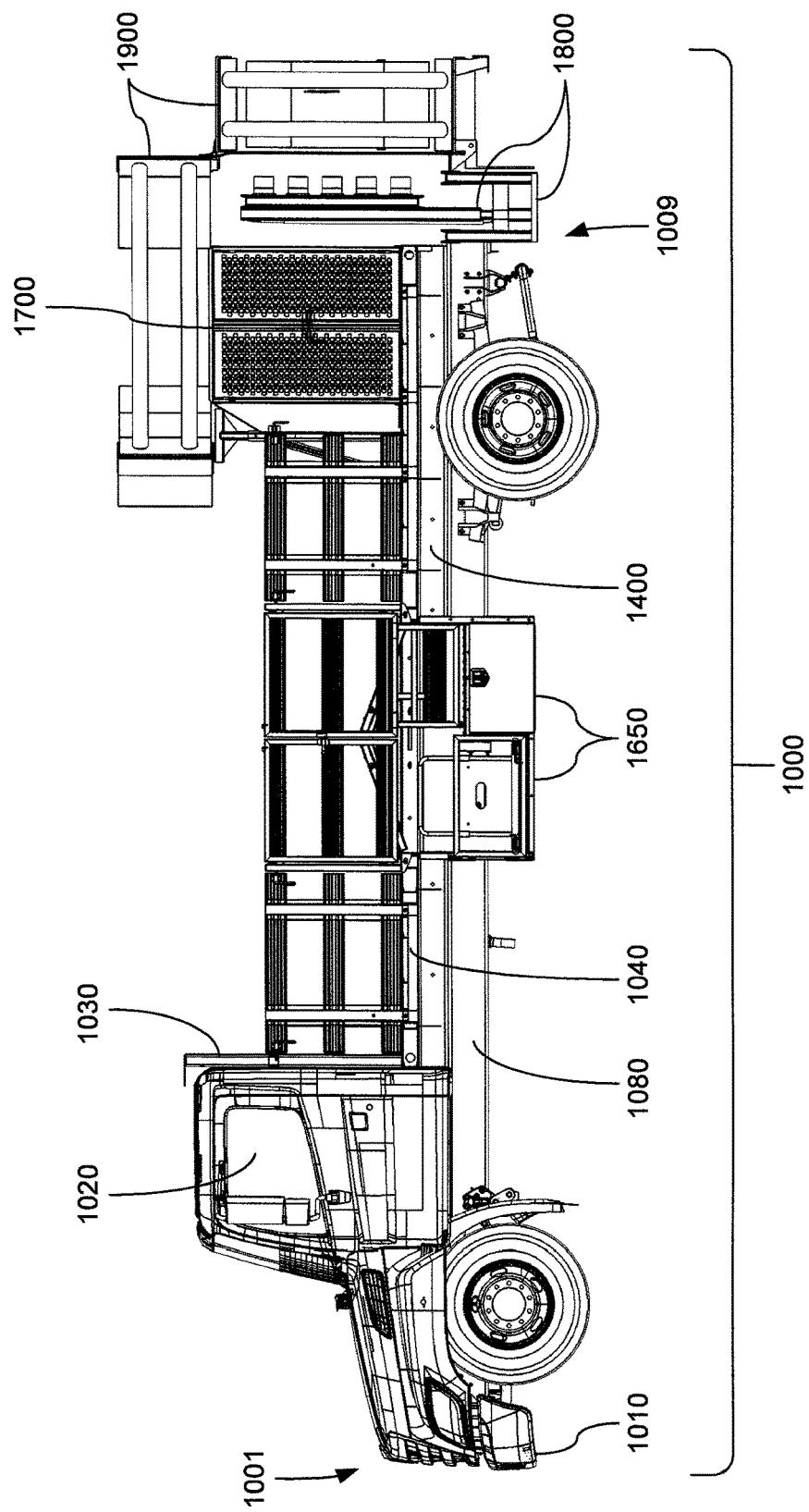
FIG. 1D is an elevational view of the safety truck of FIG. 1C.
Figure 1E:
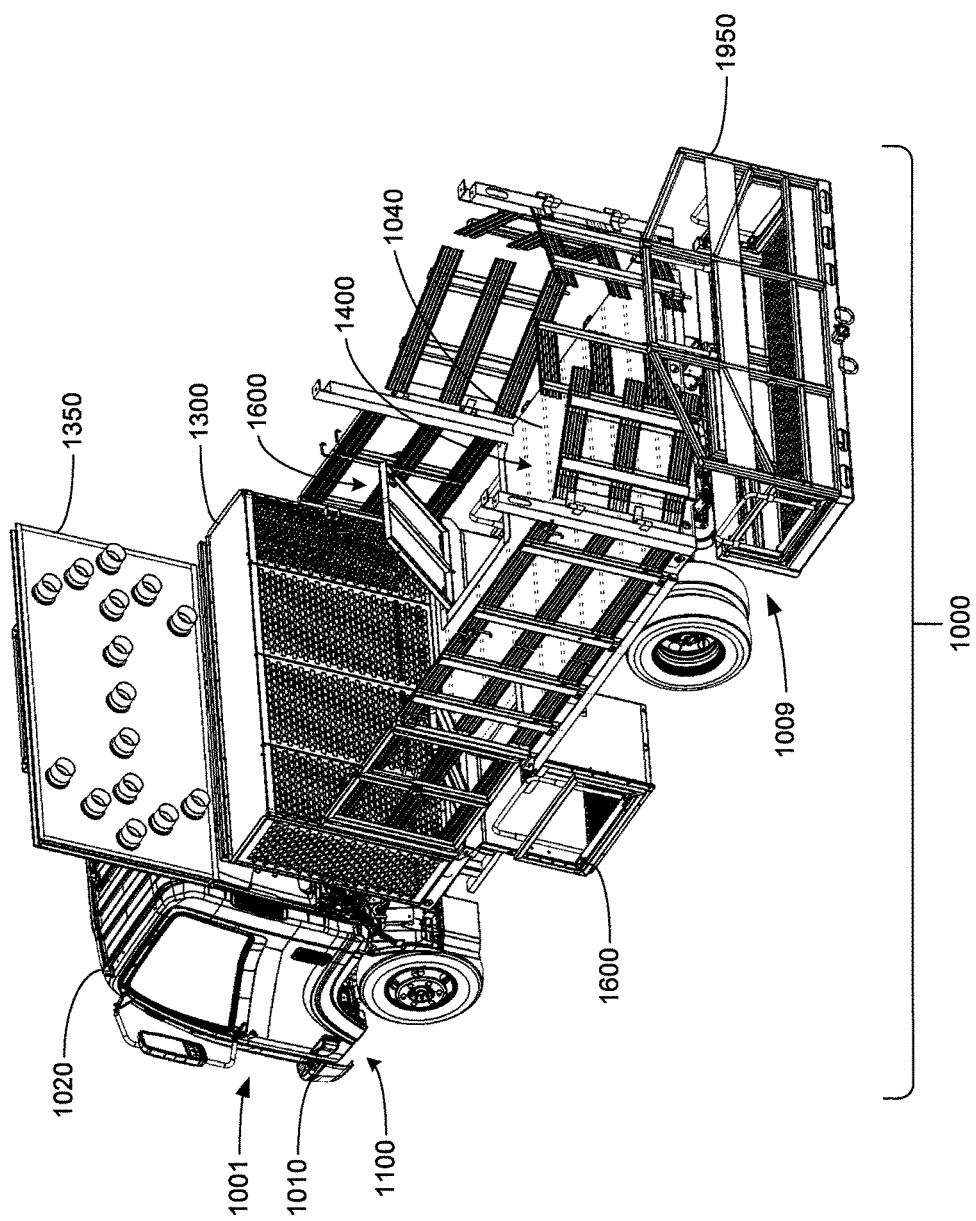
FIG. 1E is a perspective view, from above, the rear and left side, of a third example embodiment of a safety truck, showing an arrow board, a flat bed incorporating a pair of relatively narrow man baskets, a front-mounted sign cage, and a safety basket in place of the display board and TMA.
Figure 1F:
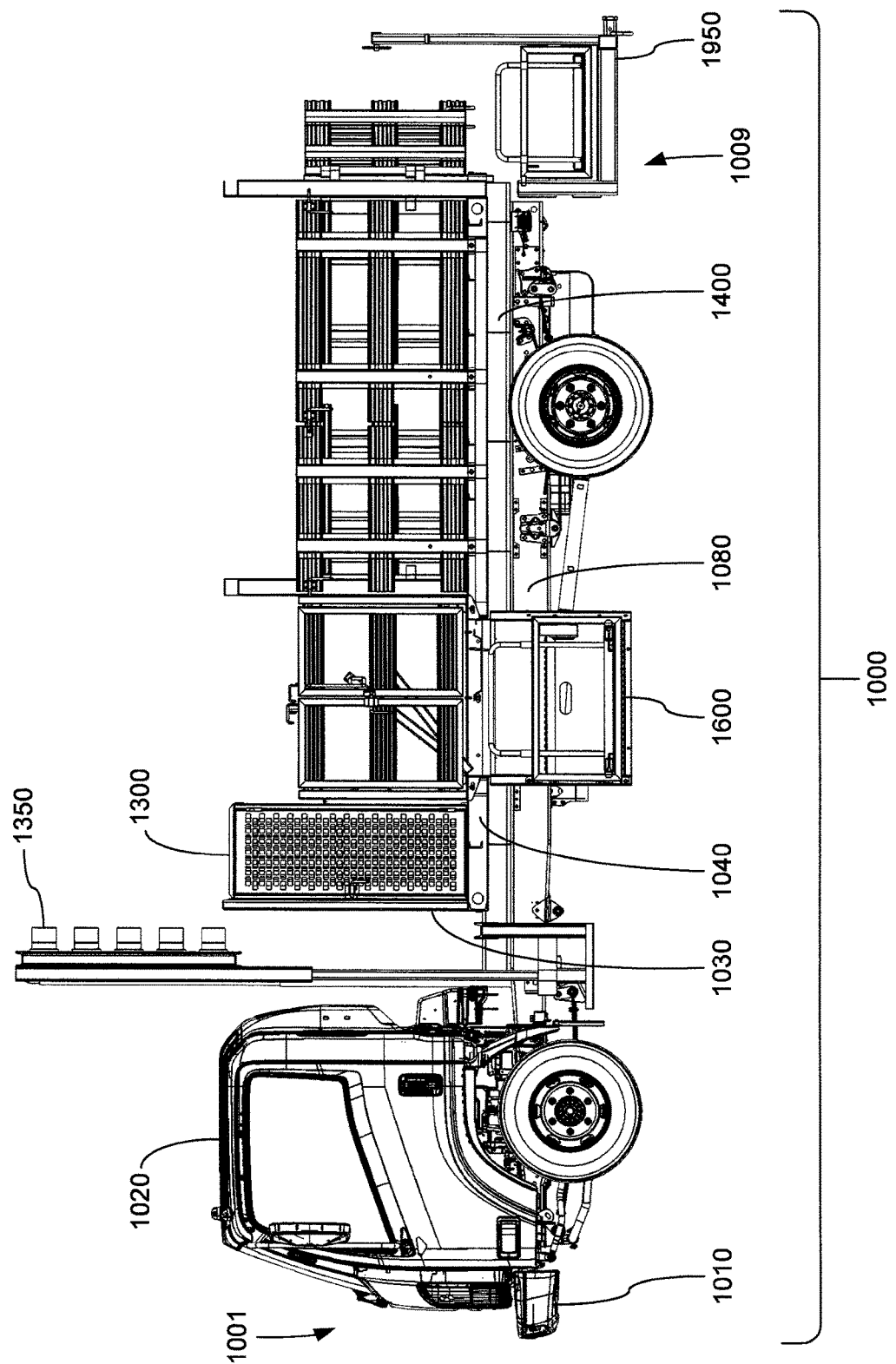
FIG. 1F is an elevational view of the safety truck of FIG. 1E.

FIGS. 1A through 1G, taken together, depict aspects of a novel safety truck 1000 that is highly reconfigurable to serve in various capacities for improving the safety of a roadway construction site. The safety truck 1000 may be assembled to incorporate a wide variety of components providing various safety features, and may incorporate one or more mounting points to allow still more components to be releasably mounted on the safety truck 1000 to provide still more safety features.

More specifically, and referring to FIGS. 1A-F, various embodiments of the safety truck 1000 may be assembled to incorporate an over-cab barrel-type safety barrier storage rack 1200, a forward sign cage 1300, an arrow board 1350, a frame-mounted weight 1400 (best seen in FIGS. 6A-D), a control system 1500 (best seen in FIGS. 12A-H), one or two relatively narrow man baskets 1600, one or two relatively wide man baskets 1650, and/or a rearward sign cage 1700. Various embodiments of the safety truck 1000 may also incorporate at least a mounting point at the front end 1001 thereof to enable a rumble strip basket 1100 (best seen in FIGS. 2A-B) to be releasably mounted thereto. Various embodiments of the safety truck 1000 may also incorporate a mounting point at the rear end 1009 thereof to enable a display board 1800, a truck-mounted attenuator (TMA) 1900 and/or a safety basket 1950 (or some combination thereof) to be releasably mounted thereon.

Through such flexibility of configuration, various embodiments of the safety truck 1000 may be configured in various ways to perform different safety enhancing functions at a roadway work site at different times as the safety needs of a particular roadway work site change over time. By way of example, an embodiment of the safety truck 1000 incorporating the storage rack 1200 and the man basket(s) 1600 or 1650, and to which a combination of the display board 1800 and the TMA 1900 has been attached, may initially be used to distribute warning signage and/or safety barriers along a portion of a roadway that leads up to the location of a roadway work site. More precisely, while one member of a team of construction personnel drives the safety truck from within the cab 1020, another member may stand on a lowered support surface provided by a man basket 1600 or 1650, as the safety truck 1000 is driven slowly alongside such a portion of roadway, to place warning signage and/or safety barriers in a manner that forms a boundary line thereof. Still another member of the team may stand upon a flat bed 1040 of the safety truck 1000 to retrieve stacks of barrel-type safety barriers from the rack 1200 to replenish the supply of safety barriers being placed by the member standing within the man basket 1600 or 1650. As familiar to those skilled in the art, such a line of warning signage and/or safety barriers may be employed as traffic delineators to define the boundaries of a construction site and/or to shift a lane of traffic to make needed room for the roadway work site. While the safety truck 1000 is driven slowly in this example, the display board 1800 may be deployed to provide visible warnings of at least the presence of the slow moving safety truck 1000 to make motorists aware of the need to drive around it. Also while the safety truck 1000 is driven slowly in this example, the TMA 1900 may be deployed to extend rearward of the safety truck 1000 to provide some degree of protection against the impact of a vehicle driven by a motorist who somehow does not notice or does not take appropriate action in response to the warnings provided by the deployed display board 1800.

By way of another example, an embodiment of the safety truck 1000 to which a combination of the display board 1800 and the TMA 1900 has been attached may be parked at a location along a roadway that precedes a roadway work site. While the safety truck 1000 remains stationary at that location, the display board 1800 may be deployed to provide visible notices of a reduced speed limit in the vicinity of the roadway work site, to employ radar incorporated into the display board 1800 to detect the speeds of oncoming vehicles, to display indications of the detected speeds of oncoming vehicles, and to display any of a variety of visual imagery and/or textual messages reminding the motorists driving the oncoming vehicles to obey the reduced speed limit and/or to advise such motorists to be watchful for the presence of construction equipment, vehicles and/or personnel that may enter into the path of the oncoming vehicles. Also while the safety truck 1000 remains stationary, the TMA 1900 may be deployed to extend rearward of the safety truck 1000 to provide some degree of protection against the impact of a vehicle driven by a motorist who somehow does not notice or does not take appropriate action in response to the warnings and notices provided by the deployed display board 1800.

However, although a single safety truck 1000 may provide various features that can be used to improve the safety of a roadway work site, it may be deemed desirable and/or may be necessary to employ a line of safety trucks 1000 in a cooperative manner to more effectively do so. Because a vehicle driven at highway speeds is capable of imparting enormous kinetic energy to another object that it collides with, a single safety truck 1000, even with a TMA 1900 deployed to absorb a significant portion of such energy, may very well still be caused to roll forward a considerable distance by such a collision. As a result, a single safety truck 1000 may actually be caused to roll into the very roadway work site that it is intended to protect, thereby endangering construction personnel.

Therefore, and referring to FIG. 1G, at least where a roadway work site is located on or adjacent to a roadway surface 999, such as a highway on which vehicles are driven at higher speeds than may be encountered on smaller roadways 999 within cities or suburbs, plural safety trucks 1000a through 1000x (arranged in series as is shown in FIG. 1G) that are each equipped with a TMA 1900 may need to be positioned end-to-end in a line at a location along the roadway 999 that precedes (leads up to) the location of the roadway work site. In this way, if the rearward-most safety truck 1000a is hit from behind by an oncoming vehicle at highway speed, the TMA 1900 thereof may absorb an initial significant amount of the kinetic energy exerted on the rearmost safety truck 1000a, while much of the rest of that kinetic energy may cause the rearmost safety truck 1000a to roll forward and collide with the TMA 1900 of the next safety truck 1000 in the series line of trucks. The TMA 1900 of the next safety truck 1000 in that line may then absorb another significant portion of the kinetic energy so that, even if the next safety truck 1000 in that series line is also caused to roll forward, it will be at a significantly reduced speed compared to the speed at which the rearmost safety truck 1000a was caused to roll forward. As that next safety truck 1000 in the series line is caused to roll forward, the TMA 1900 of still another safety truck 1000 in the series line may then absorb still more of the kinetic energy, and so on.

This combination of absorption and transfer of portions of an ever diminishing overall amount of energy among the safety trucks 1000a through 1000x in such a line may continue to propagate through that line until the TMA 1900 of the forward-most safety truck 1000x may also be impacted and absorb much of the greatly diminished remainder of energy from the collision so that the forward-most safety truck 1000x may not move, at all. As a result, construction personnel, construction machinery and/or construction vehicles (such as the depicted safety truck 1000z) located in front of the forward-most safety truck 1000x of the line are protected from the collision.

The same protections that are provided to a roadway work site by a stationary line of the safety trucks 1000a through 1000x may also be provided to a slow moving vehicle associated with a roadway work site, such as the aforedescribed example of a slow moving one of the safety trucks 1000 employed to carry construction personnel who are placing a line of warning signage and/or safety barriers along a lengthy portion of roadway leading up to a roadway construction site. More specifically, it may be deemed desirable to position such slow moving safety truck 1000 as the forward-most safety truck 1000x in a line of safety trucks 1000a through 1000x (again referring to FIG. 1G), where the entire line of safety trucks 1000a through 1000x moves slowly in unison. In this way, the construction personnel standing on the flat bed 1040 and/or within the man basket(s) 1600 or 1650 of the forward-most safety truck 1000x are protected from the kinetic forces exerted in a collision of a vehicle with the TMA 1900 of the rearmost safety truck 1000a. Further, where the quantity of warning signs and/or safety barriers to be placed along the roadway 999 is sufficiently large that no one safety truck 1000 is able to carry all of them, the relative positions of the safety trucks 1000a through 1000x within the line of safety trucks may be changed as the supply of warning signs and/or safety barriers carried within each of the safety trucks is exhausted so that the safety truck currently employed in placing the warning signs and/or safety barriers is always at the forward-most position in the line of safety trucks (i.e., becomes the forward-most safety truck 1000x).

Regardless of whether such a line of safety trucks 1000a through 1000x are employed to provide protection while stationary or while moving, more than one of the safety trucks 1000a through 1000x may also have a display board 1800 attached thereto and deployed such that a line of display boards 1800 is operated to display warning messages, detected vehicular speeds, etc. in an effort to provide an even more conspicuous visual notice of the upcoming roadway work site, and of the need for motorists to slow down and/or alter their path of travel while passing the roadway work site. Where such a set of the safety trucks 1000 are used in such a cooperative manner, wireless communications may be employed among those safety trucks 1000 to enable voice communications between the teams of construction personnel who are associated with different ones of those safety trucks, to enable data to be shared thereamong for recording, and/or to enable warnings of impending vehicular collisions and/or other vehicle-related dangers to be relayed thereamong.

Figure 2A:
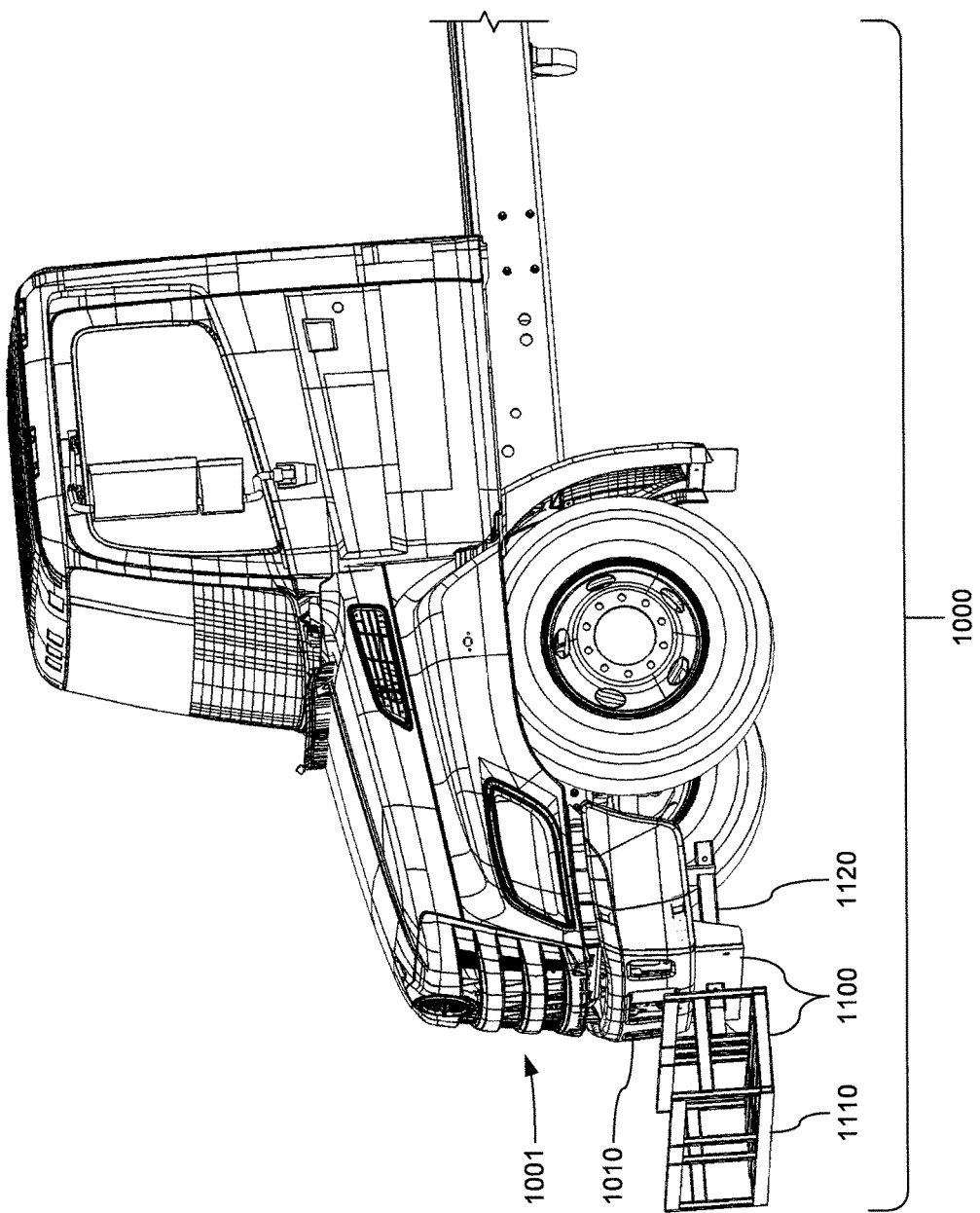
FIG. 2A is a perspective view, from the front and left side, of a front portion of a safety truck to which a rumble strip basket is removably mounted.
Figure 2B:
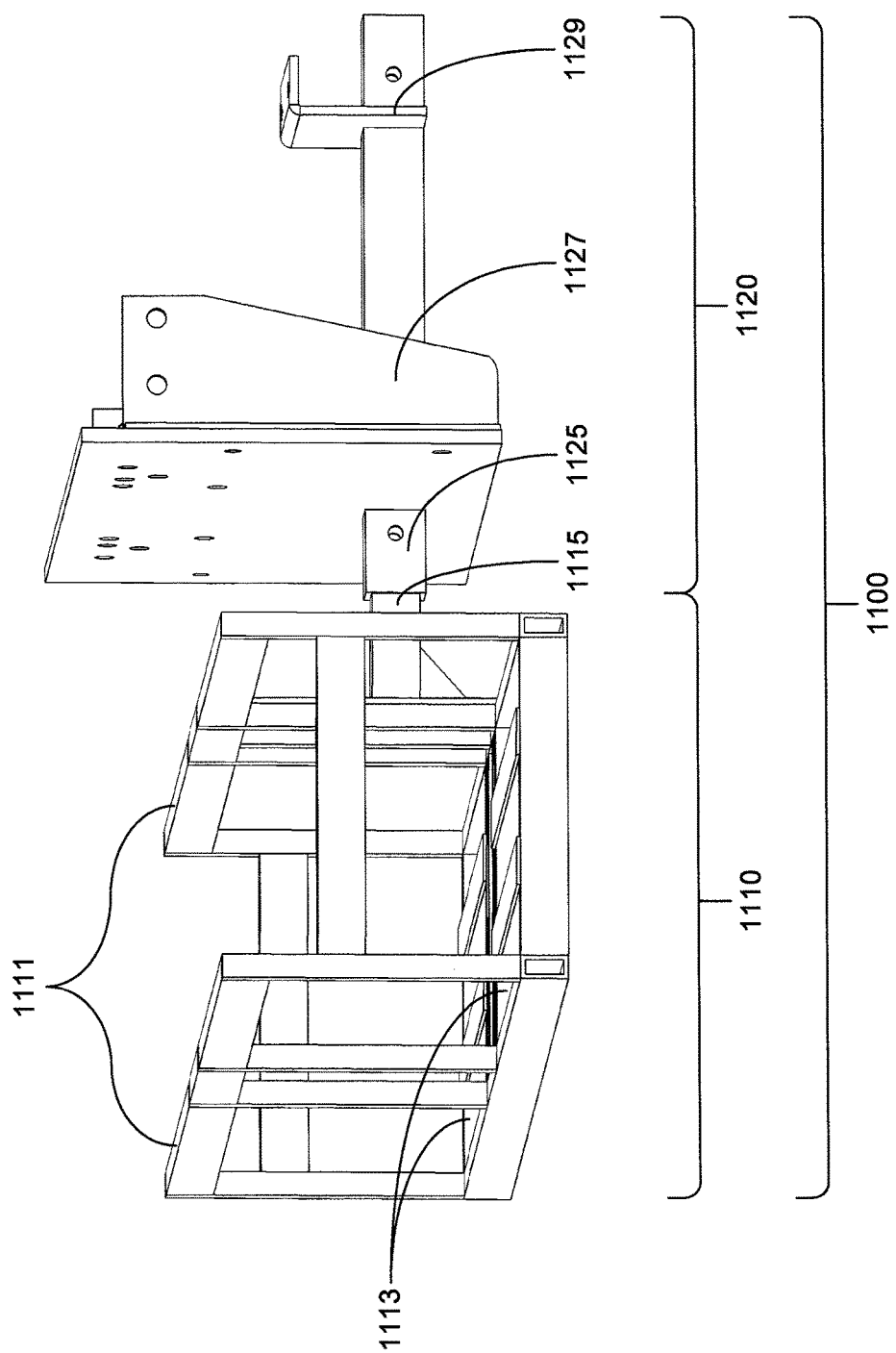
FIG. 2B is a perspective view, on an enlarged scale, of the rumble strip basket of FIG. 2A, more clearly showing front-mounted hitch component thereof.

FIGS. 2A and 2B, taken together, depict various detailed aspects of an example embodiment of the rumble strip basket 1100 that may be releasably attached to the front end 1001 of safety truck 1000. The rumble strip basket 1100 may be attached to the front end 1001 of an embodiment of the safety truck 1000 to hold a supply of rumble strips (not shown) that may be placed at intervals at a location along a roadway 999 that leads up to a roadway construction site.

As will be familiar to those skilled in the art, rumble strips are elongate strips of hard material having a cross-section that often resembles a typical "speed bump" or "speed hump", but thinner and narrower to interact with the tires of a vehicle in a manner that generates a low frequency "rumbling" noise that easily propagates into the cabin of a vehicle to alert a driver to an upcoming road hazard or to an instance of the vehicle drifting out of its lane. Where the upcoming road hazard is a roadway work site, one or more parallel sets of rumble strips may be positioned on a roadway in a manner in which each rumble strip extends crosswise to the path of the vehicle tires that are to roll over them, thereby imparting something of a "washboard" effect to the "rumbling" sound generated as vehicle tires roll over the one or more parallel sets of rumble strips.

Where rumble strips are to be so placed along a portion of a roadway, a safety truck 1000 onto which the rumble strip basket 1100 has been installed may be driven so as to proceed slowly along that portion of the roadway while construction personnel walking alongside of, and/or in front of, the slow moving safety truck 1000 install the rumble strips. More specifically, as such a safety truck 1000 is driven slowly, either forwardly or in reverse, such construction personnel may lift individual rumble strips out of the rumble strip basket 1100, one at a time, and place them on the roadway in front of the safety truck 1000, while using asphalt and/or any of a variety of adhesives and/or mechanical hardware to secure each rumble strip in place.

The rumble strip basket 1100 may include a basket component 1110 and a mounting component 1120. The mounting component 1120 may be connected to the underside of the front end 1001 of a safety truck 1000 at a location just behind its front bumper 1010. A forward mounting plate 1127 of the mounting component 1120 may be employed to attach the mounting component 1120 to a rearwardly-facing portion of the front bumper 1010 and/or to mechanical hardware employed in attaching the front bumper 1010 to one or more framework components of the safety truck 1000. A rearward mounting extension 1129 of the mounting component 1120 may then be employed to further attach the mounting component 1120 to other framework component(s) of the safety truck 1000. As will be clear to those skilled in the art, variations in framework components among different models of trucks and between different manufacturers may very well necessitate the creation of a variety of variants of the mounting component 1120 with different shapes, sizes and/or assortments of mounting plates, extensions, etc. for different trucks. Thus, the mounting component 1120 depicted in greater detail in FIG. 2B is but an example of one such variant.

Regardless of the exact manner in which a variant of the mounting component 1120 may be mounted to a portion of the front end 1001 of a safety truck 1000, the mounting component 1120 may provide a hitch receiver 1125 as a mounting point. The hitch receiver 1125 may take the form of a square 2-inch by 2-inch (or larger) receiver tube that may conform to the specifications for a class III or IV (or higher) trailer hitch promulgated by SAE International of Warrendale, Pa., USA.

Correspondingly, the basket component 1110 may carry a hitch tongue 1115 shaped and sized to be inserted into, and releasably retained within the hitch receiver 1125 in a manner that may also conform to specifications promulgated by SAE International. The basket component 1110 may include a generally rectangular basket fabricated from metal tubing and/or rods providing one or more substantially vertical side walls 1111 and a floor 1113 atop which at stack of rumble strips can be placed.

Figure 3:
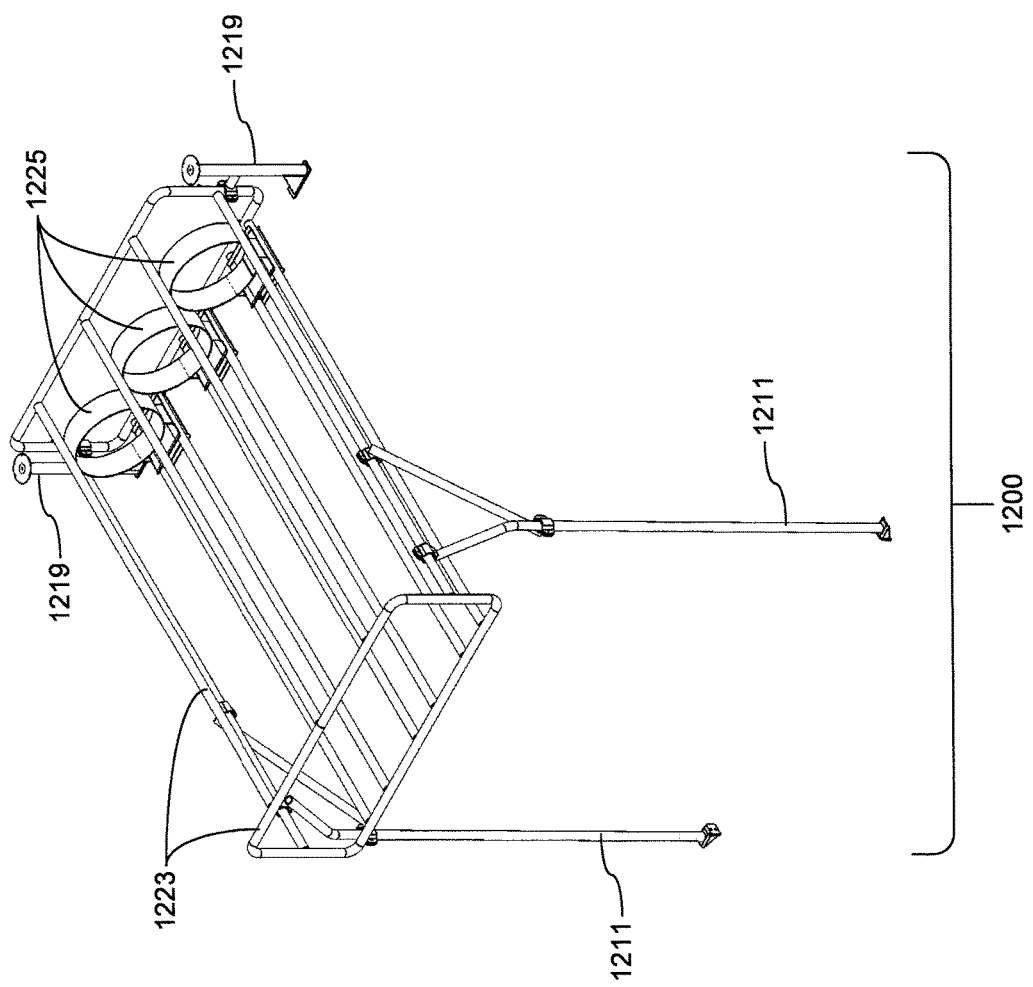
FIG. 3 is a perspective view, from above, the front and left side, of a barrel-type over-cab safety barrier storage rack that may be carried by a safety truck to store barrel-type safety barriers that may employed as traffic delineators.

FIG. 3 depicts various detailed aspects of the barrel-type safety barrier storage rack 1200 that may be attached to the front end 1001 of an embodiment of the safety truck 1000 at a position overlying the cab 1020. The storage rack 1200 may be so attached to the front bumper 1010 and a bulkhead 1030 (best seen in FIGS. 1A-G) toward the front end 1001 of a safety truck 1000 to hold one or more nested stacks of barrel-type safety barriers (not shown) that may be placed in one or more lines as traffic delineators to define a boundary of a roadway work site and/or to guide motorists through a change in the path of travel of roadway traffic that passes a roadway work site.

The barrel-type safety barrier storage rack 1200 may include a frame 1223 defining a rectangular volume within which a set of hoops 1225 may be slidably mounted to engage the upper-most barrel-type safety barrier among each of a plurality of stacks of barrel-type safety barriers as part of causing such stacks to be stored in a horizontal orientation within the frame 1223. Further details of various structural and operational aspects of the rack 1200 are disclosed in the previously referenced Provisional Application Ser. No. 62/631,840 filed Feb. 18, 2018 by Robert H. Roy, Andrew C. Washburn, Joseph T. Piggott and Siddharth Balasubramanian, and entitled TRUCK MOUNTABLE OVER-CAB RACK FOR TRANSPORTING NESTED STACKS OF BARREL-TYPE TRAFFIC DELINEATORS, the disclosure of which is incorporated herein by reference in its entirety. This same Provisional Application also discloses various details of the shape and structure of at least one embodiment of barrel-type safety barrier (referred to therein as a "barrel-like traffic delineator").

Figure 4A:
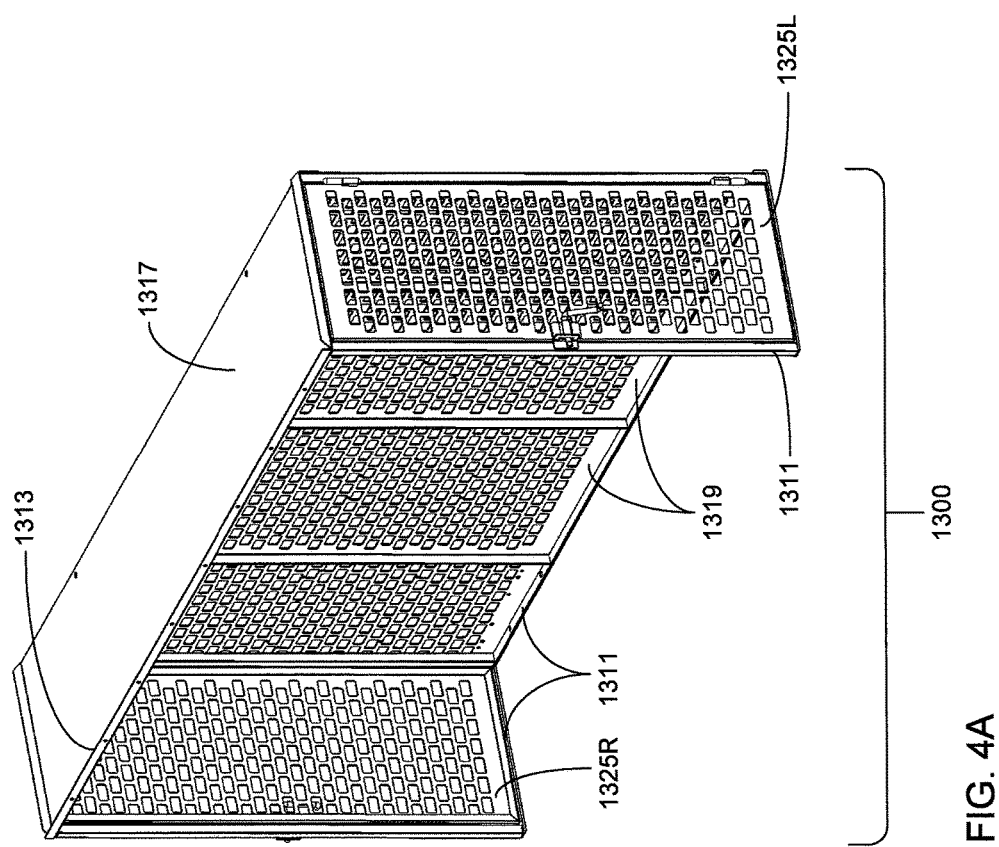
FIG. 4A is a perspective view, from above, the front and the left side, of an example embodiment of a forward sign cage, showing an open front that is closed by a bulkhead of a safety truck, and an open bottom that is closed by a flat bed surface of a safety truck.
Figure 4B:
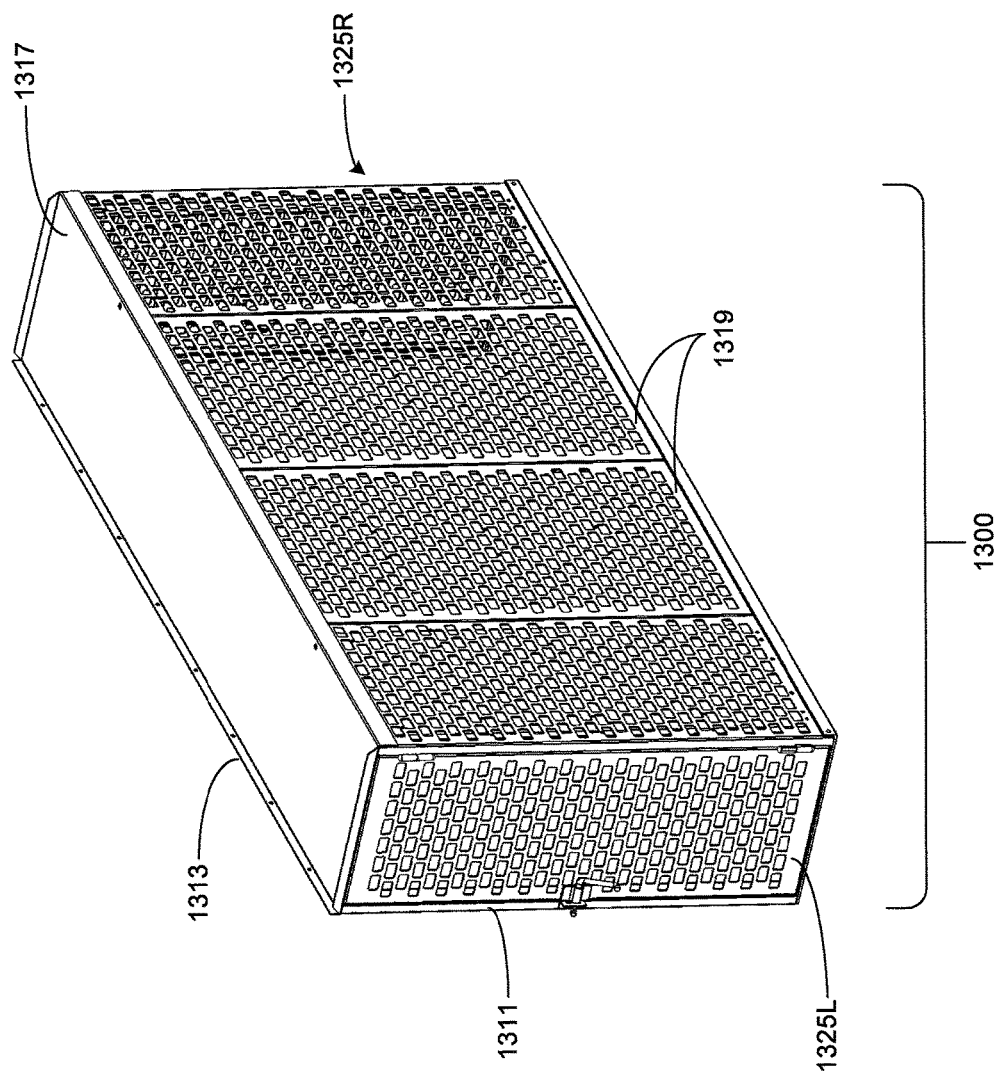
FIG. 4B is a perspective view, from the rear and the left side, of the forward sign cage of FIG. 4A.
Figure 4C:
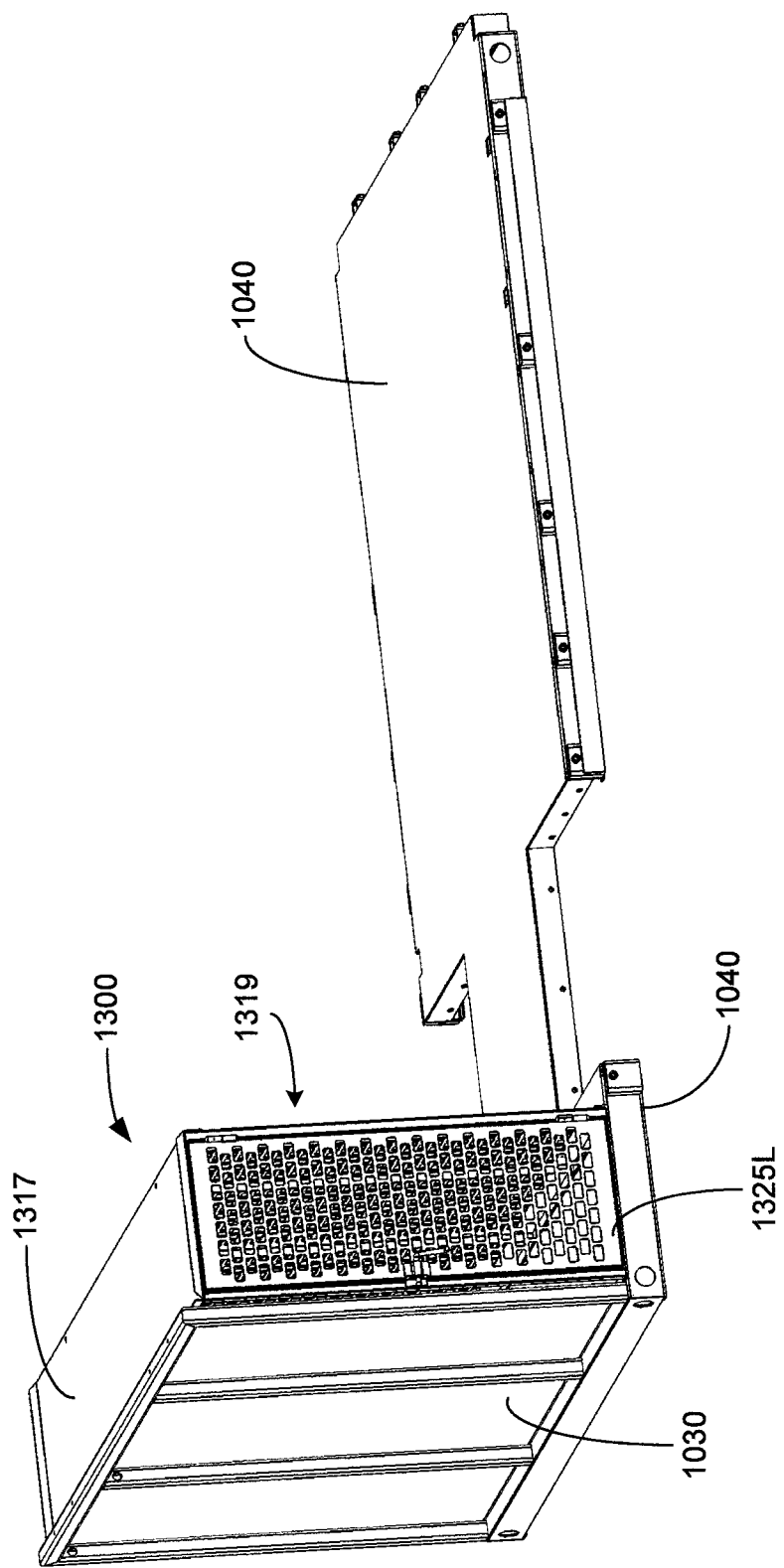
FIG. 4C is a perspective view, from the front and the left side, of the forward sign cage of FIG. 4A as installed in place against a bulkhead and a flat bed of a safety truck.

FIGS. 4A through 4C, taken together, depict various detailed aspects of an example embodiment of the forward sign cage 1300 that may be attached to the rearwardly facing surface of the bulkhead 1030 and the upwardly facing surface of the flat bed 1040 of an embodiment of the safety truck 1000. The forward sign cage 1300 may be so installed to store a variety of warning signs and/or other roadway signage to provide motorists with indications of upcoming dangers or other notices to enhance roadway safety at or near a roadway work site. The forward sign cage 1300 may also store tripods and/or other forms of stands, bases and/or other mounting hardware by which roadway signs may be placed along a roadway.

As depicted, the forward sign cage 1300 may have a frame 1311 that defines its generally rectangular shape, and that may provide a mechanism by which the forward sign cage 1300 is mounted to the bulkhead 1030 and to the flat bed 1040, a top panel 1317 that defines a lip 1317 that may also be used to mount the forward sign cage 1300 to the bulkhead 1030, and a rear panel 1319. The frame 1311 may define rectangular left side and right side openings into the interior volume of the forward sign cage 1300 that are made closable by a left side hinged door 1325L and a right side hinged door 1325R, respectively. As depicted, the rear panel 1319 and each of the doors 1325L and 1325R may be made from perforated sheet metal. However, other embodiments are possible in which sheets of any of a variety of other materials, and/or sheets that are not perforated, may be used.

The forward sign cage 1300 may be assembled without either a front panel or a bottom panel such that the forward sign cage 1300 may have an open front that becomes closed when the forward sign cage 1300 is installed against the rearwardly facing surface of the bulkhead 1030, and an open bottom that becomes closed when the forward sign cage 1300 is installed onto the upwardly facing surface of the flat bed 1040. Thus, in effect, the rearwardly facing surface of the bulkhead 1030 may become the otherwise missing front panel and the upwardly facing surface of the flat bed 1040 may become the otherwise missing bottom panel when the forward sign cage 1300 is so installed. However, other embodiments are possible in which no side of the forward sign cage 1300, when assembled, is left open.

Figure 5A:
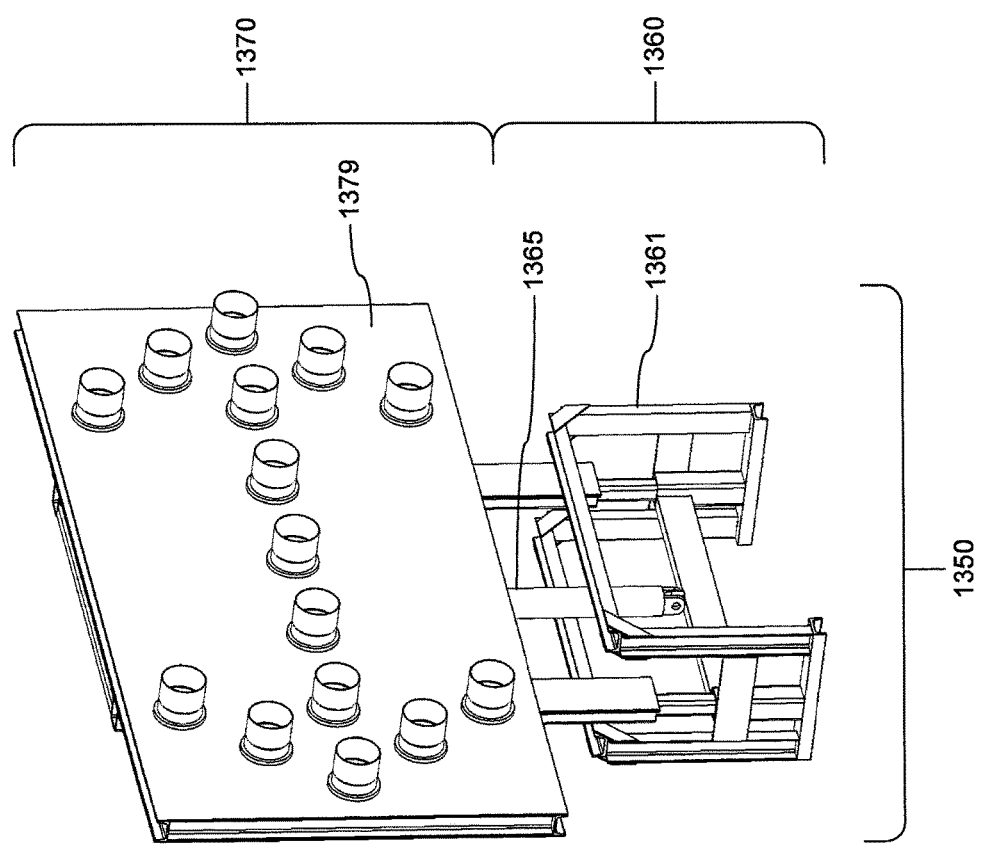
FIG. 5A is a perspective view, from the back and the left side, of an example embodiment of an arrow board in a stowed state.
Figure 5B:
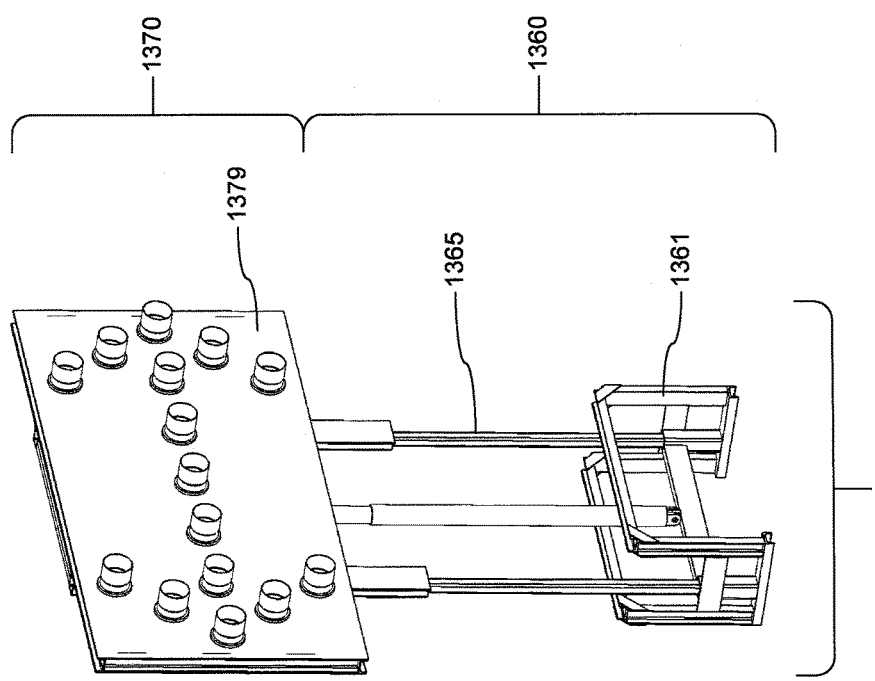
FIG. 5B is a perspective view, similar to FIG. 5A, of the arrow board of FIG. 5A, but showing the arrow board in a deployed state.
Figure 5C:
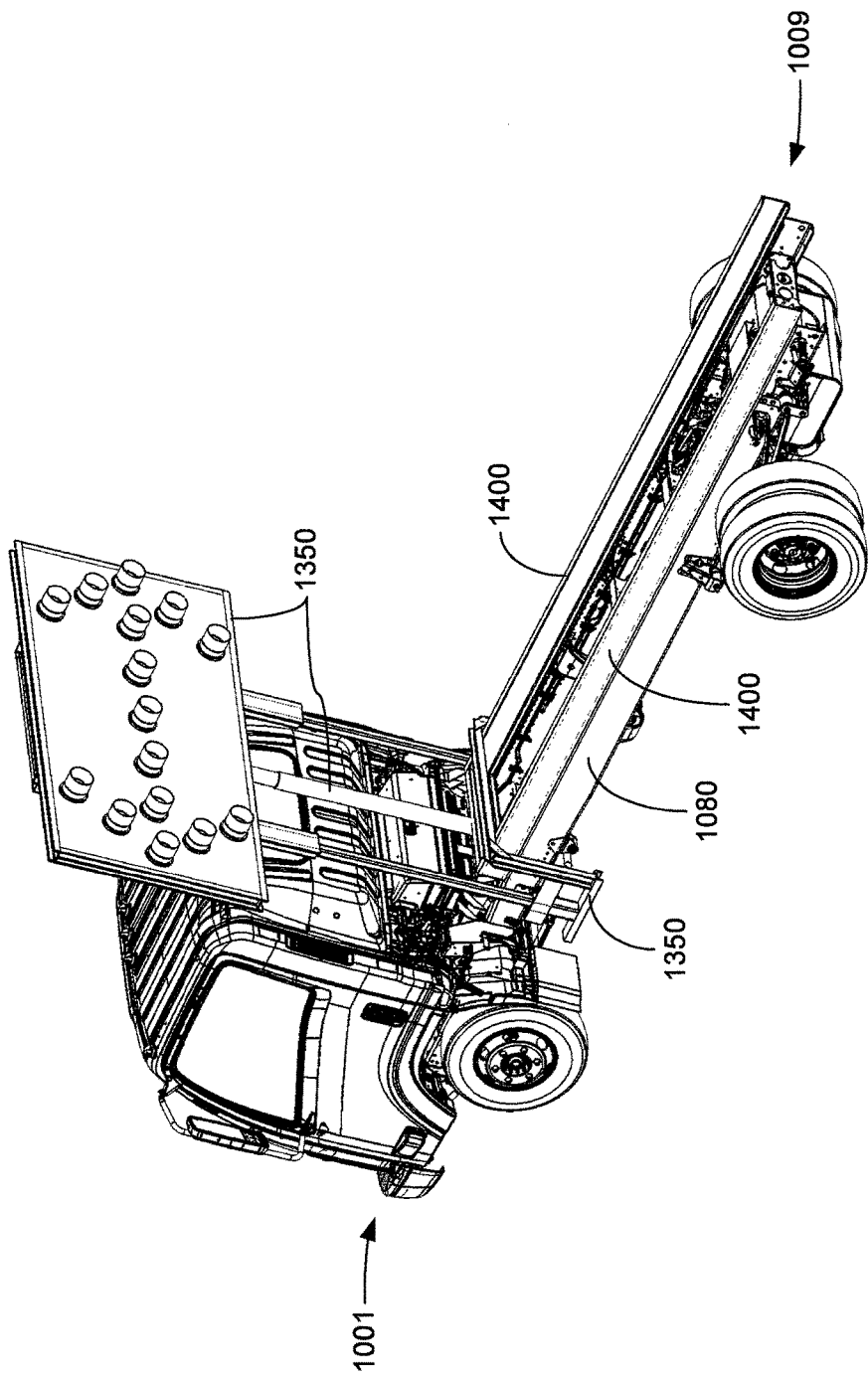
FIG. 5C is a perspective view, from the back and the left side, of the arrow board of FIG. 5A as mounted to a frame of a safety truck.

FIGS. 5A through 5C, taken together, depict various detailed aspects of an example embodiment of the arrow board 1350 that may be attached to portions of an elongate chassis frame 1080 of an embodiment of the safety truck 1000. The arrow board 1350 may be so attached to the chassis frame 1080 to face rearwardly to provide illuminated indications of a need for oncoming vehicles approaching from behind to change their path of travel on a roadway (e.g., switch lanes) so as to pass the safety truck 1000 either to the left or to the right of the safety truck 1000.

The arrow board 1350 may include a base component 1360 and a display component 1370. The base component 1360 may include a base frame 1361 assembled from multiple frame components that, when assembled, define a generally U-shaped frame that enables the base component 1360 to be installed onto a chassis frame 1080 of a safety truck 1000 at a location between the cab 1020 and the bulkhead 1030. More precisely, in some embodiments, the U-shaped base frame 1361 may be mounted directly onto the chassis frame 1080 in a manner that straddles over the chassis frame 1080, or may be mounted onto a portion of the frame-mounted weight 1400 that is directly mounted onto the chassis frame 1080 (as will shortly be explained in greater detail) in a manner that straddles over both the chassis frame 1080 and the frame-mounted weight 1400 (as depicted in FIG. 5C).

The base component 1360 may also include one or more actuators 1365 connecting the base frame 1361 to the display component 1370. Each of the one or more actuators 1365 may be any of a variety of types of actuator based on any of a variety of technologies that enable the display component 1370 to be raised to a deployed position (i.e., a deployed state) or lowered to a stowed position (i.e., a stowed state), including and not limited to, a pneumatic actuator, an electric linear actuator based on a rotary motor and/or a linear motor, or a hydraulic actuator.

The display component 1370 may define a substantially flat and rearwardly facing display surface 1379. As depicted, the rearwardly facing display surface 1379 of the arrow board 1350 may incorporate multiple individual lighting devices (e.g., incandescent bulbs, LED bulbs, etc.) arranged to form a pattern of a double-ended arrow. Particular subsets of the multiple individual lighting devices may be illuminated to provide a lighted arrow pointing to the left of the safety truck 1000 or a lighted arrow pointing to the right of the safety truck 1000. Also, as will be familiar to those skilled in the art, such a subset defining either a left-pointing or right-pointing arrow may be illuminated in a flashing pattern that causes the entire arrow to flash and/or that causes different portions of the arrow to flash in a repeating sequence that provides the arrow with something of an animated appearance to even more quickly catch the attention of motorists in oncoming vehicles. However, it should be noted that despite this specific depiction and discussion of the use of multiple individual lighting devices, other embodiments are possible in which any of a variety of types of all-points-addressable display may be employed where a left-pointing or right-pointing arrow may be drawn using graphical elements as those skilled in the art will readily recognize.

FIGS. 6A through 6D, taken together, depict various detailed aspects of an example embodiment of the frame-mounted weight 1400 that may be attached to chassis frame 1080 of an embodiment of the safety truck 1000. The frame-mounted weight 1400 may be so installed to add a predetermined amount of mass to the overall weight of a safety truck 1000 to improve the extent to which the safety truck 1000 resists being caused to roll from a stationary position in response to a vehicular impact with the safety truck 1000. More precisely, the frame-mounted weight 1400 may add a predetermined amount of mass to increase the overall mass of the safety truck 1000, thereby increasing the inertia of the safety truck 1000 to a predetermined level to provide more resistance against the portion of the energy imparted to the safety truck 1000 by a colliding vehicle that isn't absorbed by a TMA 1900 mounted on the safety truck 1000.

Figure 6A:
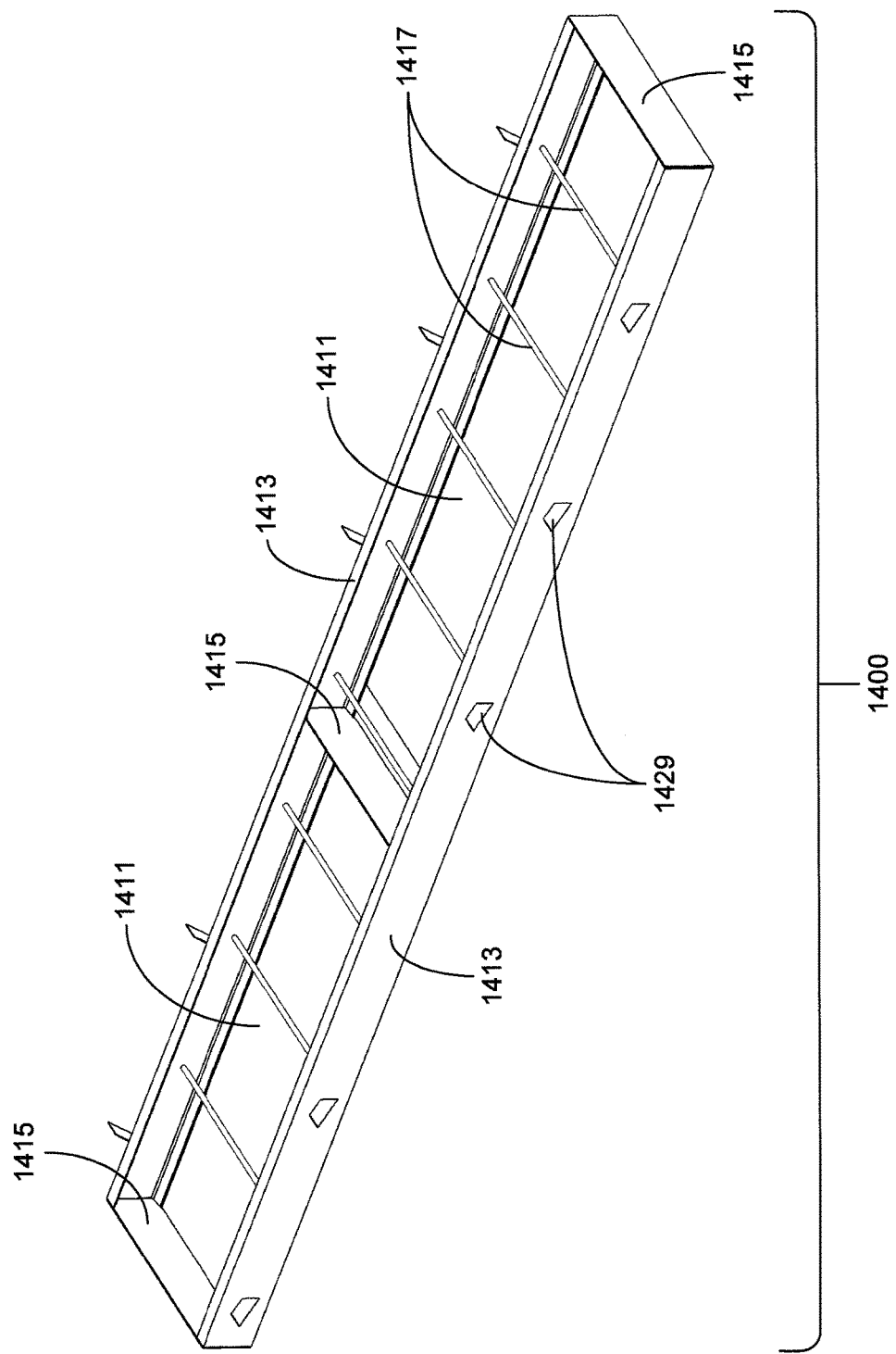
FIG. 6A is a perspective view of a box structure of an example embodiment of frame-mounted weight to be mounted between a frame and a flat bed of a safety truck.

Referring more specifically to FIG. 6A, as depicted, the frame-mounted weight 1400 may have an elongate and generally rectangular box shape defined principally by a bottom panel 1411, a pair of opposed elongate side walls 1413, and two or more crosswise walls 1415 extending between the elongate side walls 1413 to at least define the opposed ends thereof. The elongate rectangular box shape of the frame-mounted weight 1400 may define one or more compartments (that may be divided by one or more of the crosswise walls 1415) into which an amount of concrete may be poured to determine the mass that is added to a safety truck 1000 when assembly of the frame-mounted weight 1400 is completed and the frame-mounted weight 1400 is mounted to the chassis frame 1080 of the safety truck 1000. As also depicted, the frame-mounted weight 1400 may also incorporate one or more rod-like crosswise members 1417 also extending between the elongate side walls 1413. The rod-like crosswise members 1417 may serve to further strengthen the elongate side walls 1413 against being spread apart by the forces exerted by the concrete (at least during pouring and drying of the concrete), and/or may serve to aid in retaining the resulting block(s) of concrete in place (including when a vehicular impact occurs) as a result of the concrete forming around them.

Prior to or during the process of assembly of a safety truck 1000, a determination may be made of the overall amount of mass that the safety truck 1000 should have when fully assembled. In recognition of the need for a truck employed as a "crash truck" to have a significant amount of mass to be effective in resisting the kinetic energy imparted to it in a vehicular impact, various municipalities, states and/or countries have specified at least a minimum amount of mass that such a truck should have (although such a minimum is often expressed as an amount of weight, and often in terms of tons). Thus, the overall amount of mass that a safety truck 1000 should have may be set by statute and/or may be set by other factors linked to characteristics of the location in which the safety truck 1000 is to be used (e.g., what the local speed limits are). Regardless of the exact manner in which the overall amount of mass is determined, with the overall amount of mass determined, and with the overall amount of mass of the combination of the other components of the safety truck 1000 derived, the amount of mass that must be added by the frame-mounted weight 1400 may be derived.

Also prior to or during the process of assembly of a safety truck 1000, a determination may be made of where along the length of the body of the safety truck 1000 is the desired location for its center of gravity. This may be determined based on the planned layout of components of the safety truck 1000.

With the amount of mass to be added by the frame-mounted weight 1400 is so derived, and with the desired location for the center of gravity of the safety truck 1000 determined, a determination may be made as to what the dimensions of the frame-mounted weight 1400 should be, how it should be divided into multiple compartments (if it is to be divided, at all), and what amounts of concrete are to be poured into each compartment so that the frame-mounted weight 1400 adds the amount of mass needed and does so in a manner that causes the center of gravity of the safety truck 1000 to be positioned at least closer to its desired location along the length of the safety truck 1000 (it may be that amount of mass added by the frame-mounted weight 1400 is simply not enough to move the center of gravity all the way to the desired location).

Figure 6B:
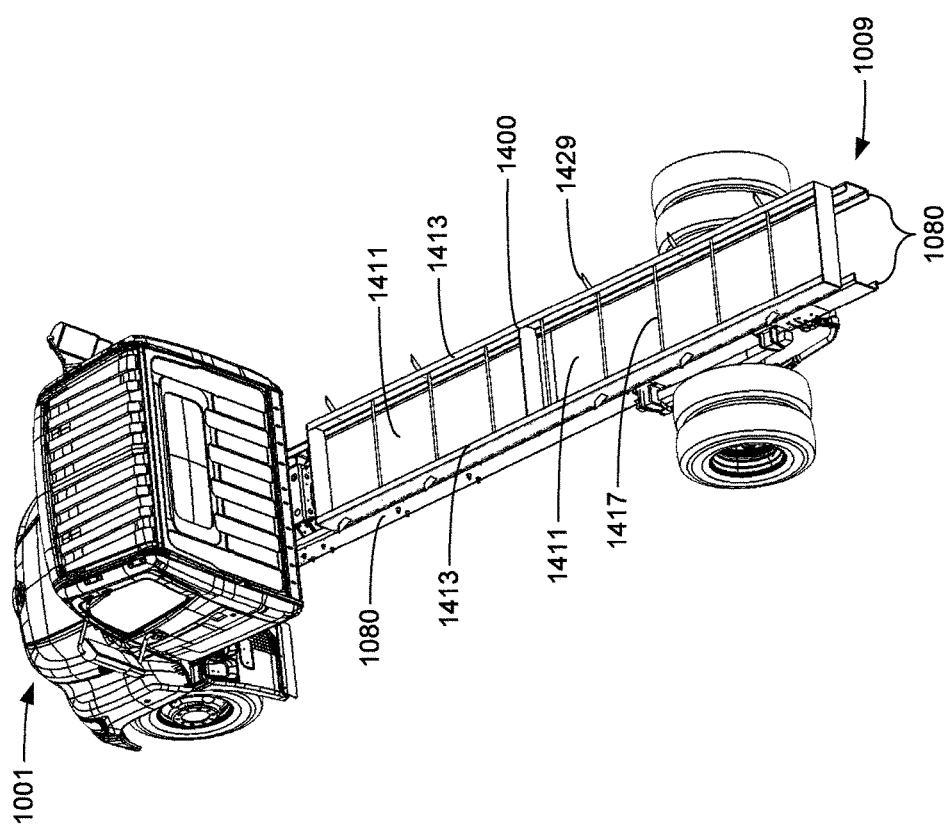
FIG. 6B is a perspective view, from above, the rear and the left side, of the frame-mounted weight of FIG. 6A as mounted to a frame of a safety truck.

Referring more specifically to FIG. 6B, the placement of the frame-mounted weight directly on top of the chassis frame 1080 has the advantage of aiding in lowering the center of gravity of a safety truck 1000 to a greater degree than would be possible if the same amount of mass were simply placed on top of the flat bed 1040. As will be familiar to those skilled in the art, the lowering of the center of gravity of a vehicle is often deemed to be desirable as it makes that vehicle more stable when driven, including more resistant to tilting to the left or right to the extent of rolling over sideways. Such a lower of the center of gravity may, therefore, be deemed desirable in decreasing the likelihood of the safety truck 1000 being caused to tilt so far.

Figure 6C:
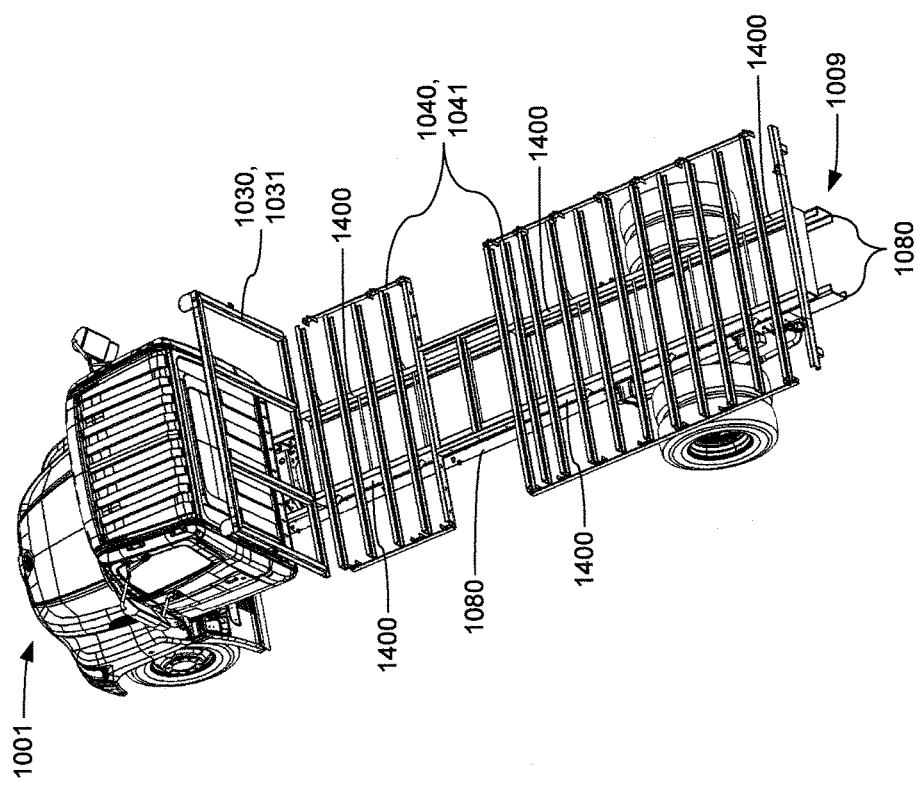
FIG. 6C is a perspective view, similar to FIG. 6B, of the frame-mounted weight of FIG. 6A, but showing frame members of a flat bed mounted onto the frame-mounted weight.

Referring more specifically to FIGS. 6A and 6C, with the frame-mounted weight 1400 filled with as deemed desirable with as much concrete as may be deemed desirable and then mounted to the chassis frame 1080 of a safety truck 1000, crosswise frame members 1041 of the flat bed 1040 may then be mounted directly on top of the frame-mounted weight 1400. At least some of the crosswise frame members 1041 may be additionally supported by angled brackets 1429 emanating from the external surfaces of the elongate side walls 1413.

Figure 6D:
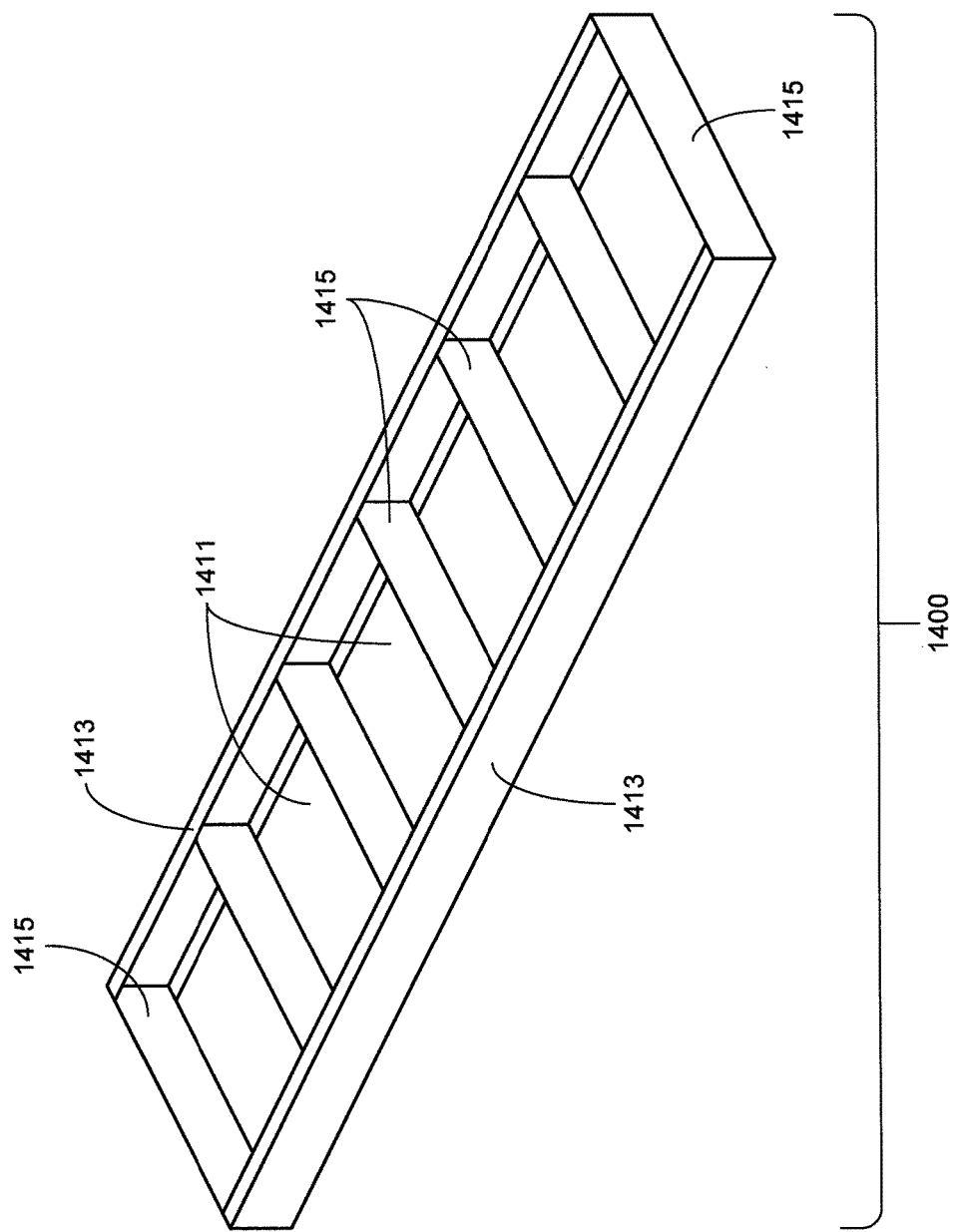
FIG. 6D is a perspective view of a box structure of an alternate example embodiment of frame-mounted weight to be mounted between a frame and a flat bed of a safety truck.

Referring more specifically to FIG. 6D, in an alternate embodiment of the frame-mounted weight 1400, the rod-like crosswise members 1417 may be replaced with additional crosswise walls 1415 to divide the interior volume of such an alternate embodiment into a greater number of compartments. This may be deemed desirable as it may allow greater control over the distribution of weight (and accordingly, the location of the center of gravity of a safety truck 1000) by allowing greater granularity in the amount of concrete poured into each of such a larger quantity of compartments.

Figure 7A:
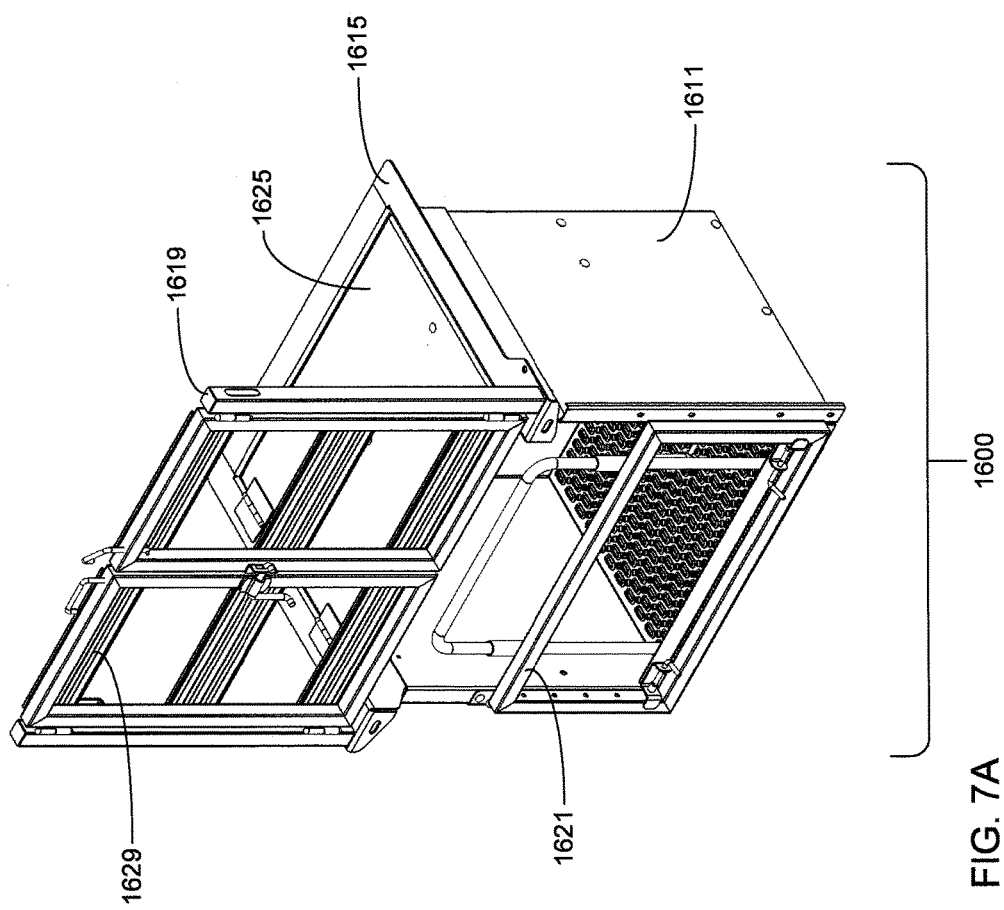
FIG. 7A is a perspective view of a first example embodiment of a relatively narrow man basket able to be mounted as a module into an inset formed in a flat bed of a safety truck.
Figure 7B:
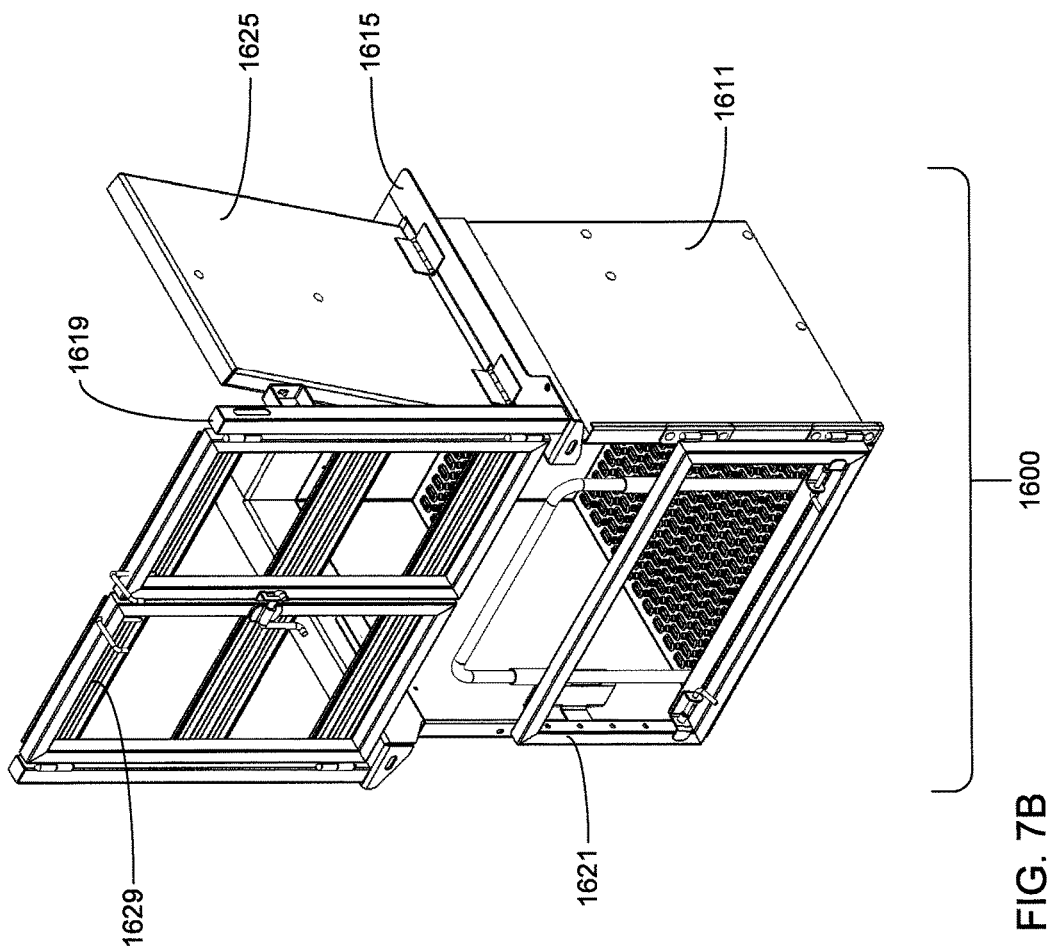
FIG. 7B is a perspective view of a second example embodiment of a relatively narrow man basket that is substantially similar to, but is a mirror image of, the relatively narrow man basket of FIG. 7A.
Figure 7C:
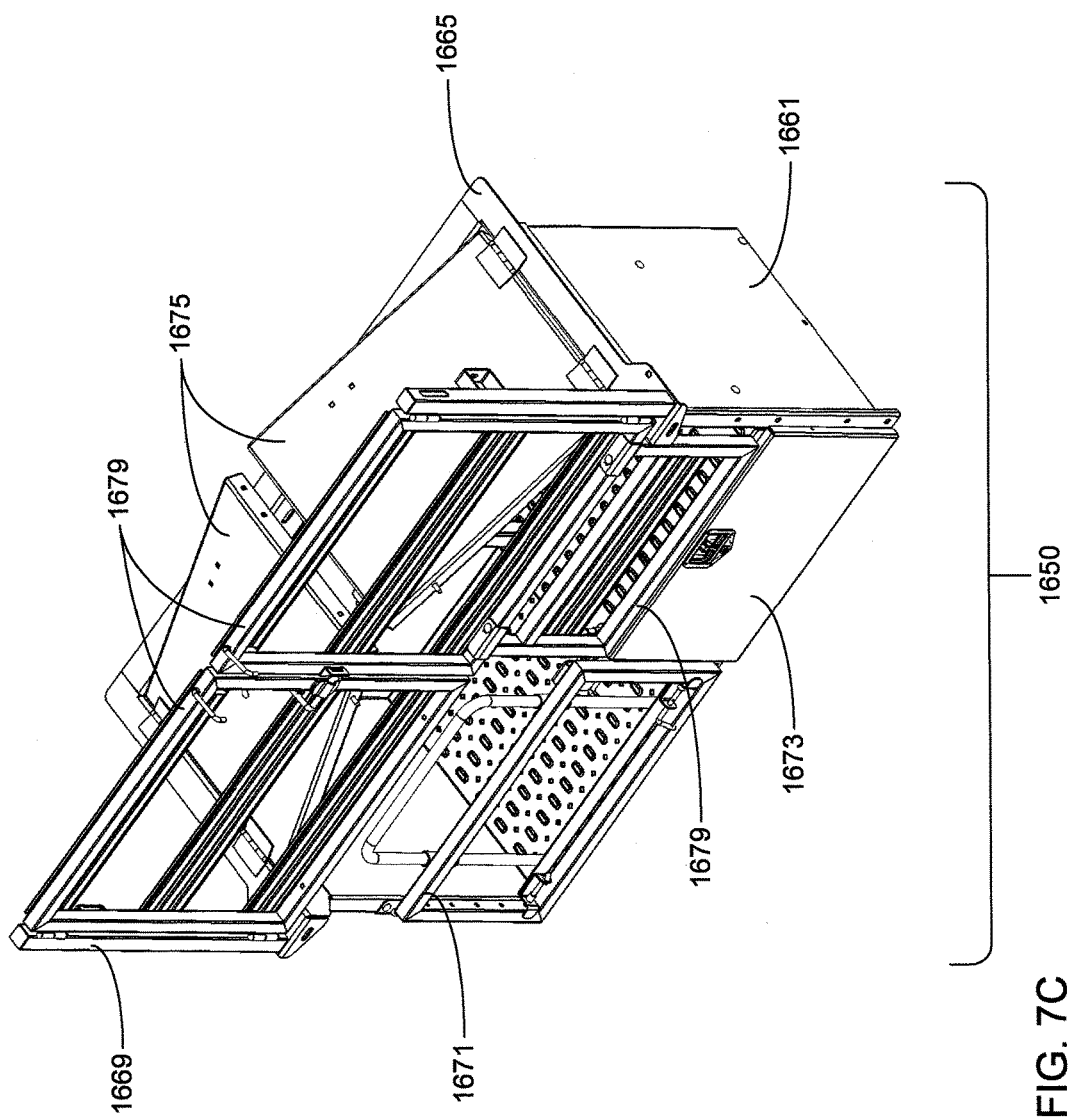
FIG. 7C is a perspective view of a first example embodiment of a relatively wide man basket able to be mounted as a module into an inset formed in a flat bed of a safety truck.
Figure 7D:
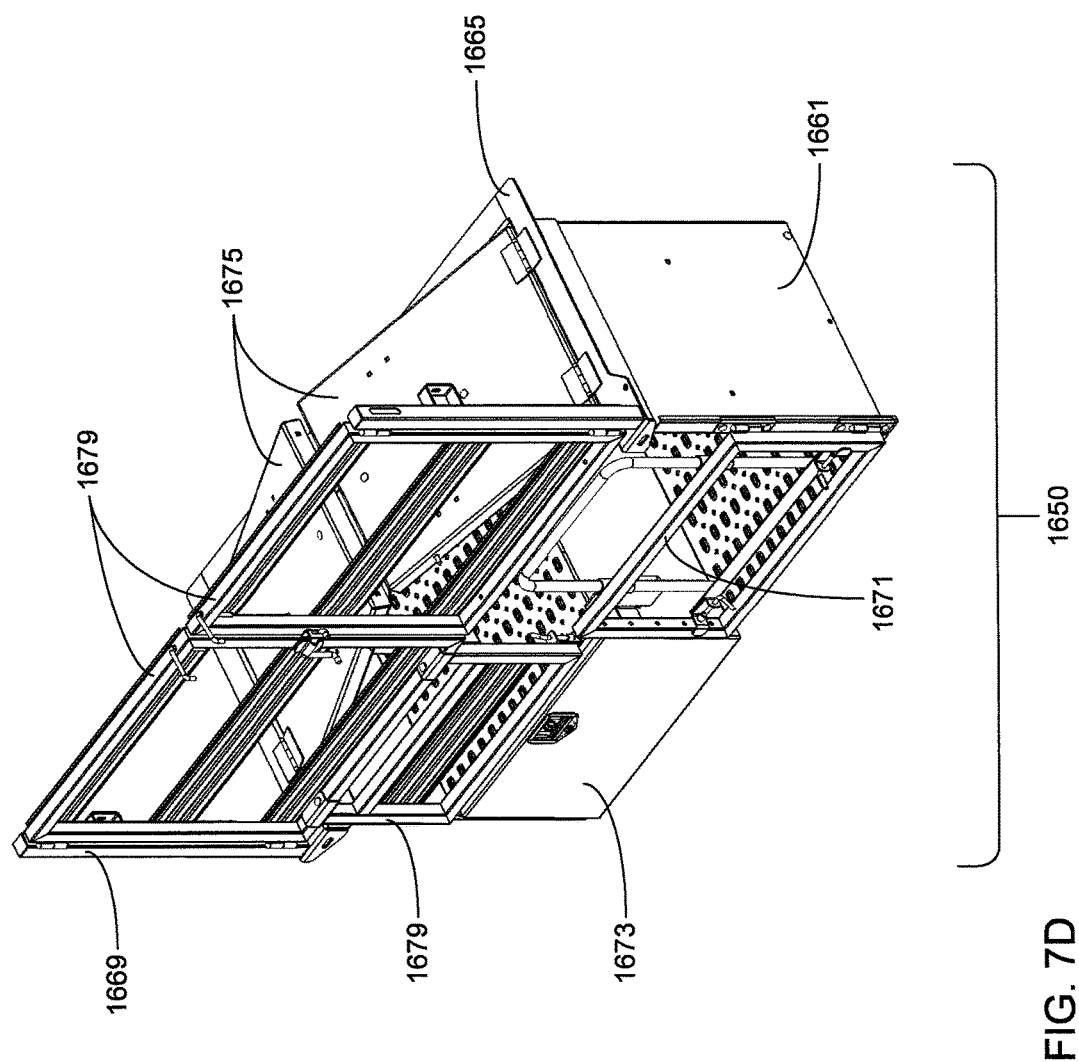
FIG. 7D is a perspective view of a second example embodiment of a relatively wide man basket that is substantially similar to, but is a mirror image of, the relatively wide man basket of FIG. 7C.

Each of FIGS. 7A through 7D depicts various detailed aspects of a different embodiment of a man basket 1600 or 1650. More precisely, FIGS. 7A and 7B depict mirror-image embodiments of a relatively narrow man basket 1600 that may be incorporated into either the left or the right side of the flat bed 1040 of an embodiment of the safety truck 1000 (such as the embodiment thereof depicted in FIGS. 1E-F), and FIGS. 7C and 7D depict mirror-image embodiments of a relatively wide man basket 1650 that may be incorporated into either the left or the right side of the flat bed 1040 of another embodiment of the safety truck 1000 (such as the embodiments thereof depicted in FIGS. 1A-D).

Referring to all of FIGS. 7A-D, much of the structure of the man baskets 1600 or 1650 may be defined by a substantially rectangular box 1611 or 1661, respectively, defined by a perforated bottom panel providing an upwardly facing support surface at a level below that of the upwardly facing surface of the flat bed 1040. As previously discussed, each of the man baskets 1600 or 1650 may be used to provide a support platform on which construction personnel may stand that is at a level below that of the upwardly facing surface of the flat bed 1040 to enable such personnel to more ergonomically place and/or retrieve warning signage and/or safety barriers. At such a lower level, each of the man baskets 1600 or 1650 may include a lower hinged gate 1621 or 1671, respectively, that may incorporate a height-adjustable bar to provide a flexible mechanism by which construction personnel standing within each of the man baskets 1600 or 1650 may be flexibly, but safely, retained therein as they perform such tasks.

Each of the depicted embodiments of man basket 1600 or 1650 may be installed within an inset formed in the flat bed 1040 along either or both of the left side or the right side of a safety truck 1000. Each of the man baskets 1600 or 1650 may incorporate a flange 1665 that extends around three sides of the man baskets 1600 or 1650, and is shaped to extend horizontally outwardly to overlie portions of the upwardly facing support surface of the flat bed 1040 that surround such an inset so as to be physically supported within such an inset by those portions of the flat bed 1040. Any of a variety of adhesives, mechanical fasteners, welding and/or other techniques may be employed to attach the flange 1665 to those portions of the upwardly facing surface of the flat bed 1040. With the man basket 1600 or 1650 so installed, a hinged platform door 1625 of the relatively narrow man basket 1600 or a pair of hinged platform doors 1675 of the relatively wide man basket 1650 may be swung downward into a horizontal position by which the platform door 1625 or pair of platform doors 1675 provide an upwardly facing support surface that is substantially level with the upwardly facing support surface provided by the flat bed 1040. Additionally, the platform doors 1625 and 1675 may be fabricated from metal and with sufficient reinforcement in their design to enable each to serve effectively as part of the floor of the flat bed 1040.

Each of the man baskets 1600 or 1650 may be accompanied by a pair of hinged gates 1629 or 1679 supported by upright frame components 1629 or 1669, respectively, and that may cooperate with other fence and/or gate components installed about the periphery of the flat bed 1040 to aid in preventing objects and/or personnel from falling off of the flat bed 1040. The hinged gates 1629 or 1679 may be manually operable to swing outwardly from the man baskets 1600 or 1650, respectively, to allow personnel to step onto or off of the flat bed 1040, and/or to enable objects to be placed upon or removed from the flat bed 1040 without having to lift those objects over whatever fence components may be installed about the periphery of the flat bed 1040.

Referring more specifically to FIGS. 7C and 7D, each of the mirrored embodiments of the relatively wide man basket 1650, may additionally incorporate another support surface at an intermediate level between the levels of the flat bed 1040 and the bottom perforated panel of the relatively wide man baskets 1650. Underneath this other support surface may be a storage compartment closable with another hinged door 1673 that, in some embodiments, may be lockable to secure tools and/or other items therein. Further details of various structural and operational aspects of at least the relatively wide man baskets 1650 (alternately referred to as "safety modules") are disclosed in the previously referenced Provisional Application Ser. No. 62/638,818.

FIGS. 8A through 8D, taken together, depict various detailed aspects of example embodiments of the rearward sign cage 1700 that may be attached to the upwardly facing surface of the flat bed 1040 toward the rear end 1009 of an embodiment of the safety truck 1000. Not unlike the aforedescribed forward sign cage 1300, the rearward sign cage 1700 may be so installed to store a variety of warning signs and/or other roadway signage to provide motorists with indications of upcoming dangers or other notices to enhance roadway safety at or near a roadway work site. The rearward sign cage 1700 may also store tripods and/or other forms of stands, bases and/or other mounting hardware by which roadway signs may be placed along a roadway.

Figure 8A:
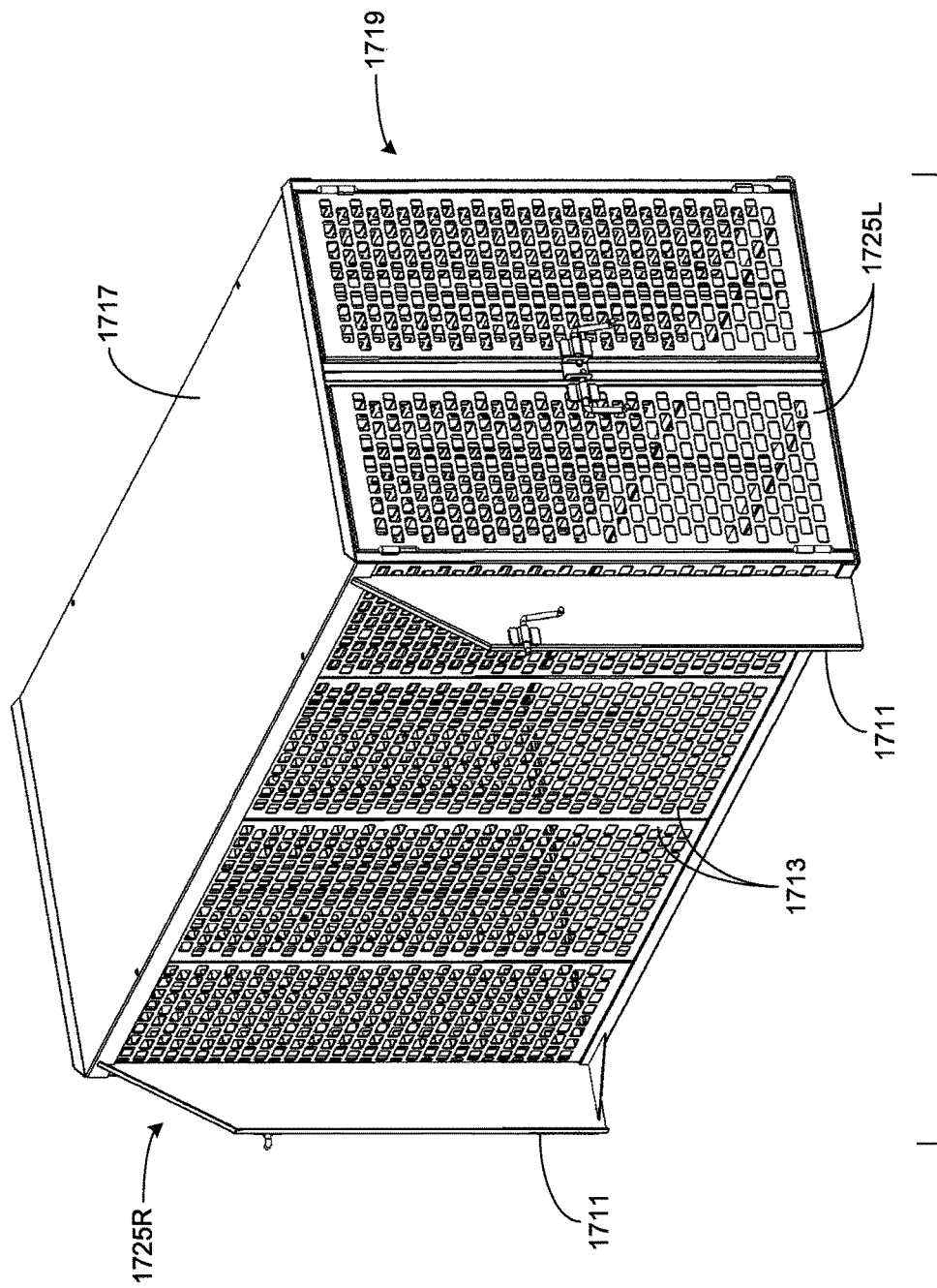
FIG. 8A is a perspective view, from above, the front and the left side, of a first example embodiment of a rearward sign cage able to be mounted toward the rear of a flat bed of a safety truck.
Figure 8B:
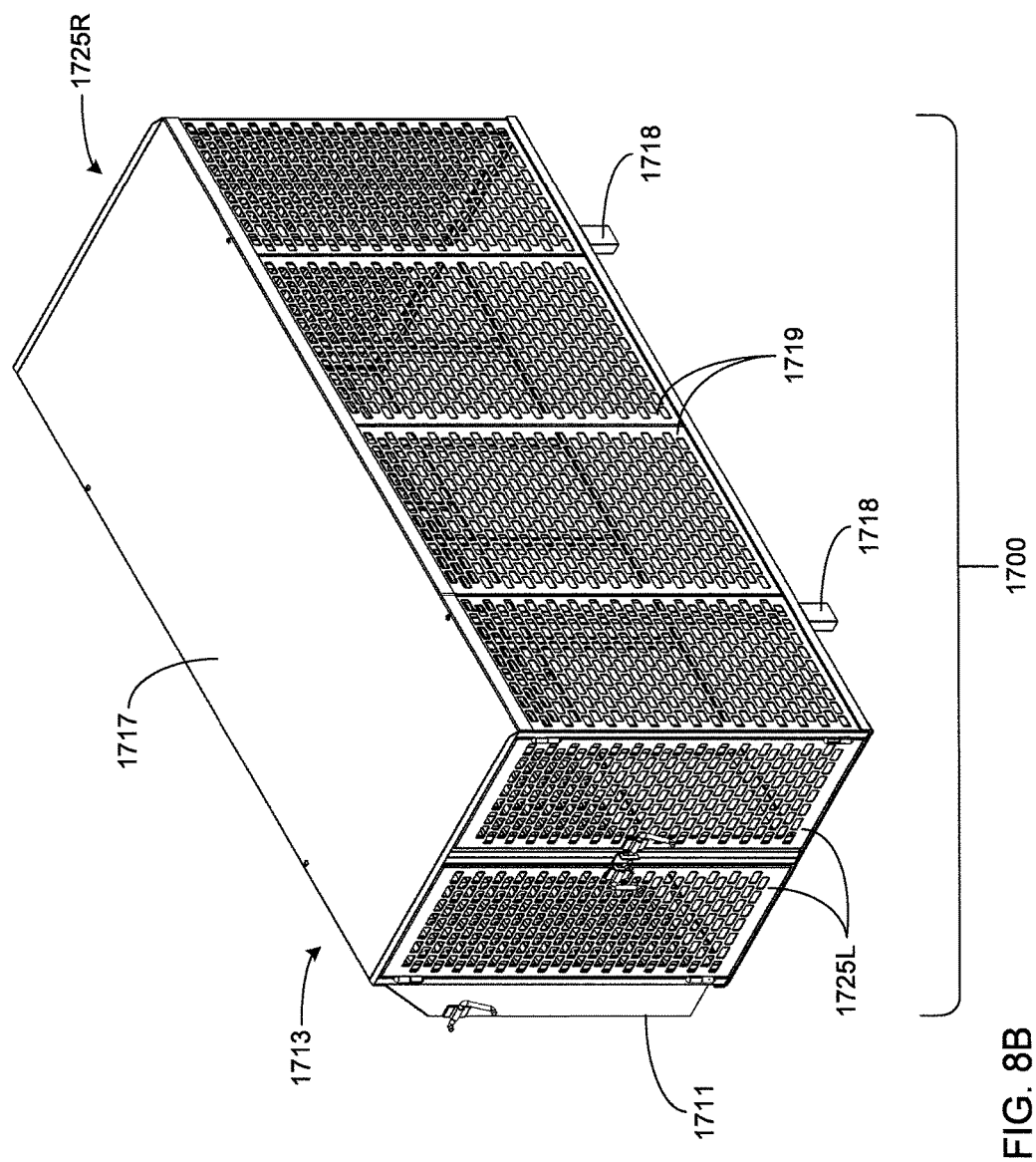
FIG. 8B is a perspective view, from above, the rear and the left side, of the rearward sign cage of FIG. 8A.
Figure 8C:
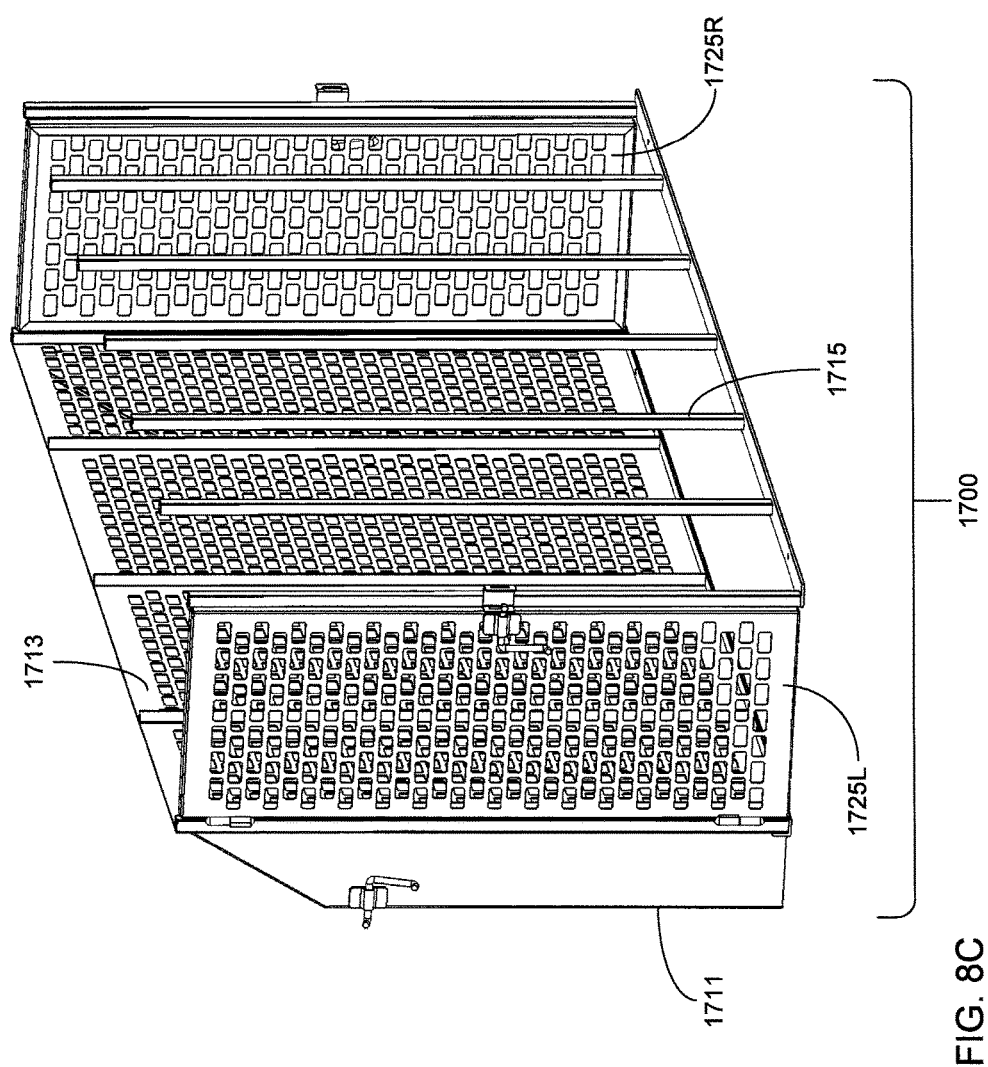
FIG. 8C is a perspective view, from the rear and the left side, of a front half of the rearward sign cage of FIG. 8A, showing a set of vertical rods that serve to divide the internal volumes of the front and rear halves of the rearward sign cage, and showing an open bottom of the rearward sign cage that is closed by a flat bed surface of a safety truck.

Referring to FIGS. 8A-C, as depicted, the rearward sign cage 1700 may have a frame 1715 that defines its generally rectangular shape, and that may provide a mechanism by which the rearward sign cage 1700 is mounted to the upwardly facing surface of the flat bed 1040. The rearward sign cage 1700 may also have a front panel 1713, a top panel 1717, a rear panel 1719, and a pair of vertically extending "wing" portions that extend forwardly from the rearward sign cage 1700 serve to connect the rearward sign cage 1700 to fence components that may be installed about the periphery of the flat bed 1040 and in front of the rearward sign cage 1700.

As also depicted, a set of vertically extending parallel bars of the frame 1715 may extend up through the middle of the rearward sign cage 1700 to effectively divide the interior volume thereof into two substantially equal halves. This may be done as an aid to organizing warning signage and/or related components within the rearward sign cage 1700. Alternatively or additionally, this may be done to provide an increased degree of granularity in further dividing the interior volume with one or more shelves (not shown) that may extend between those vertically extending bars of the frame 1715 and either of the front panel 1713 or the rear panel 1719.

The frame 1715 may define pairs of rectangular left side and right side openings into the interior volume of the rearward sign cage 1700 that are made closable by a left side hinged doors 1725L and a right side hinged doors 1725R, respectively. As depicted, the front panel 1713, the rear panel 1719 and each of the doors 1725L and 1725R may be made from perforated sheet metal. However, other embodiments are possible in which sheets of any of a variety of other materials, and/or sheets that are not perforated, may be used.

In some variants of the embodiment of the rearward sign cage 1700 of FIGS. 8A-C, the rearward sign cage 1700 may be formed, at least initially, as two separate halves to make aspects of the assembly of the safety truck 1000 easier. By way of example, the lifting of two separate halves of the rearward sign cage 1700 onto the flat bed 1040 by personnel may be easier than such lifting of the entire rearward sign cage 1700. Alternatively or additionally, painting and/or other processing of two separate halves of the rearward sign cage 1700 may be easier than with the entire rearward sign cage 1700. Additionally, in some embodiments, cost savings from economies of scale may be realized by designing at least a portion of the rearmost half of the rearward sign cage 1700 to be fabricated and assembled from substantially the same components as are used to fabricate and assemble the forward sign cage 1300.

Figure 8D:
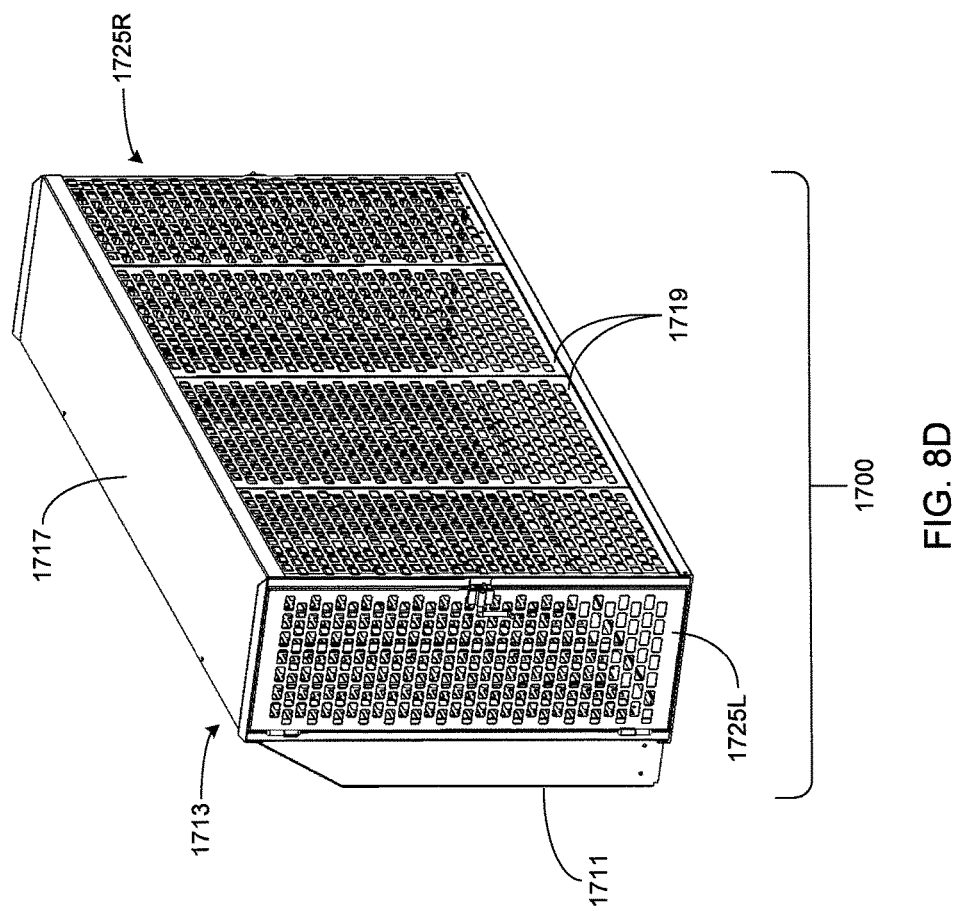
FIG. 8D is a perspective view, from above, the back and the left side, of a second example embodiment of a rearward sign cage.

Referring to FIG. 8D, an alternate embodiment of the rearward sign cage 1700 may be half the size of the embodiment of FIGS. 8A-C, and may incorporate only one of each of the hinged doors 1725L and 1725R. Such an alternate embodiment may also not be divided into two halves as is the embodiment of FIGS. 8A-C.

Referring to all of FIGS. 8A-D, each of the depicted embodiments of the rearward sign cage 1700 may be assembled without a bottom panel such that the rearward sign cage 1700 may have an open bottom that becomes closed when each of these embodiments of the rearward sign cage 1700 is installed onto the upwardly facing surface of the flat bed 1040. Thus, in effect, the upwardly facing surface of the flat bed 1040 may become the otherwise missing bottom panel when the rearward sign cage 1700 is so installed. However, other embodiments are possible in which no side of the rearward sign cage 1700, when assembled, is left open.

FIGS. 9A through 9D, taken together, depict various detailed aspects of an example embodiment of the display board 1800 that may be attached to rearmost portions of the elongate chassis frame 1080 of an embodiment of the safety truck 1000. The display board 1800 may be so attached to the chassis frame 1080 to face rearwardly to provide warning notices and/or other information to motorists in oncoming vehicles approaching from behind the safety truck 1000. The display board 1800 may include mating mounting components 1810 and 1820, a base component 1860 and a display component 1870.

Figure 9A:
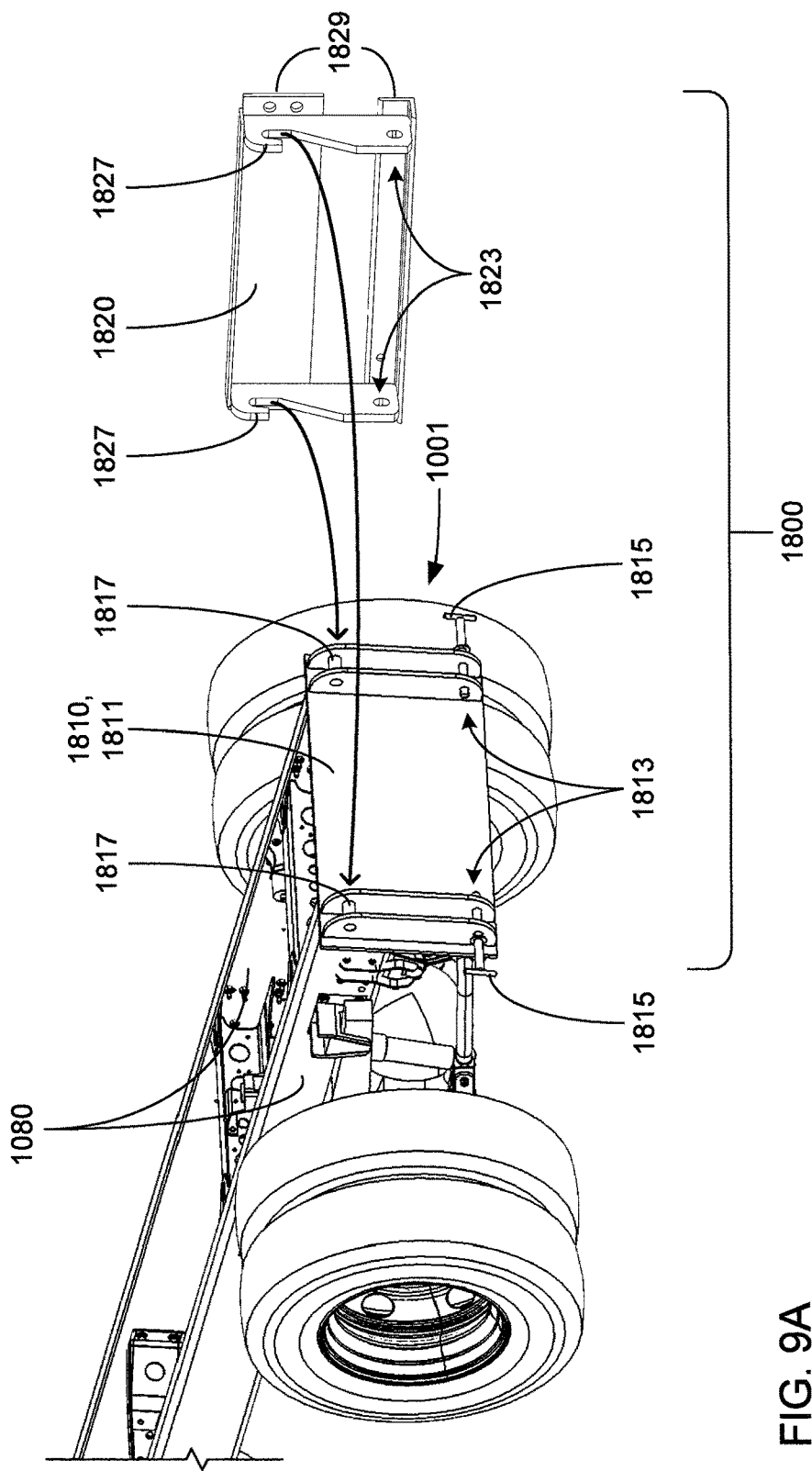
FIG. 9A is a perspective view, from the rear and the left side, of a mounting point carried on the rear end of a frame of the safety truck, and of a mating mounting point to be carried by an accessory to enable attachment of an accessory to the rear end of the frame of the safety truck.
Figure 9B:
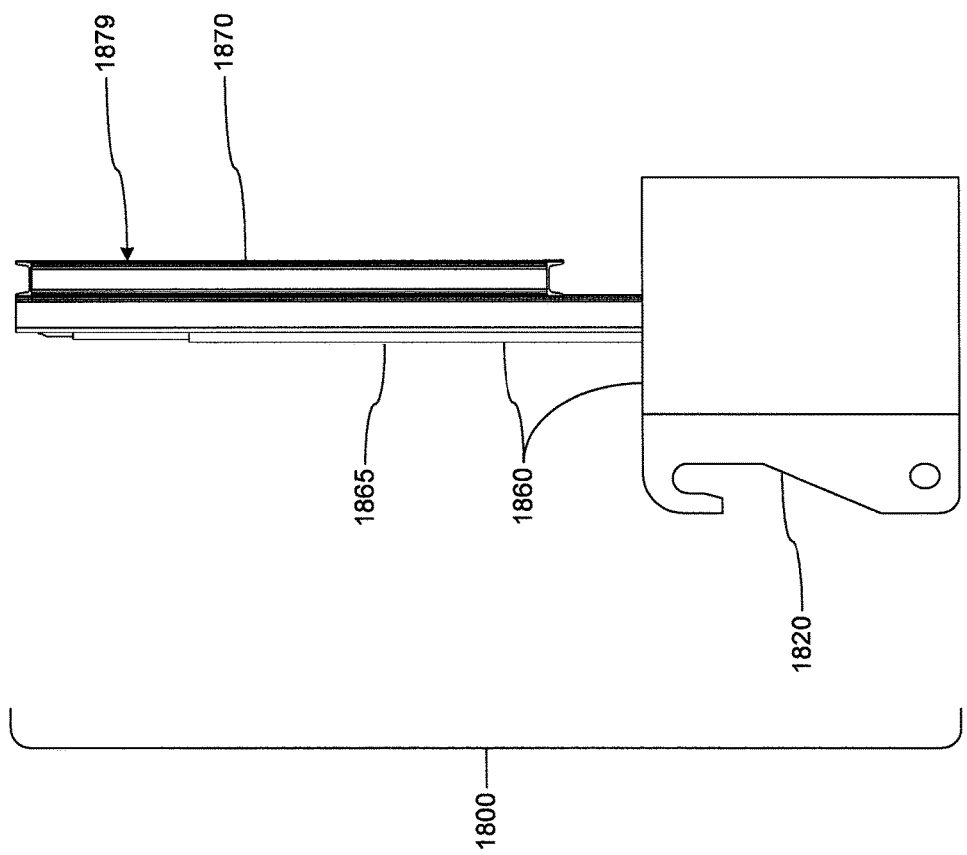
FIG. 9B is an elevational view of an example embodiment of a display board in a stowed state, showing a base thereof that carries the mating mounting point of FIG. 9A to enable attachment of the display board to the rear of the frame of a safety truck.
Figure 9C:
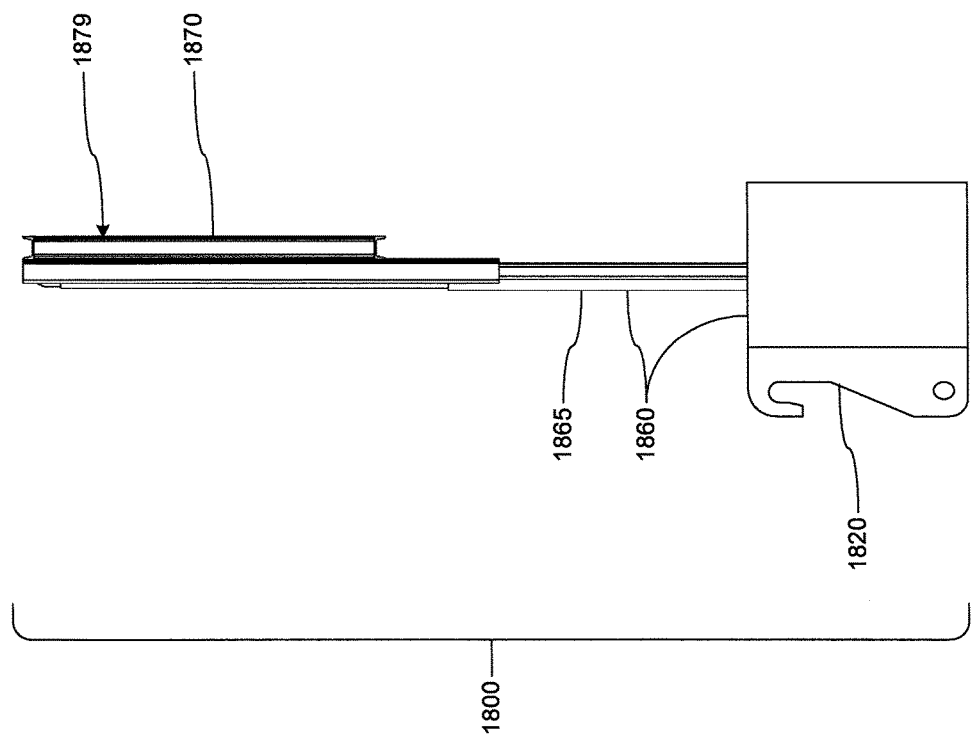
FIG. 9C is an elevational view, similar to FIG. 9B, of the display board of FIG. 9B in a deployed state.

Referring to FIGS. 9A-C, the mounting component 1810 may be connected to rear end portions of the chassis frame 1080 at the rear end 1009 of a safety truck 1000 to provide a mounting point to which the mating mounting component 1820 may be releasably connected to thereby allow the base component 1830 of the display board 1800 to be releasably attached to the chassis frame 1080 of the safety truck 1000. The mounting components 1810 and 1820 may be shaped, sized and/or otherwise configured to interact in a manner described in U.S. Pat. No. 8,870,251 issued Oct. 28, 2014 to Jack H. Kulp, Felipe Almanza, Geoffrey B. Maus and Jeremy Smith, assigned to Traffix Devices, Inc. of San Clemente, Calif., USA, and entitled QUICK HITCH SYSTEM AND METHODS FOR TRUCK MOUNTED CRASH ATTENUATOR, the entirety of which is incorporated herein by reference.

More specifically, a mounting plate 1811 of the mounting component 1810 may be connected to the rear end portions of the chassis frame 1080 via welding and/or via any of a variety of fastening components (e.g., nuts, bolts, pins, etc.). The mounting plate 1811 may carry pairs of elongate parallel tabs, with each such pair rigidly supporting a mounting rod 1817. A corresponding pair of mounting plates 1829 of the mounting component 1820 may be connected to the base component 1860 of the display board 1800 via welding and/or via any of a variety of fastening components. The mounting plates 1829 may carry a pair of mounting hooks 1827 that are each shaped, sized and/or otherwise configured to engage a corresponding one of the mounting rods 1817 to thereby releasably connect the mounting component 1820 to the mounting component 1810. Upon such a connection being made, manually operable mounting pins 1815 that each extend through a pair of aligned holes 1813 may be operated to extend through corresponding holes 1823 formed through portions of the mounting hooks 1827 to thereby releasably retain the mounting hooks 1827 in engagement with the mounting rods 1817.

The base component 1860 may include one or more actuators 1865 connecting the display component 1870 to the mounting component 1820. Each of the one or more actuators 1865 may be any of a variety of types of actuator based on any of a variety of technologies that enable the display component 1870 to be raised to a deployed position (i.e., a deployed state) or lowered to a stowed position (i.e., a stowed state), including and not limited to, a pneumatic actuator, an electric linear actuator based on a rotary motor and/or a linear motor, or a hydraulic actuator.

Figure 9D:
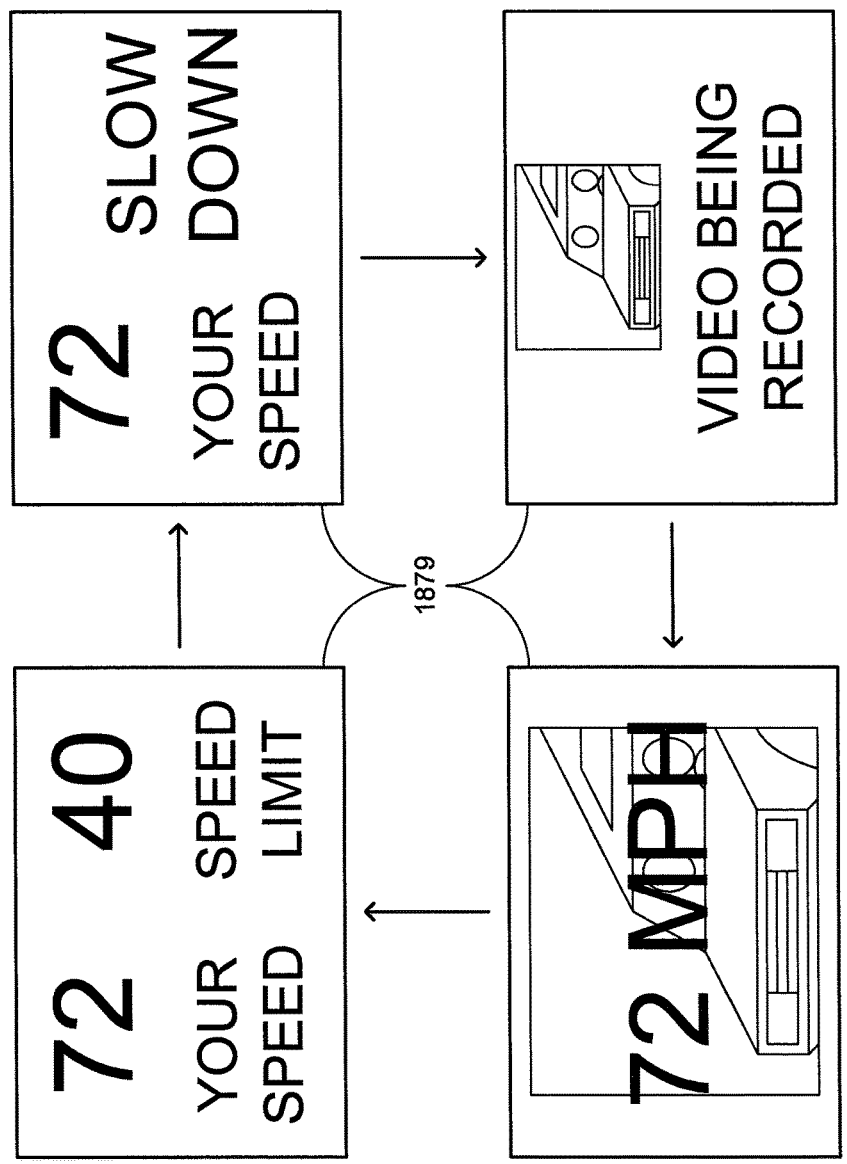
FIG. 9D is a series of views of imagery, including messages, that may be displayed by an embodiment of a display board.

Referring to FIGS. 9B-D, the display component 1870 may define a substantially flat and rearwardly facing display surface 1879 on which may be displayed arrows and/or other graphical elements, captured video and/or textual information. In some embodiments, the rearwardly facing display surface 1879 of the display board 1800 may incorporate multiple individual lighting devices forming a pattern in a manner not unlike the arrow board 1350.

However, in other embodiments, the display component 1870 may incorporate a raster-scan all-points addressable display device providing a grid of pixels and based on any of a variety of display technologies, including and not limited to: a grid of light-emitting diodes (LEDs), a grid of organic LEDs (OLEDs), a backlit and/or edge-lit LCD panel, a gas plasma display, an electroluminescent (EL) display, or any of a variety of other display types and/or technologies that enable the display of graphical elements, text characters and/or motion video. Referring more specifically to FIG. 9D, such a flexible embodiment of the display component 1870 may be used to display a rotating set of imagery that conveys: the speed limit imposed in the vicinity of a roadway work site, the detected speed of an oncoming vehicle, one or more textual messages for a motorist to slow down or take other precautionary action, an indication that the actions of a motorist are being recorded, and/or a portion of video that is being recorded of a motorist to highlight the fact that video is being recorded of that motorist.

FIGS. 10A through 10H, taken together, depict various detailed aspects of an example embodiment of the truck mounted attenuator (TMA) 1900 that may be attached (along with the display board 1800) to rearmost portions of the elongate chassis frame 1080 of an embodiment of the safety truck 1000. As has already been discussed, the TMA 1900 may be so attached to the chassis frame 1080 to extend rearwardly from the safety truck 1000 to provide at least some degree of protection from an impact by a colliding vehicle approaching from behind the safety truck 1000. In at least some embodiments, the TMA 1900 may be combined with the display board 1800 such that the TMA 1900 and the display board 1800 are meant to be releasably attached as a combination to a safety truck through use of the mounting components 1810 and 1820 of the display board 1800.

The TMA 1900 may be made up of multiple sections attached through hinges and related attachment components that enable the TMA 1900 to be transitioned between a deployed position (i.e., a deployed state) in which the TMA 1900 extends horizontally rearward of a safety truck 1000 and a stowed position (i.e., a stowed state) in which the TMA 1900 is folded up and over the rear of the safety truck 1000. More specifically, and referring to FIG. 10A, the TMA 1900 may include at least two energy absorbing sections 1935 and 1949, where the energy absorbing section 1935 is attached to the base component 1830 of the display board 1800 by a hinge component 1923, and the energy absorbing sections 1935 and 1949 are attached by a hinge component 1937.

Figure 10A:
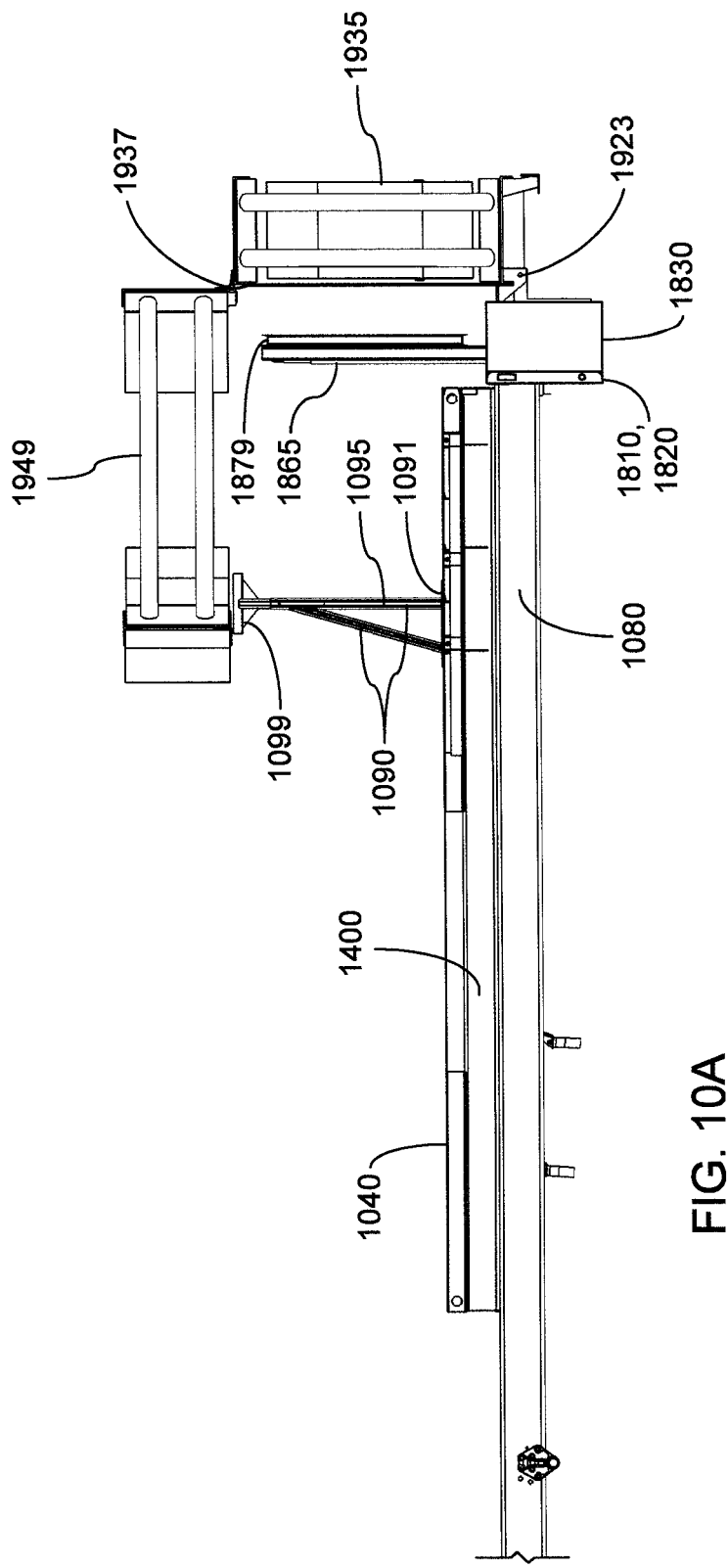
FIG. 10A is an elevational view, of rearward portions of a safety truck to which a combination of an embodiment of a display board and an embodiment of a TMA, both in a stowed state, have been attached.
Figure 10C:
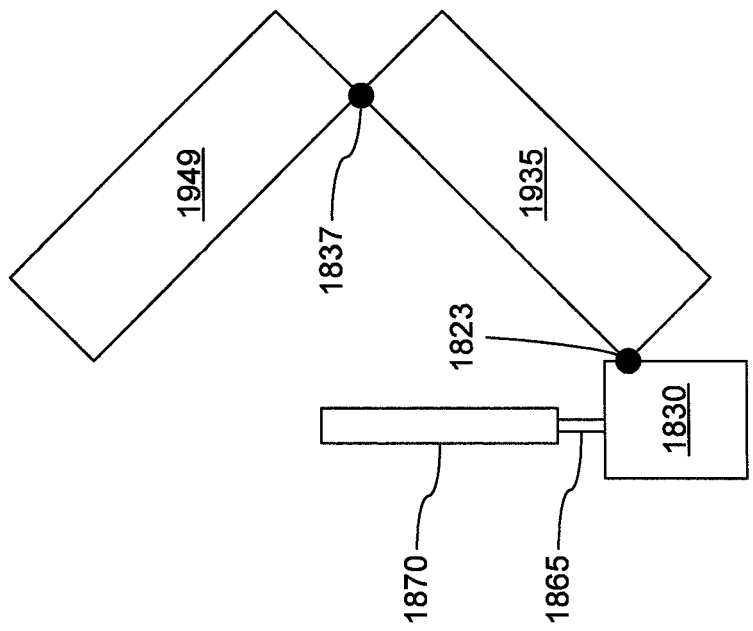
Figure 10B:
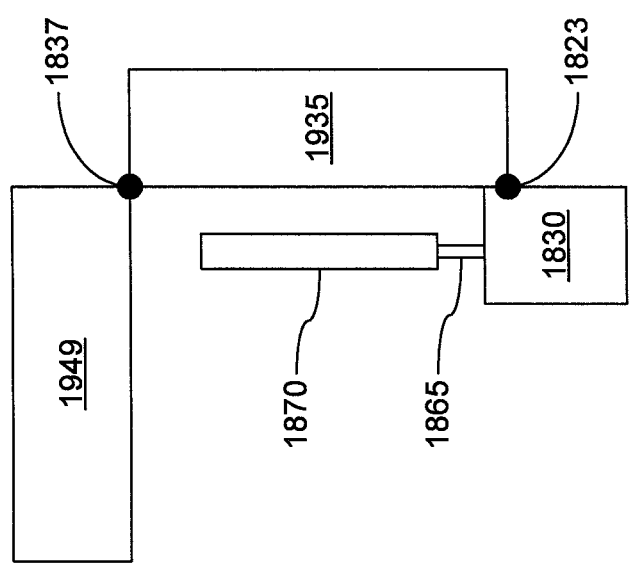
Figure 10F:
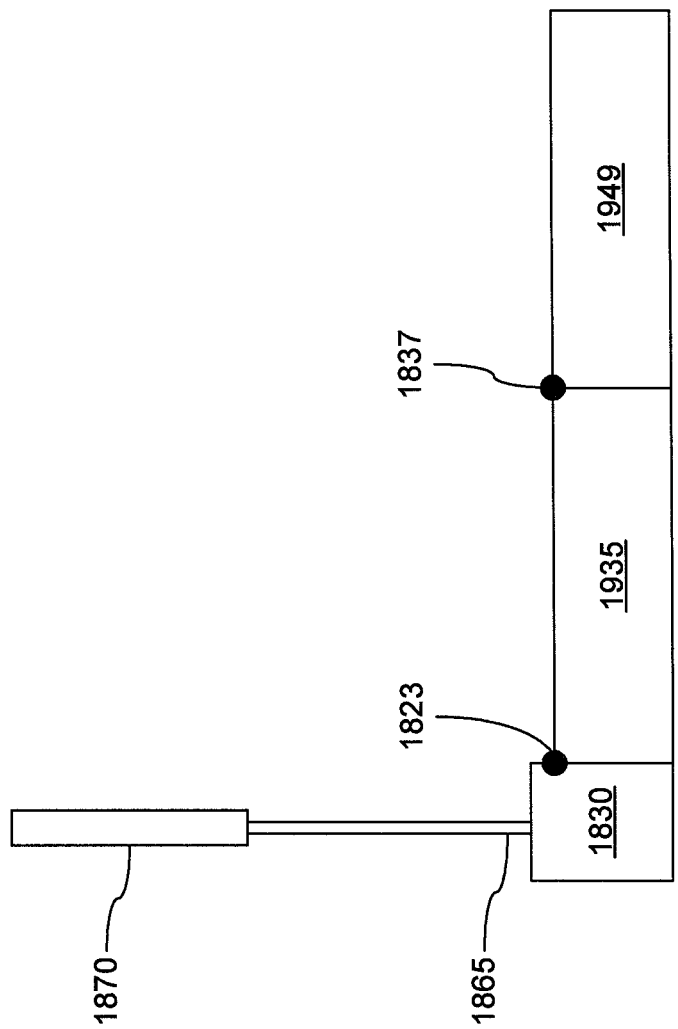

Each of the hinge components 1923 and 1937 may incorporate one or more linear and/or rotary actuators (not shown) to cause swinging of the hinge components 1923 and 1937 to cause movement of the energy absorbing components 1935 and 1949 between their deployed positions (such as is shown in FIG. 10F) and their stowed positions (such as is shown in FIG. 10E) relative to each other and relative to the base component 1830 of the display board 1800, and thereby, cause transitions of the TMA 1900 between its deployed and stowed positions.

At times when the TMA 1900 is folded into its stowed configuration, the energy absorbing section 1949 may be caused to rest atop a TMA support stand 1090. The TMA support stand 1090 may include a base plate 1091 attaching the TMA support stand 1090 to the upwardly facing surface of the flat bed 1040, one or more upwardly extending posts 1095 (that may form an A-frame, as depicted), and an engagement component 1099 on top of which the energy absorbing section 1949 may rest.

Referring more specifically to FIGS. 10B through 10F, in some embodiments, the deployment and stowing of the display board 1800 and the TMA 1900 may be automatically coordinated to aid in ensuring the correct use of both in improving the safety of a roadway work site. More specifically, a controller incorporated into the TMA 1900, the display board 1800 and/or into another portion of the safety truck 1000 (as will shortly be explained in greater detail) may operate the actuator(s) 1865 of the display board 1800 and the actuators incorporated into the hinge components 1923 and 1937 of the TMA 1900 to effect such coordinated deployment and/or stowage thereof. This may be deemed desirable to ensure that display board 1800 is always raised to a correct height that may be mandated by statute at times when the TMA 1900 is transitioned to its deployed configuration. Alternatively or additionally, this may be deemed desirable to prevent damage to the display board 1800 that may be caused by a collision therebetween.

Starting with FIG. 10B, in which the display board 1800 and the TMA 1900 are both in their stowed states, the actuators incorporated into the hinge components 1923 and 1937 may first be operated to transition the TMA 1900 from its stowed state to its deployed state, as depicted, in order, through FIG. 10C, then 10D, and then 10E. With the TMA 1900 fully transitioned to its deployed state in FIG. 10E, the actuators incorporated into the hinge components 1923 and 1937 may cease to be so operated (e.g., power may cease to be provided to the actuators incorporated into the hinge components 1923 and 1937), and instead, the actuator(s) 1965 of the display board 1800 may be operated to raise the display component 1870 of the display board 1800 from its stowed position depicted in FIG. 10E to its fully deployed position depicted in FIG. 10F. With both the display board 1800 and the TMA 1900 transitioned to their deployed states, the actuators associated with each may cease to be operated to effect any further movement.

Stowage of the display board 1800 and of the TMA 1900 may be performed by essentially reversing the sequence of events described in reference to FIGS. 10B through 10F. Starting with FIG. 10F, in which the display board 1800 and the TMA 1900 are both in their deployed states, the actuator(s) 1865 of the display board 1800 may first be operated to lower the display board 1800 from its deployed state to its stowed state, as depicted in FIG. 10E. With the display board 1800 fully transitioned to its stowed state in FIG. 10E, the actuator(s) 1865 may cease to be so operated, and instead, the actuators incorporated into the hinge components 1923 and 1937 may be operated transition the TMA 1900 from its deployed state to its stowed state, as depicted, in order, through FIG. 10D, then 10C, and then 10B. With both the display board 1800 and the TMA 1900 transitioned to their stowed states, the actuators associated with each may cease to be operated to effect any further movement.

Figure 10G:
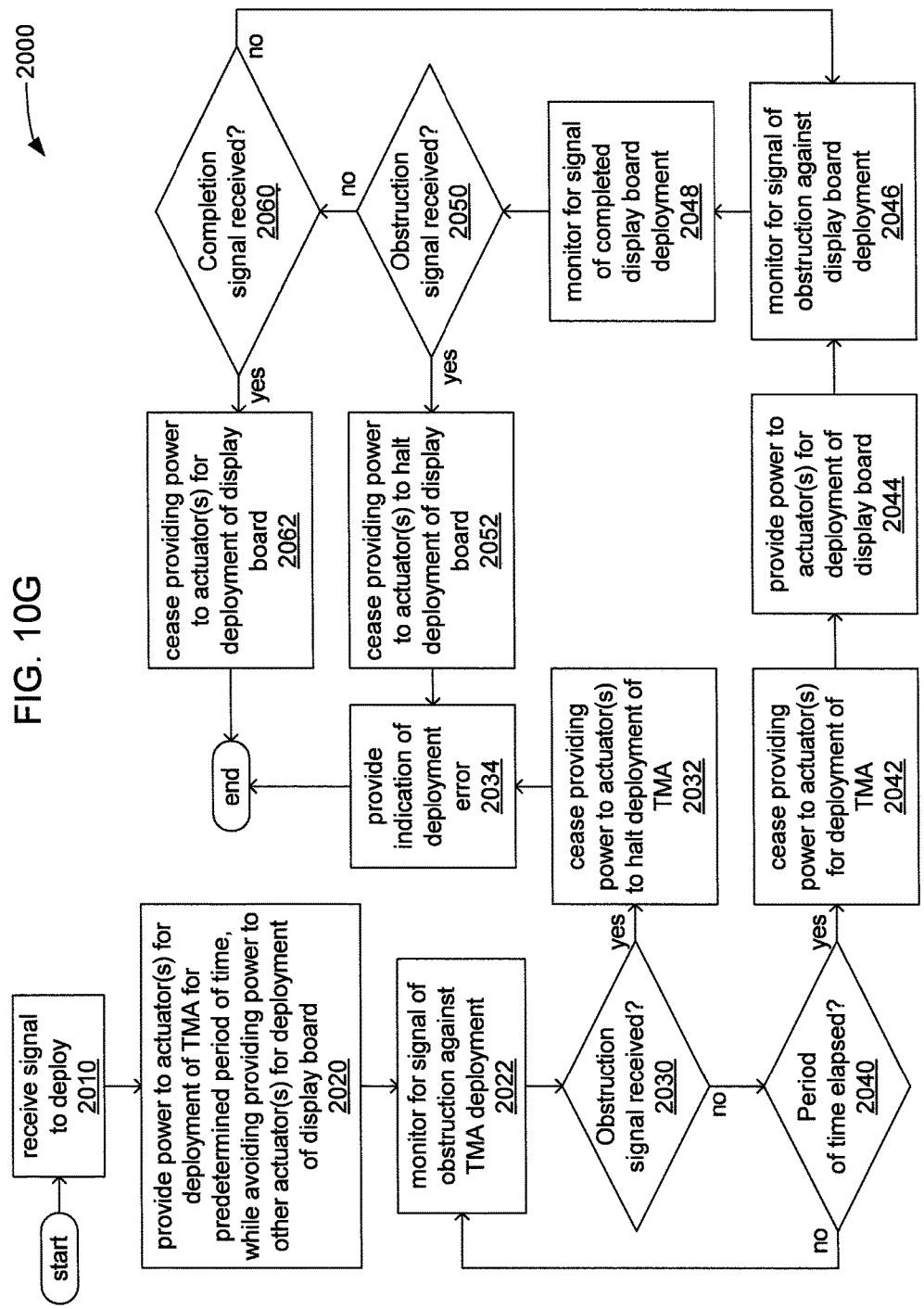
FIG. 10G is a flowchart of an embodiment of operations performed to deploy the combination of the display board and the TMA of FIG. 10A.

FIG. 10G provides a flowchart of the deployment of the display board 1800 and the TMA 1900 in greater detail. Starting at 2010, a controller incorporated into the display board 1800, the TMA 1900 and/or into another location within a safety truck 1000 to which the display board 1800 and the TMA 1900 are attached may receive a signal to deploy the display board 1800 and the TMA 1900. As will be explained in greater detail, such a signal may be received from a manually operable control connected to the controller via electrical or optical cabling, or wirelessly.

At 2020, in response to the received deployment signal, the controller may cause power to be provided to actuator(s) for deployment of the TMA 1900 (e.g., actuators incorporated into the hinge components 1923 and 1937), and may do so for a predetermined period of time deemed sufficient to cause full deployment of the TMA 1900. However, the controller may, at the same time, refrain from causing power to be provided to actuators for deployment of the display board 1800 (e.g., the actuator(s) 1865).

As the controller so operates the actuators for deployment of the TMA 1900, the controller may monitor for the receipt of a signal indicating detection of an obstruction against the deployment of the TMA 1900 (e.g., a proximity sensor) at 2022 while provision of power to the actuators for deployment of the TMA 1900 continues. At 2030, if such an obstruction signal is received, then the controller may cause power to cease to be provided to the actuators to halt the deployment of the TMA 1900 at 2032, and may provide an indication of a deployment error to an operator of the safety truck 1000 at 2034. As will be discussed in greater detail, such an error indication may be provided by a display connected to the controller via electrical or optical cabling, or wirelessly.

However, if no such obstruction signal is received at 2030, the controller may check at 2040 whether the predetermined period of time has elapsed. If not, then the monitor for an obstruction signal may continue at 2022. However, if the predetermined period of time has elapsed at 2040, then the controller may cause power to cease to be provided to the actuators for the deployment of the TMA 1900 at 2042, and may then cause power to be provided to actuator(s) for deployment of the display board at 2044.

It should be noted that such use of a predetermined period of time to determine when to cease the provision of power to actuators for deployment of the TMA 1900 and being the provision of power to actuators for deployment of the display board 1800 may be deemed desirable to avoid the use of a sensor to monitor the current position of the TMA 1900 as an approach to determining whether the TMA 1900 has been fully deployed to control such a sequenced provision of power among different actuators may be performed. As will be familiar to those skilled in the art, such sensors as may be used to detect full deployment of the TMA 1900 may easily become unreliable as a result of exposure to the elements. Thus, the use of a predetermined period of time during which the TMA 1900 is expected to be fully deployed as a result of provision of power to actuators to effect such deployment may be deemed more reliable.

It should be noted that such a sequenced provision of power, first to actuators for deployment of the TMA 1900, and then to actuator(s) for deployment of the display board 1800, may advantageously allow a power source of reduced capacity to be used in such a coordinated deployment of the TMA 1900 and the display board 1800. Where the actuators are electrically powered, this may aid in avoiding draining a battery of the safety truck 1000 in a situation in which electric power is available only from the battery and not from an engine of the safety truck 1000 (e.g., a situation in which the safety truck 1000 is out of fuel). Alternatively or additionally, where the actuators are hydraulically or pneumatically powered, this may allow a more compact and lighter weight pump and/or reservoir of fluid or gas to be used.

As the controller so operates the actuators for deployment of the display board 1800, the controller may monitor for the receipt of a signal indicating detection of an obstruction against the deployment of the display board 1800 (e.g., a proximity sensor) at 2046 and/or may monitor for the receipt of a signal indicating detection of full deployment of the display board 1800 at 2048. At 2050, if such an obstruction signal is received, then the controller may cause power to cease to be provided to the actuator(s) to halt the deployment of the display board 1800 at 2052, and may provide an indication of a deployment error to an operator of the safety truck 1000 at 2034.

However, if no such obstruction signal is received at 2050, the controller may check at 2060 whether a signal indicating full deployment of the display board 1800 has been received. If not, then the monitoring for an obstruction signal may continue at 2046 while provision of power to the actuators for the deployment of the display board 1800 continues. However, if the signal for full deployment of the display board 1800 is received at 2060, then the controller may cause power to cease to be provided to the actuators for deployment of the display board 1800 at 2062.

It should be noted that, in contrast to the use of sensor(s) to detect full deployment of the TMA 1900, the use of sensor(s) to detect full deployment of the display board 1800 may be deemed less problematic. This may be due to the fact that what must be done to deploy the display board 1800 is a simpler lifting action than what must be done to deploy the TMA 1900. As will be familiar to those skilled in the art, such a simpler lifting action may lend itself to a sensor being incorporated into an actuator of the display board 1800 and/or into another component of the display board 1800. As a result such use of a sensor to detect full deployment of the display board 1800 may be deemed more reliable than such use of a sensor to detect full deployment of the TMA 1900.

FIG. 10H provides a flow chart of the stowage of the display board 1800 and the TMA 1900 in greater detail. Starting at 2110, a controller incorporated into the display board 1800, the TMA 1900 and/or into another location within a safety truck 1000 to which the display board 1800 and the TMA 1900 are attached may receive a signal to stow the display board 1800 and the TMA 1900.

At 2120, in response to the received stowage signal, the controller may cause power to be provided to actuator(s) for stowage of the display board 1800 (e.g., the actuator(s) 1865). However, the controller may, at the same time, refrain from causing power to be provided to actuators for stowage of the TMA 1900 (e.g., actuators incorporated into the hinge components 1923 and 1937).

As the controller so operates the actuators for stowage of the display board 1800, the controller may monitor for the receipt of a signal indicating detection of an obstruction against the stowage of the display board 1800 at 2122 and/or may monitor for the receipt of a signal indicating detection of completion of stowage of the display board 1800 at 2124. At 2130, if such an obstruction signal is received, then the controller may cause power to cease to be provided to the actuators to halt the stowage of the display board 1800 at 2132, and may provide an indication of a deployment error to an operator of the safety truck 1000 at 2134.

However, if no such obstruction signal is received at 2130, the controller may check at 2140 whether the a signal indicating completion of stowage of the display board 1800 has been received. If not, then the monitor for an obstruction signal may continue at 2122. However, if the signal for completion of stowage of the display board 1800 has been received at 2140, then the controller may cause power to cease to be provided to the actuators for the stowage of the display board 1800 at 2142, and may then cause power to be provided to actuator(s) for stowage of the TMA 1900 at 2144 for a predetermined period of time.

As the controller so operates the actuators for stowage of the TMA 1900, the controller may monitor for the receipt of a signal indicating detection of an obstruction against the stowage of the TMA 1900 at 2146. At 2150, if such an obstruction signal is received, then the controller may cause power to cease to be provided to the actuator(s) to halt the stowage of the TMA 1900 at 2152, and may provide an indication of a deployment error to an operator of the safety truck 1000 at 2134.

However, if no such obstruction signal is received at 2150, the controller may check at 2160 whether the predetermined period of time has elapsed. If not, then the monitoring for an obstruction signal may continue at 2146 while provision of power to the actuators for the stowage of the TMA 1900 continues. However, if the predetermined period of time has elapsed at 2160, then the controller may cause power to cease to be provided to the actuators for stowage of the TMA 1900 at 2162.

Figure 11A:
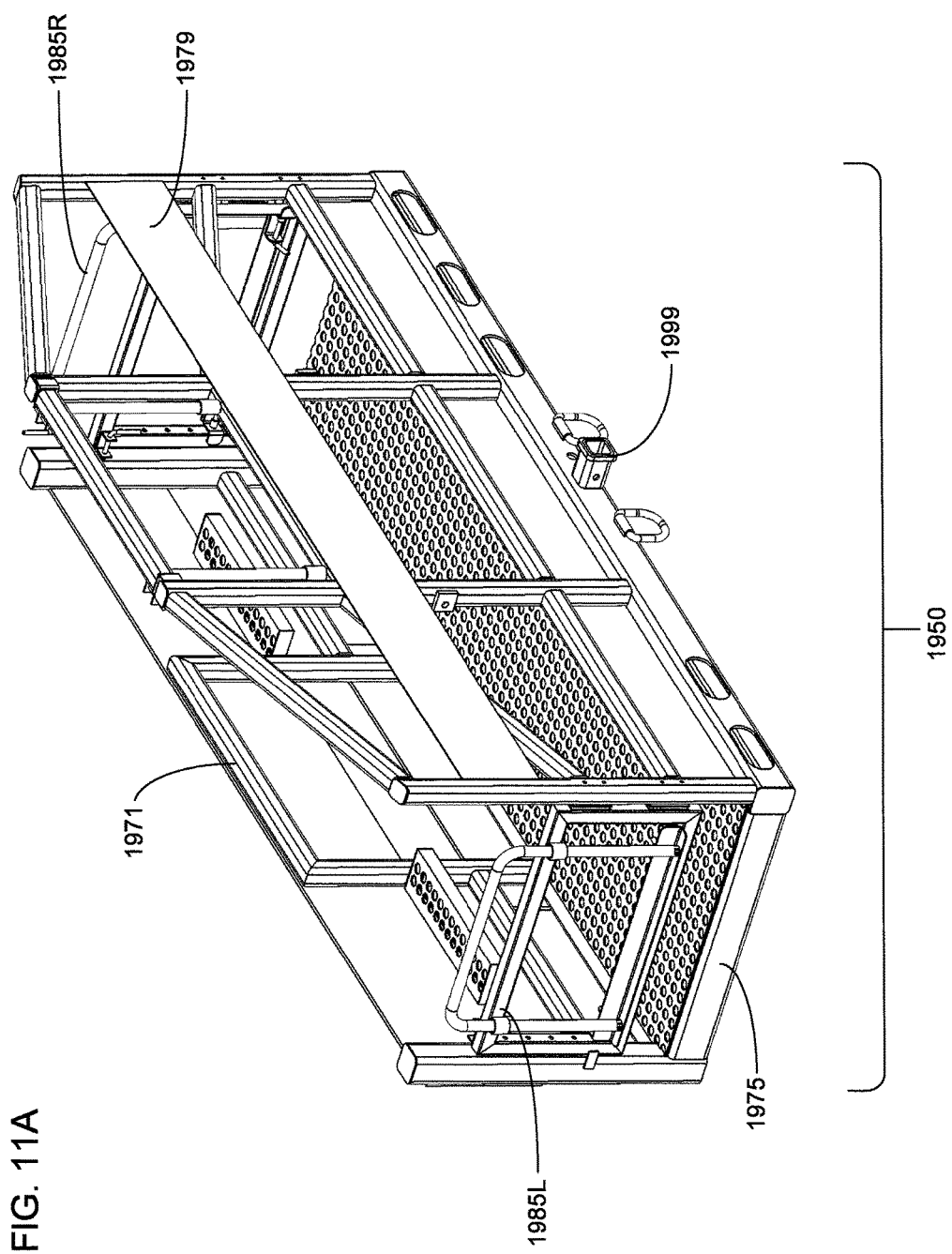
FIG. 11A is a perspective view, from above, the rear and the left side, of a safety basket to be releasably mounted to the rear end of a frame of the safety truck.
Figure 11B:
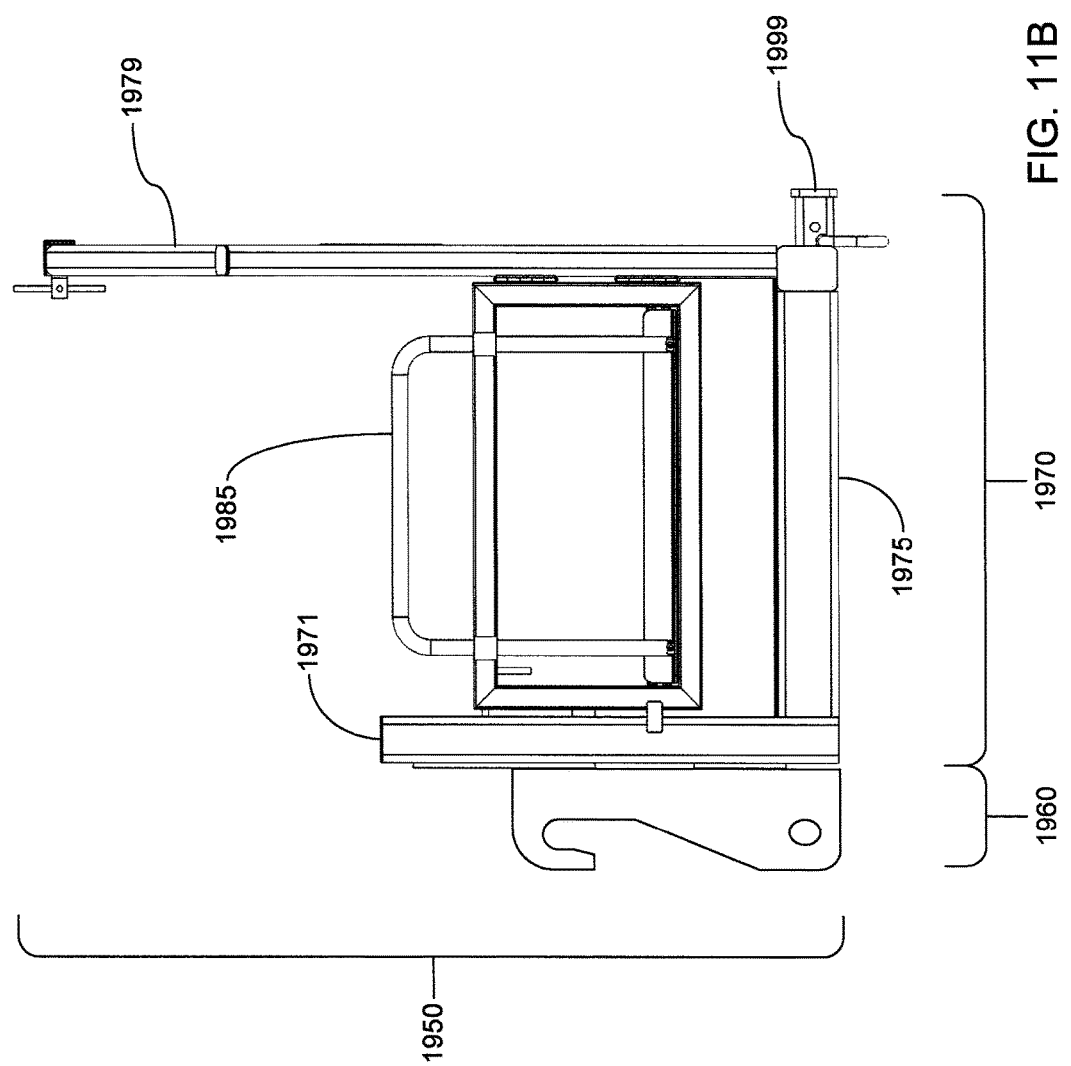
FIG. 11B is an elevational view of the safety basket of FIG. 11A, showing a mounting point to mate with the mounting point carried of FIG. 10A carried on the rear of the frame of a safety truck.

FIGS. 11A and 11B, taken together, depict various detailed aspects of an example embodiment of the safety basket 1950 that may be releasably attached to the rear end 1009 of safety truck 1000. The rumble strip basket 1100 may be attached to the rear end 1009 of an embodiment of the safety truck 1000 to provide a support platform at a level lower than the upwardly facing surface of the flat bed 1040 to enable construction personnel to more ergonomically place and/or collect warning signage and/or safety barriers onto or from a roadway 999.

The safety basket 1950 may include a mounting component 1960 and a basket component 1970. The mounting component 1960 may be substantially similar to the mounting component 1820 of display board 1800 to an extent that enables the safety basket 1950 to be releasably connected to the mounting component 1810 carried by the chassis frame 1080 in place of the display board 1800.

The basket component 1970 may include a generally rectangular open-top basket fabricated from metal tubing and/or rods providing a substantially vertical front wall 1971 to which the mounting component 1960 may be connected, and a substantially vertical rear wall 1979, and a floor 1975 atop which construction personnel may stand. At left and right ends of the basket component 1970, and extending between the walls 1971 and 1979 thereof, may be hinged gates 1985L and 1985R, respectively.

In some embodiments, the hinged gates 1985L and 1985R may be of a substantially similar design to the hinged gates 1621 and 1671 of the earlier described man baskets 1600 and 1650. More specifically, each of the hinged gates 1985L and 1985R may incorporate a height-adjustable bar that defines the upper edge of each to provide a flexible mechanism by which construction personnel standing within the safety basket 1950 may be flexibly, but safely, retained therein as they perform such tasks as the placement of warning signage and/or safety barriers onto a roadway 999, and/or removing warning signage and/or safety barriers therefrom, as the safety truck 1000 is driven slowly thereon.

As also depicted, the basket component 1970 may also include a hitch receiver 1999 that may take the form of a square 2-inch by 2-inch (or larger) receiver tube that, depending at least on the strength of the connection between the safety basket 1950 and the safety truck 1000, may conform to the specifications for a class III or IV (or higher) trailer hitch promulgated by SAE International. Thus, the hitch receiver 1999 may enable a trailer or other accessory to be releasably connected to the rear end 1009 of the safety truck 1000 through the safety basket 1950. By way of example, the earlier discussed rumble strip basket 1100 may be thusly attached to the rear end 1009 of the safety truck to enable the earlier described installation of rumble strips from the rear end 1009 of the safety truck 1000, instead of from the front end 1001 thereof.

Referring back to FIGS. 9A-C, as well as to FIG. 10A, although the base component 1830 of the display board 1800 and the TMA 1900 are depicted and discussed herein as being connected in a manner that, unlike the connection between the mounting components 1810 and 1820, is not intended to be releasable, it should be noted that other embodiments are possible in which the base component 1830 of the display board 1800 and the TMA 1900 are releasably connected through a mating pair of mounting components that may be substantially similar to the mounting components 1810 and 1820. Indeed, such a mating pair of mounting components may be shaped, sized and/or otherwise configured to enable the TMA 1900 to be alternately connected directly to the mounting component 1810 carried on the chassis frame 1080 of the safety truck and/or to enable the safety basket 1950 to be connected to the base component 1830 of the display board 1800 in place of the TMA 1900.

In embodiments in which the safety basket 1950 is able to be so connected to the base component 1830 of the display board 1800, the safety basket 1950 may additionally incorporate one or more actuators by which the level of the floor 1975 of the safety basket 1950 may be raised or lowered relative to the level of the flat bed 1040 and relative to a roadway 999 over which the safety basket 1950 may be positioned. In such embodiments, the safety basket 1950 may be raised to a stowage position (i.e., a stowage state) when not needed and lowered to a deployed position (i.e., a deployed state) when needed to enable such tasks as the ergonomic placement or collection of warning signage and/or safety barriers, as previously discussed. In such embodiments, a form of coordination in deployment of the display board 1800 and of the safety basket 1950 may be used that may be substantially similar to what has been previously described for coordinated deployment of the display board 1800 and the TMA 1900 to ensure that, like the TMA 1900, the safety basket 1950 is also not deployed without the display board 1800 also being properly deployed.

Alternatively or additionally, and referring back to FIG. 2A, as well as to FIGS. 9A-C, in an alternate embodiment of the safety truck 1000 that is not specifically depicted, a variant of the mounting component 1810 may alternatively or additionally be mounted to the front end 1001 of the safety truck 1000 to enable accessories such as a variant of the TMA 1900 or the safety basket 1950 to be mounted thereon. This may be deemed desirable to provide a platform on which construction personnel may stand at the front of the safety truck 1000 to perform repair and/or construction work at least partially in direct view of the driver of the safety truck 1000. Alternatively or additionally, this may be deemed desirable to accommodate a situation presented at a roadway work site at which it may prove desirable to provide the TMA 1900 on the front end 1001 of the safety truck 1000.

FIGS. 12A through 12H, taken together, depict various detailed aspects of an example embodiment of the controller 1500 that may be incorporated into an embodiment of the safety truck 1000 to implement and/or support various safety features thereof. The controller 1500 may be implemented with any of a variety of processing devices capable of performing a variety of recording, calculation and/or decision making operations. In some embodiments, at least core components of the controller 1500 may be installed within the cab 1020.

Figure 12A:
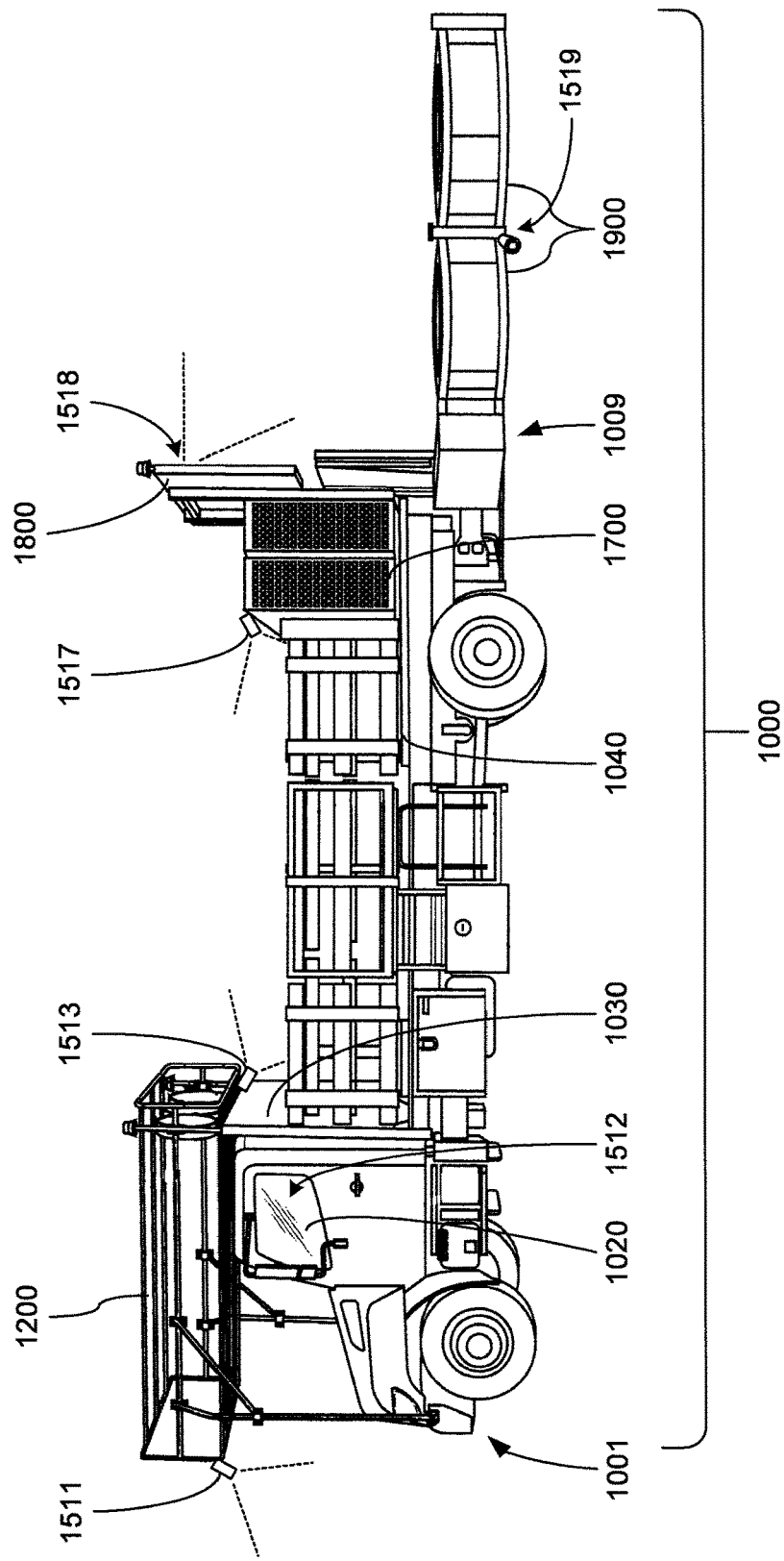
FIGS. 12A and 12B are elevational views, similar to FIGS. 1B and 1D, respectively, of the different embodiments thereof of the safety truck, each showing locations at which cameras may be carried by the safety truck.
Figure 12B:
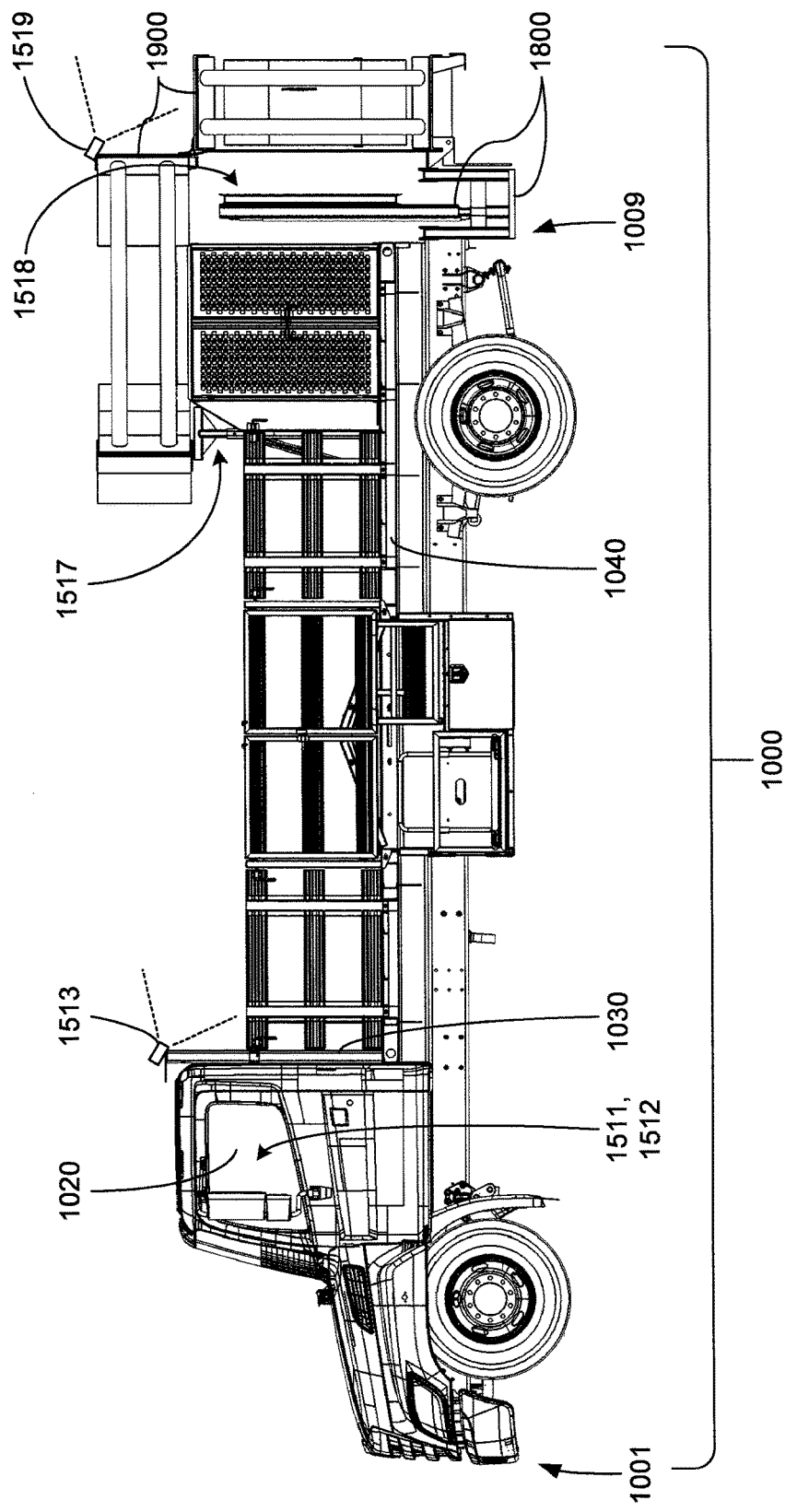
Figure 12C:
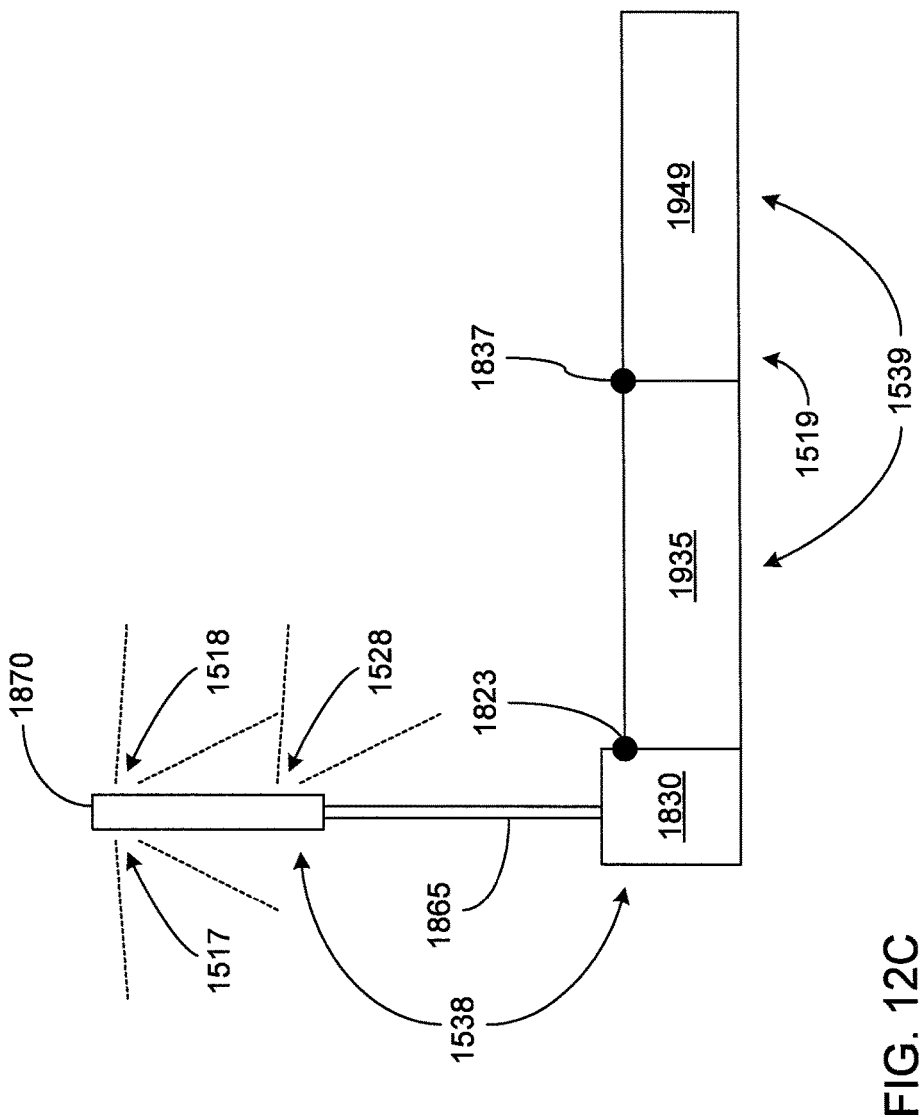
FIG. 12C is an elevational view, similar to FIG. 10F of the embodiment thereof of the display board, showing locations at which cameras and/or a radar may be carried by the display board.

Referring more specifically to FIGS. 12A-C, multiple devices that provide inputs to the controller 1500 may be carried at various locations throughout the length of a safety truck. Among such devices may be a set of cameras, including: a camera 1511 that may be carried either behind a windshield of the cab 1020 or on a portion of the over-cab barrel-type storage rack 1200 to capture imagery of the area in front of the safety truck 1000; a camera 1512 positioned within the cab 1020 to capture imagery of the driver of the safety truck 1000; a camera 1513 that may be carried on a portion of the bulkhead 1030 to capture imagery of events occurring on the flat bed 1040; a camera 1517 that may be carried either on a portion of the rearward sign cage 1700 or a forward-facing portion of the display board 1800 to capture imagery of events occurring on the flat bed 1040; a camera 1518 carried on a rearward-facing portion of the display board 1800 to capture imagery of the area behind the safety truck 1000; and/or a camera 1519 carried on one of the sections 1935 or 1949 to capture imagery of the area behind the safety truck 1000. The imagery captured by each of these cameras and provided to the controller 1500 for storage may include motion video and/or still images (e.g., sequences of still images captured at a recurring interval).

Figure 12D:
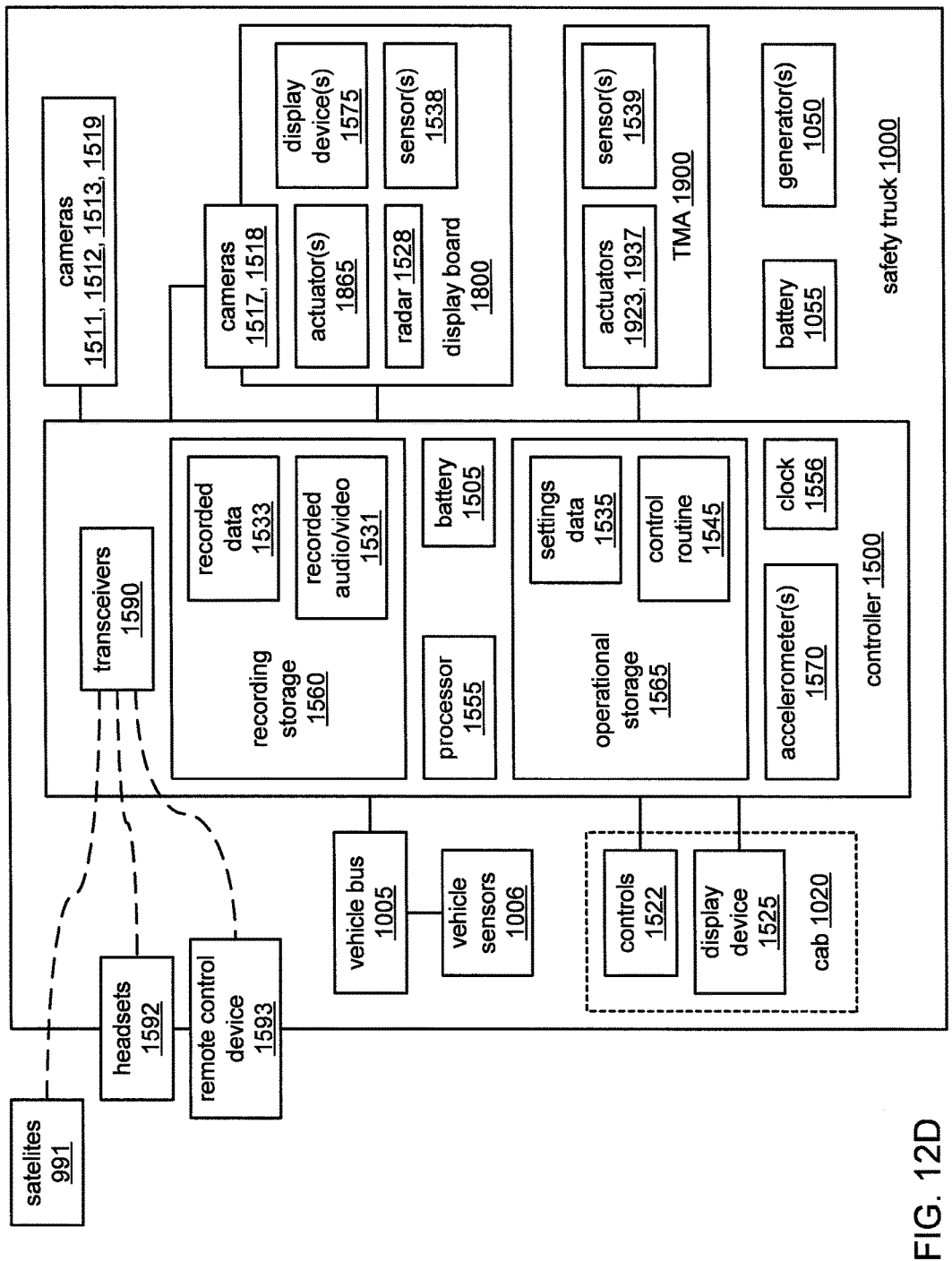
FIG. 12D is a block diagram of an embodiment of an architecture of a controller of the safety truck.

Referring more specifically to FIGS. 12C-D, among the devices providing inputs to the controller 1500 may also be various sensors that detect various aspects of the operation of the safety truck 1000 and/or its safety features. Such sensors may include: one or more sensors 1538 that may be incorporated into the display board 1800 to detect deployment and/or stowage thereof; one or more sensors 1539 that may be incorporated into the TMA 1900 to detect deployment and/or stowage thereof; and/or one or more vehicle sensors 1006 incorporated into the engine, transmission, brakes and/or other components of the safety truck 1000, and which may be made accessible to the controller 1500 through an implementation of a vehicle bus 1005 serving as an internal network of the safety truck 1000 by which such components of the safety truck 1000 may exchange information pertinent to the operation of those components. Additionally among the sensors carried at various locations throughout the safety truck 1000 may be a speed detection radar 1528 incorporated into a portion of the display board 1800 to detect the speeds of vehicles approaching the safety truck 1000 from behind, at least at times when the display board 1800 is deployed.

Also among the devices providing inputs to the controller 1500 may be various devices incorporating microphones by which speech sounds and/or other sounds may be captured and provided to the controller 1500 for storage. Such microphones may include: microphone(s) incorporated into one or more of the cameras 1511, 1512, 1513, 1517, 1518 and 1519; one or more separate microphones that may be installed in portions of the safety truck 1000 that are used to carry personnel, such as within the cab 1020; and/or microphone(s) incorporated into each of multiple headsets 1592 that may be wirelessly coupled to the controller 1500, and may use the controller 1500 as a base station to enable the exchange of voice communications among the multiple headsets 1592.

In addition to various devices carried at various locations throughout the length of the safety truck 1000 that provide inputs to the controller 1500, some of the same devices and/or other devices may receive outputs from the controller 1500. Continuing to refer more specifically to FIGS. 12C-D, the devices receiving outputs from the controller 1500 may include one or more display devices 1575 incorporated into the display board 1800 to present visual indications to motorists of current speed limit, the speeds at which the motorists are detected as driving, various messages conveying safety information, notices of the fact that motorists are being video recorded, and/or portions of captured video of the motorists to emphasize that they are being video recorded. Alternatively or additionally, the devices receiving outputs from the controller 1500 may include one or more actuators incorporated into various safety features of the safety truck 1000 to permit automated control thereof, including and not limited to, the actuator(s) 1865 incorporated into the display board 1800 and/or the actuators, 1923 and/or 1937 incorporated into the TMA 1900. Also alternatively or additionally, the devices receiving outputs from the controller 1500 may include the aforementioned headsets 1592 to which the controller 1500 may transmit various informational sounds to provide indications of various conditions, such as warning sounds of a detected, developing and/or potential dangerous situation.

Also among the devices receiving outputs from the controller 1500 may be various devices with which the controller 1500 may communicate to provide a user interface to construction personnel for operating and/or configuring the controller 1500 and/or various safety features of the safety truck, and/or for viewing video imagery captured by the one or more earlier described cameras carried by the safety truck 1000. Such devices may include a combination of manually operable controls 1522 and a display 1525 that may be installed within the cab 1020 for operation by personnel located therein. The display 1525 may be any of a variety of types of display based on any of a variety of technologies, including and not limited to, LCD, OLED, EL, plasma, etc. In some embodiments, the controls 1522 may include any of a variety of mechanical manually operable controls, including and not limited to, rotary knobs, depressible buttons, rocker and/or lever switches, etc. Alternatively or additionally, the controls 1522 may include stationary touch-sensitive sensors and/or other forms of sensor capable of detecting contact by human digits, including and not limited to, capacitive, resistive and/or strain-gauge based touch-sensitive components. Also alternatively or additionally, the controls 1522 may include one or more touch-sensitive components that overlie the display 1525 such that the controls 1522 and the display 1525 are combined to form a touch-sensitive display.

As an alternative to, or in addition to, the combination of controls 1522 and the display 1525, such devices may alternatively or additionally include a remote control device 1593 that may be wirelessly linked to the controller 1500 to perform similar functions as the combination of controls 1522 and display 1525 while located either within the cab 1020, or elsewhere on or in the vicinity of the safety truck 1000. In some embodiments, the remote control device 1593 may include a hand-holdable remote control incorporating one or more manually operable controls (e.g., depressible buttons, etc.) that emits infrared and/or radio frequency signals to the controller 1500. In other embodiments, the remote control device 1593 may include a tablet computer, a smart phone or other portable processing device that may execute an application routine to provide a user interface for use by construction personnel to interact with the controller 1500.

Referring more specifically to FIG. 12D, the controller 1500 may be capable of drawing electric power from multiple sources, including an internal battery 1505, a battery 1055 of the safety truck 1000 (e.g., the battery normally employed in the operation of the engine of the safety truck 1000), and/or one or more generators 1050 of the safety truck 1000 (e.g., an alternator coupled to the engine of the safety truck 1000 and/or an entirely separate generator incorporated into the safety truck 1000 to power devices unrelated to the engine). As will be familiar to those skilled in the art, a safety truck maintained at a stationary position while operating an illuminated display to provide warnings to motorists typically require an ongoing supply of electric power from either a battery (or other electric power storage device) of considerable capacity or an electric generator, such as a generator coupled to an engine (e.g., an internal combustion of the safety truck 1000) or a fuel cell.

However, as will also be familiar to those skilled in the art, the internal combustion engines employed in driving relatively large trucks are often ill suited to being used simply to provide electric power to electrical devices carried by such trucks. The large size of such engines usually results in inefficient consumption of fuel at a high rate, which can lead to complete depletion of a fuel tank within a single day or night. Also, such engines are typically designed with a presumption that there will be recurring access to an airflow arising from forward movement of the truck such that components thereof may tend to overheat and/or be damaged if operated for an extended period of time without access to such an airflow as a result of the truck remaining stationary throughout. Further, such inefficient fuel consumption and/or the overheating of one or more engine components can result in the emission of excessive levels of pollutants that may be cause such operation of a truck to violate emission regulations and/or laws.

In response to such issues, embodiments of the safety truck 1000 may incorporate an additional electric generator 1050 that operates entirely independently of the engine of the safety truck 1000. Such a generator may draw fuel from the same fuel tank as the engine that is used to drive the safety truck 1000, but may do so at a considerably reduced rate, while still providing the amount of electric power needed to operate the various safety features of the safety truck 1000. In some of such embodiments, such a generator may be provided with a fuel inlet within the shared fuel tank that is at a different elevation in comparison to the fuel inlet used by the engine of the safety truck 1000. Such a difference in elevation may be to allow the engine of the safety truck 1000 to fully drain the shared fuel tank, but to not allow the generator 1050 to do so. Thus, in a situation in which such an embodiment of the safety truck 1000 is used unattended overnight, the generator 1050 may drain the fuel tank to only a limited extent that still leaves an amount of fuel within the fuel tank that enables the engine of the safety truck 1000 to be used to drive to a location where more fuel may be obtained.

Regardless of what provision may be made for such a separate electric generator 1050 to be supplied with fuel, in some embodiments, such an electric generator may not run continuously to provide electric power to safety features of the safety truck 1000. Instead, such a separate electric generator 1050 may be triggered to generate electric power to recharge the battery 1055 in response to the voltage level of the battery 1055 falling below a predetermined voltage level. Such a generator 1050 may then continue to recharge the battery 1050 either until the voltage level thereof rises above another predetermined voltage level or until the amount of current flowing between the generator 1050 and the battery 1055 reaches a predetermined level indicative of the battery 1055 having been successfully recharged to a predetermined degree.

Regardless of what provision may be made for the availability of electric power from a generator, the controller 1500 may additionally include the internal battery 1505 to allow at least some functionality of the controller 1500 to continue for at least some amount of time without the provision of any electric power from any source external to the controller 1500. As will shortly be explained, this may be deemed desirable to enable the capture and recording of details of a vehicular collision for some amount of time after an embodiment of the safety truck 1000 has been parked and fully turned off.

Continuing to refer to FIG. 12D, the controller 1500 may include the internal battery 1505, a processor 1555, a clock circuit 1556, recording storage 1560, operational storage 1565, one or more accelerometers 1570, and/or one or more wireless transceivers 1590. The processor 1555 may be any of a variety of types of processor based on any of a variety of processing technologies, including and not limited to, a microcontroller, a sequencer, programmable gate array logic, a complex instruction set computing (CISC) processor, a reduced instruction set computing (RISC) processor, a highly parallel graphics processing unit (GPU), etc. The clock 1556 may be any of a variety of types of timing keeping, time delay or other device capable of monitoring and/or providing an indication of the elapsing of a selected amount of time.

The recording storage 1560 may include one or more storage devices based on any of a variety of storage technologies (or combination of storage technologies) that is capable of retaining at least some amount of data absent the ongoing provision of electric power (e.g., a non-volatile storage technology). In some embodiments, in response to the fact that the safety truck 1000 may be collided with by another vehicle, the recording storage 1560 may be at least partially implemented with a form of solid state non-volatile storage technology (e.g., NAND FLASH memory) to be more resistant to damage from a vehicular impact. The operating storage 1565 may include one or more storage devices based on any of a variety of storage technologies (or combination of storage technologies) that is capable of providing sufficient speed of access to data to enable the processor 1555 to perform various functions. As will be familiar to those skilled in the art, such storage technologies may include volatile storage technologies requiring an uninterrupted supply of electric power to retain data, such as any of a variety of types of random access memory (RAM).

As depicted, the recording storage 1560 may be used to store recorded audio/video 1531, including and not limited to, imagery captured by cameras and/or audio captured by microphones. The recording storage 1560 may also be used to store recorded data 1533, which may include any of a variety of forms of data other than captured audio and/or video. The capacity of the recording storage 1560 may be selected to enable multiple hours, multiple days and/or multiple weeks of data, such as captured audio and/or video to enable data associated with significant events (e.g., vehicular collisions) that may have occurred at some amount of time in the past to be retrieved. As also depicted, the operational storage 1565 may be used to store a control routine 1545 that includes executable instructions that are operable on the processor 1555 to cause the processor 1555 to perform various functions as will be described in greater detail. Alternatively or additionally, the operational storage 1565 may be used to store settings data 1535 the may include indications of various setting values that may control various aspects of the operations that the processor 1555 is caused by the control routine 1545 to perform, as will also be described in greater detail.

Each of the one or more accelerometers 1570 may be based on any of a variety of technologies for sensing changes in direction and/or magnitude of motion, including and not limited to micro-electromechanical systems (MEMS) technology. In some embodiments, multiple accelerometers 1570 may be employed in a configuration in which each is oriented different from the others to sense a change in magnitude of motion (i.e., sense an acceleration or deceleration) along a different axis. In other embodiments, a single multi-dimensionally sensitive accelerometer 1570 may be used.

As has been discussed, a wide variety of differing wireless devices may be used in conjunction with various possible embodiments of the controller 1500. Thus, in some embodiments, more than the controller 1500 may incorporate more than one transceiver 1590 with each configured to engage in wireless communications using any of a variety of wireless communications technologies (e.g., infrared, ultrasound, radio frequency, etc.) within any of a variety of communications frequency bands and/or employing any of a variety of different communications protocols.

Figure 12E:
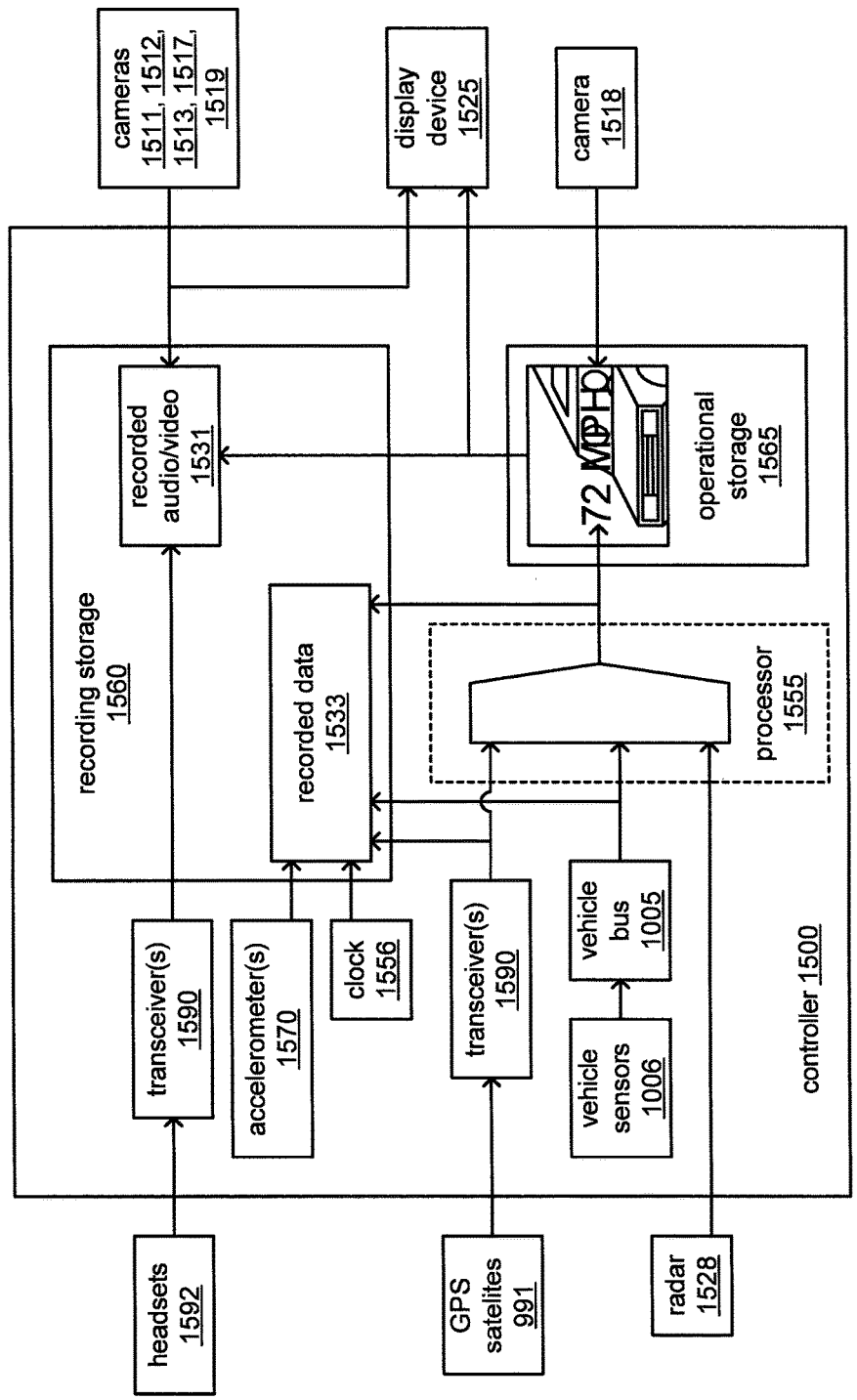
FIG. 12E is a block diagram depicting aspects of using the controller of FIG. 12D to capture and record aspects of vehicular activity occurring in the vicinity of the safety truck.

Referring more specifically to FIG. 12E, as previously discussed, the controller 1500 may be operated to cooperate with at least the cameras 1511, 1512, 1513, 1517, 1518 and/or 1519 to capture and then store imagery associated with conditions in the vicinity of an embodiment of the safety truck 1000, including conditions leading up to a vehicular collision with the safety truck 1000. As depicted, the processor 1555 may be caused, by its execution of the instructions of the control routine 1545, to receive imagery (e.g., motion video and/or still images) captured by one or more of the cameras 1511, 1512, 1513, 1517 and 1519, and to store that captured imagery as part of the recorded audio/video 1531 within the recorded storage 1560.

Alternatively or additionally, the processor 1555 may be similarly caused to store captured audio received through at least one transceiver 1590 from one or more of the headsets 1592. As previously discussed, the controller 1500 may be employed as a base station with which multiple ones of the headsets 1592 may exchange wireless signals conveying voice sounds, and through which those voice sounds may be retransmitted among the multiple headsets 1592 to enable bidirectional voice communications thereamong through the controller 1500. In so doing, the processor 1555 may be caused to recurringly engage in exchanges of various control signals and/or other protocol signals with one or more of the headsets 1592 to establish and/or maintain wireless links with each. Such exchanges may also include a pairing protocol by which the processor 1555 is caused to perform the pairing of each of the headsets 1592 with the controller 1500.

In addition to being caused to store captured audio and/or video, the processor 1555 may also be caused to store non-audio and/or non-video data provided by one or more other devices incorporated into an embodiment of the safety truck 1000 as the recorded data 1533. Such data storage may be performed at a recurring interval of time that may be selected to provide at least a desired minimal temporal granularity, while not tending to excessively consume the storage space provided by the recording storage 1560. Such data may include, and not be limited to, indications of the current time and/or date received from the clock 1556 (e.g., a recurringly updated timestamp), indications of any currently occurring accelerations of the safety truck 1000 as indicated by the one or more accelerometers 1570, indications of the current geographic location of the safety truck as provided by GPS satellites 991 through one or more transceivers 1590, and/or one or more indications of the current operating conditions of the safety truck 1000 as provided by one or more vehicle sensors 1006 through a connection to the vehicle bus 1005 (e.g., indications of current speed, current gear selection, current operation of the steering wheel, current engine revolutions per minute, current engagement of any of the brakes of the safety truck 1000, etc.).

The processor 1555 may also be caused to monitor for and receive indications of speeds detected by the speed detection radar 1528 that may be incorporated into the display board 1800. In some embodiments, the processor 1555 may simply be caused to also store such indications of detected speeds as part of the recorded data 1533. However, as depicted, in other embodiments, the processor 1555 may alternatively or additionally be caused to perform various processing operations on such indications of detected speeds using other data to adjust for the current speed and/or direction of travel of the safety truck. As will be familiar to those skilled in the art, an indication of a speed detected by the speed detection radar 1528 may, in truth, be an indication of the speed of a vehicle relative to the safety truck 1000, and not relative to a roadway 999. As a result, at a time when the safety truck 1000 is also in motion, the indication of a detected speed provided by the speed detection radar 1528 may provide a misleading indication of how fast a vehicle is actually traveling. The processor 1555 may be caused to use an indication of the current speed of the safety truck 1000 provide either by a speed sensor (i.e., one of the vehicle sensors 1006) of the safety truck 1000 through the vehicle bus 1005, or by employing a speed of the safety truck 1000 that is calculated from the rate of change in geographic positions indicated by GPS data received from GPS satellites 991 through appropriate configured transceiver(s) 1590. The processor 1555 may be caused to perform such corrective calculations of detected vehicle speeds on a recurring interval of time.

With such a corrected speed for a vehicle so derived, the processor 1555 may then combine the corrected vehicle speed with captured video of the vehicle received from the camera 1518, which may be incorporated into the display board 1800 in a position and orientation relative to the speed detection radar 1528 that causes the fields of view of the camera 1518 and the radar 1528 to at least significantly overlap to the extent that there is at least a relatively high likelihood that a vehicle speed detected by the radar 1528 will be associated with the vehicle image captured by the camera 1518. To so combine the corrected vehicle speed with the captured video from the camera 1518, the processor 1550 may overlay a textual representation of the corrected vehicle speed onto frames of the image of the vehicle captured by the camera 1518. The processor 1555 may then store the captured video with the textual overlay as part of the recorded audio/video 1531.

In addition to recording audio, video and/or recurring indications of various pieces of data, the processor 1555 may also be caused to store an indication of when a vehicular collision involving the safety truck 1000 has occurred (e.g., a timestamp). In some embodiments, the processor 1555 may be trigger to store such an indication of such an event based on receiving an indication from the one or more accelerometers 1570 of the detection of an acceleration meeting one or more characteristics deemed consistent with such a collision (e.g., a predetermined threshold magnitude of acceleration, a threshold magnitude of rate of change in velocity and/or acceleration, a range of direction along which an acceleration consistent with a collision is expected to occur, etc.). The processor 1555 may be caused to store such a timestamp as part of the recorded audio/video 1531 and/or as part of the recorded data 1533. Regardless of the exact manner in which such a timestamp is recorded, the recordation of such a timestamp may be used by the processor 1555 to designate a portion of the recorded audio/video 1531 preceding and/or following the timestamp by predetermined amounts of time as a portion thereof that is not to be overwritten while continuing to record more captured audio and/or video.

As will be familiar to those skilled in the art, many audio/video recording systems employ a ring-buffer architecture in which the oldest data (e.g., the oldest recorded audio and/or video) within the buffer is always the data that is to be overwritten when new data is received for storage. However, with an indication having been stored of when a vehicle collision has occurred, a portion of the recorded audio/video 1531 leading up to and/or following that timestamp is effectively removed from such treatment as part of a ring buffer, and may be retained until personnel provide an indication to the controller 1500 that it can be overwritten, and/or until a selected relatively lengthy period of time has elapsed (e.g., multiple weeks or months).

In addition to performing such recording operations, the processor 1555 may also be caused to operate the display device 1525 to display imagery (e.g., motion video and/or still images) captured from one or more of the cameras 1511, 1512, 1513, 1517, 1518 and 1519. Where captured imagery from more than one camera is to be display, the processor 1555 may be caused to arrange the imagery captured from each of multiple ones of these cameras in a tiled manner (e.g., two display regions side-by-side, four display regions arranged in a 2×2 array, etc.). In displaying the captured imagery received from the camera 1518, the processor 1555 may be caused to display such imagery with the overlain textual indication of the speed of an approaching vehicle. There may also be occasions where the processor 1555 may be caused to override a manual selection of which camera's captured imagery is to be displayed. By way of example, and as can be appreciated by comparing the relative positions of the cameras 1518 and 1519 depicted in FIGS. 12A and 12B, depending on whether or not the TMA 1900 is in its deployed or stowed position, one or other of the cameras 1518 and 1519 may be prevented from effectively providing a view of the area behind the safety truck 1000. To address this, the processor 1555 may automatically switch between visually presenting captured imagery from the camera 1518 and visually presenting captured imagery from the camera 1519, depending at least on the position of the TMA 1900. By way of another example, where the processor 1555 receives an indication (e.g., from a sensor 1006 via the vehicle bus 1005) of the safety truck 1000 being driven in reverse and/or being prepared to be driven in reverse (e.g., where a shift lever of the transmission of the safety truck is detected to have been moved to select a reverse gear), the processor 1555 may automatically switch the view provided on the display 1525 to a view of the area behind the safety truck 1000 to enable the display 1525 to be used by a driver thereof to watch for obstacles behind the safety truck 1000.

Figure 12F:
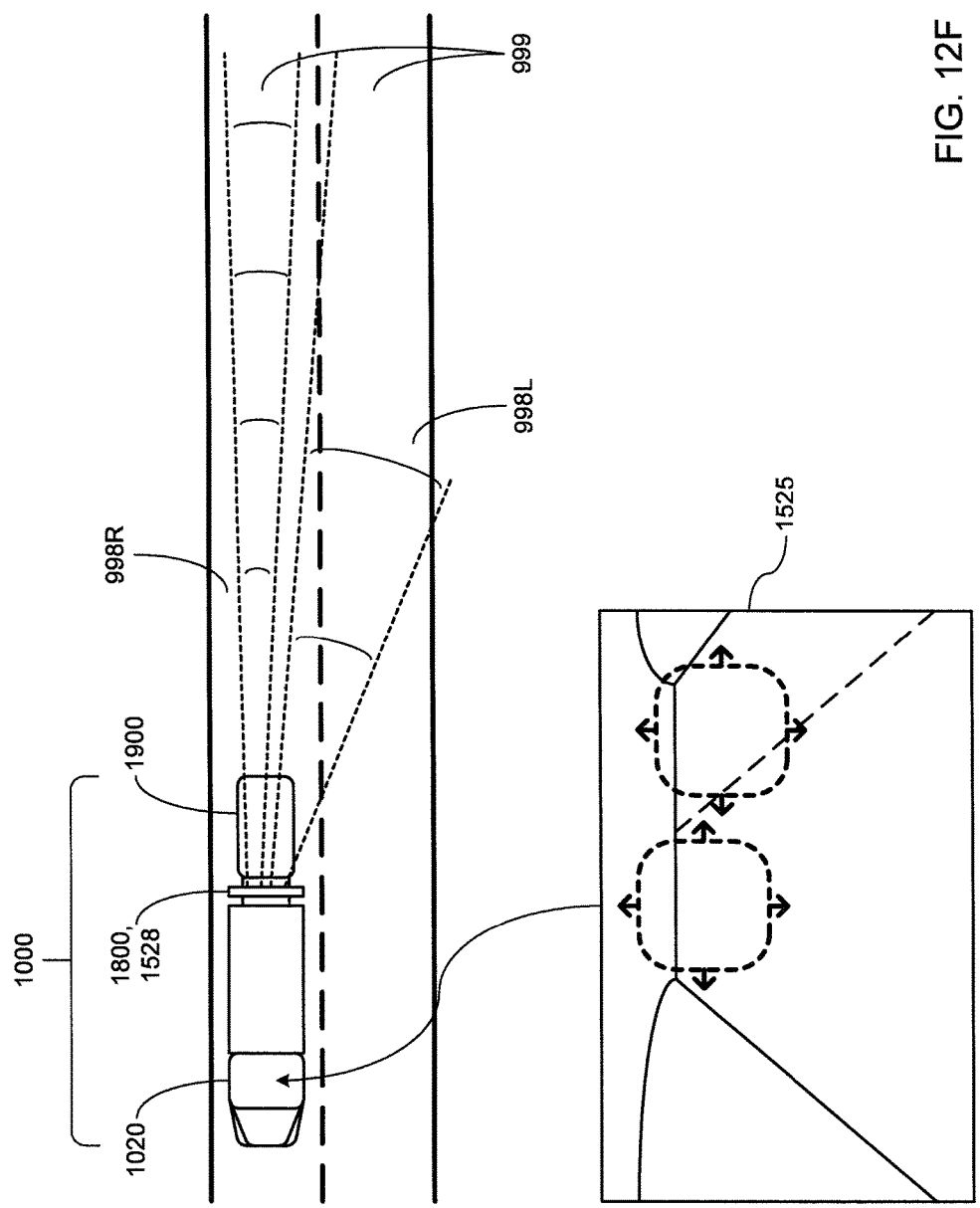
FIG. 12F is a combination of an overhead view of a roadway and an elevational view of a display within a cab of the safety truck, showing aspects of using the controller of FIG. 12D to configure a radar to separately cover each of multiple lanes of the roadway.

Referring more specifically to FIG. 12F, in some embodiments, the speed detection radar 1528 may be operable to provide separate indications of different speeds of different vehicles detected in different portions of its field of view, and/or the controller 1500 may cooperate with the speed detection radar 1528 to provide such a capability. Alternatively or additionally, the display board 1800 may incorporate more than one of the speed detection radar 1528, with each being capable of having its field of view being independently aimed. Or, as still another alternative, various adjustable antenna components and/or physical beam guides may be used with a single speed detection radar 1528 or with multiple ones thereof to effect such independent aiming of multiple fields of view.

Regardless of the exact manner in which the capability of independently aiming more than one field of view for the use of radar to detect vehicle speeds, in some embodiments, the processor 1555 may be caused by its execution of the instructions of the control routine 1545 to use at least a display device (e.g., the display 1525 or a display of the remote control device 1593) to provide a user interface to construction personnel by which a form of graphical marker may be displayed in a manner overlying the field of view of the camera 1518 to enable individual aiming of each of multiple separate radar fields of view. In this way, and as depicted, a separate radar field of view of may be aimed to cover each of multiple lanes of a roadway 999. For example, and as depicted, where a safety truck 1000 occupies the right lane 998R of a two-lane roadway 999, and the left lane 998L thereof passes to the left of the safety truck 1000, one of two separately aimable radar fields of view may be aimed to extend along the right lane 998R while the other aimable radar field of view may be aimed to extend at least substantially along the left lane 998L.

In this way, greater precision may be imparted to the detection of the speed of a vehicle that is to pass a safety truck 1000 in a particular lane such that any indication of the speed of that vehicle that is displayed by the display board 1800 is more likely to be correctly associated with that particular vehicle. Additionally, such greater precision may also be imparted to the detection of the speed of a vehicle that collides with the safety truck 1000, since its speed is detected entirely separately from the speed detection performed with vehicles that pass the safety truck 1000 in the adjacent lane. This may be deemed advantageous at a later official proceedings concerning the vehicular collision as there is less uncertainty as to whether the speed detected at the time of the vehicular collision is of the colliding vehicle or is of a vehicle that may have coincidentally been passing the safety truck at the time of the crash.

To take better advantage of the detection of multiple vehicular speeds, each associated with a different lane of a roadway 999, the graphical markers used to guide the separate aiming of each radar field of view may also be used to designate what portion of the imagery captured by the camera 1918 are to be overlain with the detected speed associated with each separate radar field of view. In this way, and referring briefly to FIG. 12E in addition to FIG. 12F, the processor 1555 may be caused to overlay multiple textual indications of detected speeds onto frames of the video captured by the camera 1918, with each such textual indication corresponding to a different radar field of view.

Figure 12G:
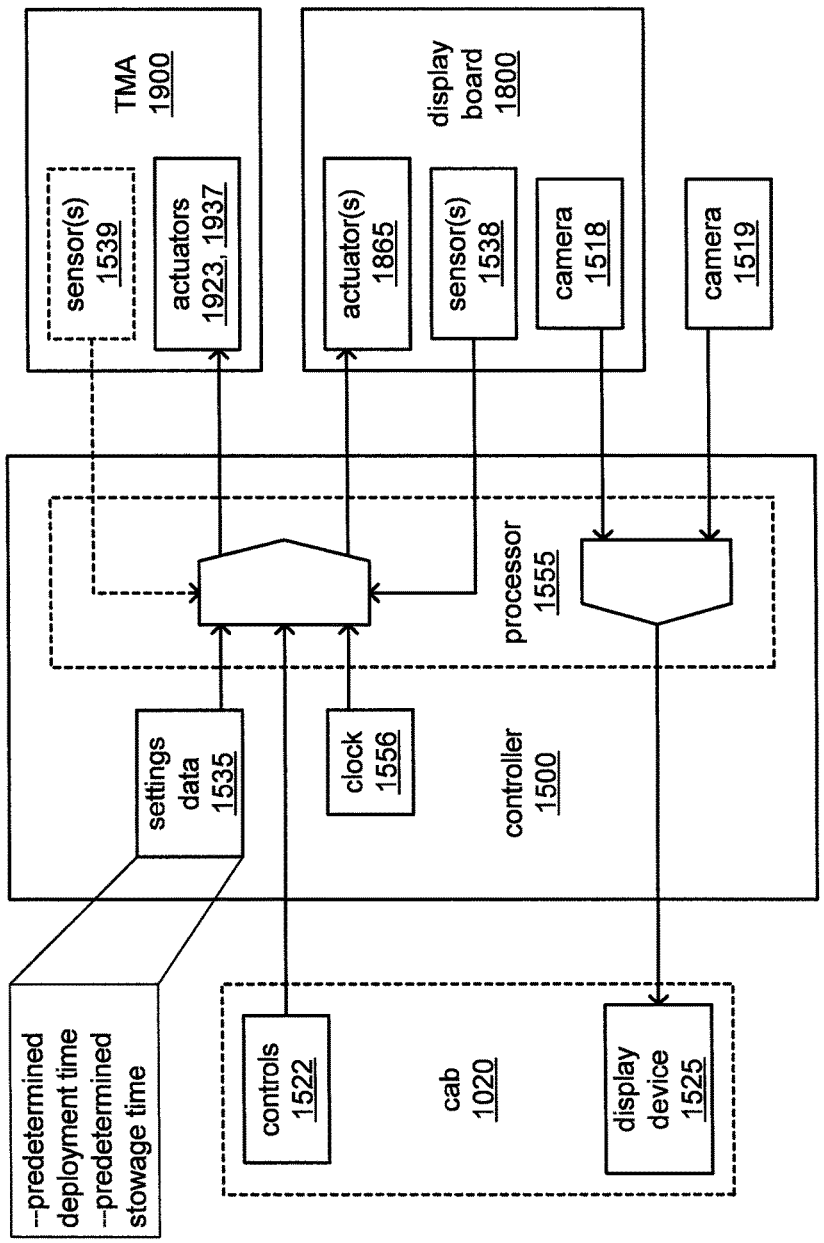
FIG. 12G is a block diagram depicting aspects of using the controller of FIG. 12D to deploy and/or stow a combination of a display board and a TMA.

Referring more specifically to FIG. 12G, the processor 1555 may be caused by its execution of the instructions of the control routine 1545 to perform the coordinated deployment and/or stowage of the display board 1800 and the TMA 1900 earlier described in reference to FIGS. 10A through 10H. Thus, it may be the processor 1555 that receives the indication to proceed with stowage and/or deployment from manual operation by personnel of the controls 1522 (or from the remote control device 1593), and it may be the processor 1555 that causes the sequenced provision of power to actuators that was earlier described. In so performing such operations, the processor 1555 may retrieve indications of the one or more predetermined periods of time that may be used to control deployment and/or stowage of the TMA 1900 from the settings data 1535, and may use the clock 1556 to determine whether each such predetermined period of time has elapsed.

As previously discussed in reference to FIG. 1G, a line of multiple safety trucks 1000 equipped with TMAs 1900 may be operated together in a cooperative manner to provide more effective protection for a roadway work site against entry of a vehicle therein, where such a line of safety trucks 1000 is better able to address the considerable kinetic energy of a colliding vehicle that may be traveling at highway speeds. As also previously discussed in reference to FIG. 12D, the controller 1500 incorporate into each of such safety trucks 1000 may be paired and/or otherwise configured to serve as a base station for a set of multiple headsets 1592 that are associated with it. Unfortunately, such pairing and/or other configuration between controllers 1500 and sets of multiple headsets 1592 may result in a headset 1592 that has been paired and/or configured for use with the controller 1500 of one safety truck 1000 not being usable with the controller 1500 of another safety truck 1000. However, where multiple safety trucks 1000 are used together in a line, as discussed in reference to FIG. 1G, it may be deemed desirable to enable wireless communications among personnel associated with different ones of those multiple safety trucks 1000.

Figure 12H:
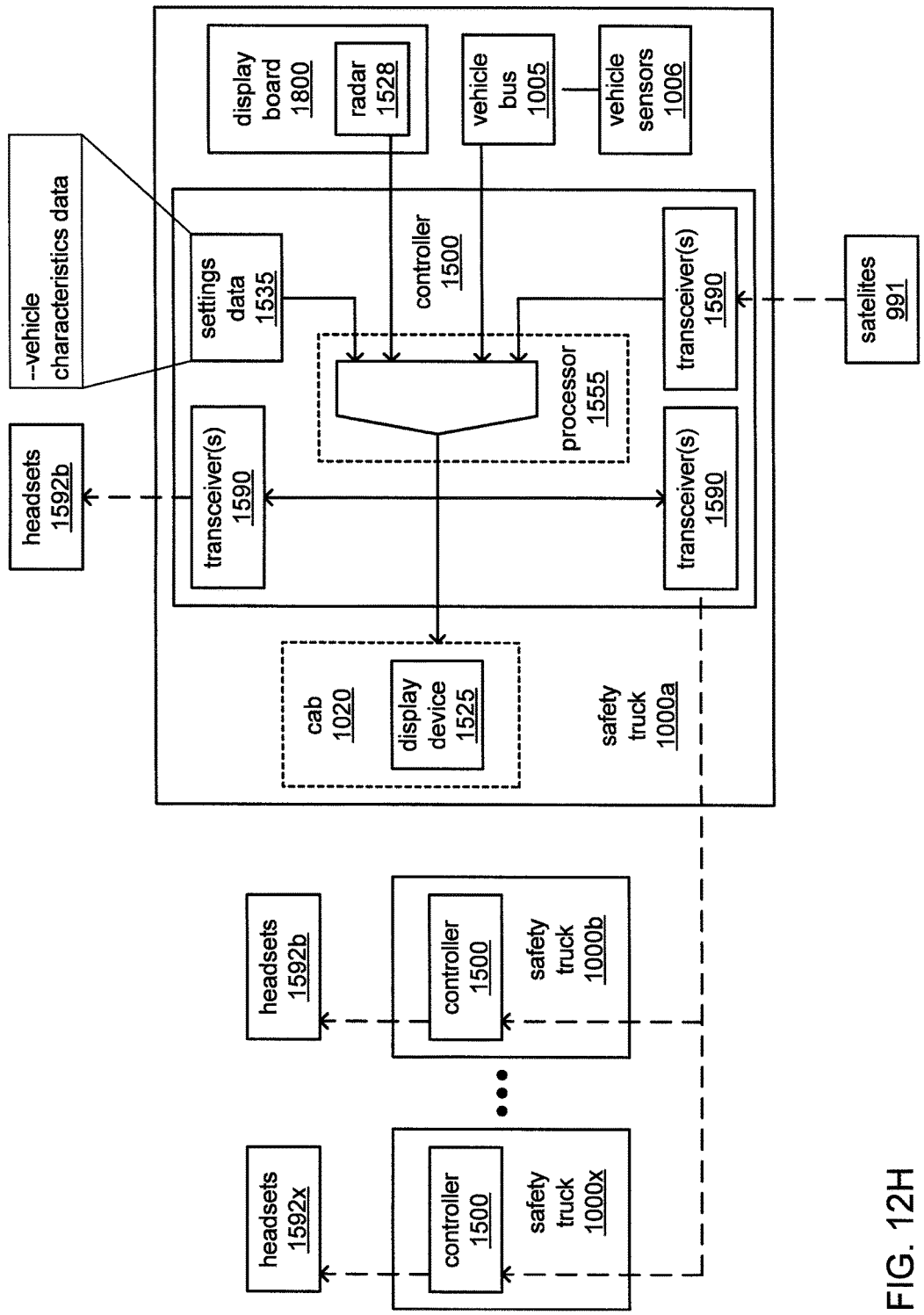
FIG. 12H is a block diagram depicting aspects of using the controller of FIG. 12D, in cooperation with a corresponding controller of each of one or more other safety trucks, extend voice communications and/or the output of warning sounds to personnel associated with multiple safety trucks.

Referring more specifically to FIG. 12H, the controllers 1500 of each of the safety trucks 1000a through 1000x of such a line of multiple safety trucks maybe be capable of being directly paired and/or otherwise configured to relay voice communications received from their respective headsets 1592 therebetween. In this way voice communications received by the controller 1500 of safety truck 1000a from a headset 1592 associated therewith may be relayed to the controllers 1500 of each of the other safety trucks 1000b through 1000x of the line that they have formed to enable personnel wearing the headsets 1592 associated with the controllers 1500 of those other safety trucks 1000b through 1000x to hear those voice communications.

Alternatively or additionally, such pairing or other configuration of the controllers 1500 among the safety trucks 1500a through 1500x of the line formed thereamong may be used to relay an automatically generated warning of impending danger from one of these safety trucks to the others. More specifically, and by way of example, advantage may be taken of the ability to more precisely aim separate one of multiple radar fields of view to dedicate one of the radar fields of view to monitoring a lane of a roadway directly behind the safety truck 1000a that has been positioned (as shown in FIG. 1G) to have its TMA 1900 directly impacted by a vehicle that approaches the line of safety trucks 1000a through 1000x. The processor 1555 of the controller 1500 within the safety truck 1000a may be caused to perform a calculation as each vehicle within that lane approaches the TMA 1900 of the safety truck 1000a to determine whether there is a sufficiently high probability of a collision to be caused by that vehicle that an alarm or other indication should be provided to construction personnel.

In so performing each instance of such a calculation, the processor 1555 may be caused to retrieve a set of vehicle characteristics data that may include indications of various known minimum and/or maximum measures of various characteristics of vehicles, such as maximum rate of deceleration that can be achieved by typical braking systems, minimum amount of time required for a typical vehicle to change between lanes, etc. The processor 1555 may use such information as part of making a determination as to whether a vehicle approaching from directly behind the safety truck 1000a at a particular detected rate of speed will be able to stop or change lanes before colliding with the TMA 1900 carried by the safety truck 1000a.

Where the processor 1555 of the controller 1500 within the safety truck 1000a determines that it is at least relatively unlikely that a collision is able to be avoided, given typical vehicle characteristics, such that a collision caused by an approaching car is relatively likely to occur, the processor 1555 may present a visual warning on the display 1525 and/or on a display of the remote control device 1593, and/or may transmit a warning sound to the headsets 1592 that have been paired and/or otherwise configured to work directly with the controller 1500 of the safety truck 1000a. Additionally, the processor 1555 of the controller 1500 of the safety truck 1000a may additionally use the communications established with the controllers 1500 of the other safety trucks 1000b through 1000x that was established by pairing or other configuration thereamong to relay a warning of the likely collision thereto. In turn, the processors 1555 of the controllers 1500 within each of the other safety trucks 1000b through 1000x may then provide similar displayed and/or audible warnings to the construction personnel associated therewith.

As can be appreciated by those skilled in the art, the provision of a warning of an impending collision, even within a relatively brief time before the collision may aid in preventing injuries by affording personnel opportunities to pull limbs away from locations where injuries may occur, and/or to stop themselves from proceeding to perform an action that might result in injury when the collision occurs, such as unbuckling a safety belt. Alternatively or additionally, construction personnel standing alongside one of the safety trucks 1000a through 1000x who are able to receive an audible warning through a headset 159 may be given the opportunity by such a warning to take at least a step or two away from the safety trucks 1000a through 1000x so as to ensure they are not in the path of any of the ones of the safety trucks 1000a through 1000x that may be caused to roll some distance forward as a result of the collision.

The invention claimed is:

1. A roadway work site safety truck comprising:
   a display board connected to a rear portion of the safety truck, the display board comprising:
      a speed detection radar to detect a speed of a vehicle approaching the safety truck from behind the safety truck;
      at least one display device operable to display at least a textual message readable from behind the safety truck; and
      a display board camera able to capture an image of the approaching vehicle;
   a truck-mounted attenuator (TMA) connected to the rear portion of the safety truck, and movable between a stowed position for travel of the safety truck along the roadway and a deployed position to enhance safety of the roadway work site in which the TMA extends rearward from the safety truck to absorb kinetic energy of the approaching vehicle colliding with the TMA at the rear of the safety truck; and
   a controller comprising:
      a processor;
      a recording storage comprising at least one non-volatile storage device to store imagery captured by the display board camera;
      an accelerometer to detect a characteristic of an acceleration indicative of the approaching vehicle colliding with the TMA at the rear of the safety truck; and
      an operation storage to store instructions that cause the processor to perform operations comprising:
         receive an indication of a speed of the approaching vehicle from the speed detection radar;
         receive video captured by the display board camera of the approaching vehicle;
         overlay a textual indication of the speed of the approaching vehicle onto frames of the captured video of the approaching vehicle;
         store the captured video with the overlain textual indication in the recording storage as recorded video;
         receive an indication of detection of the characteristic of an acceleration indicative of the approaching vehicle colliding with the TMA at the rear of the safety truck;

in response to receipt of the indication, store, in the recording storage, a timestamp indicating a time and date at which the indication is received; and refrain from overwriting a portion of the recorded video that was captured starting at a first predetermined period of time leading up to the time and date of the time stamp and ending at a second predetermined period of time following the time and date of the time stamp.

2. The safety truck of claim 1, comprising a display located within a cab of the safety truck, wherein the processor is caused to perform operations comprising operate the display within the cab to present the captured video with the overlain textual indication.

3. The safety truck of claim 2, wherein the processor is caused to perform operations comprising operate the display within the cab to present the captured video in a split screen with other video captured by at least one other camera carried on a portion of the safety truck.

4. The safety truck of claim 2, wherein the processor is caused to perform operations comprising:

operate the display within the cab to provide a user interface by which personnel may select at least one message to be displayed to motorists in vehicles approaching the safety truck from behind the safety truck; and operate the at least one display device of the display board to display the at least one selected message.

5. The safety truck of claim 1, comprising a speed sensor to sense a current speed of travel of the safety truck, wherein the processor is caused to perform operations comprising:

use the current speed of travel of the safety truck to adjust the indication of the speed of the approaching vehicle; and overlay the textual indication of the speed of the approaching vehicle after the adjustment is performed.

6. The safety truck of claim 1, wherein:

the controller comprises at least one transceiver to receive radio frequency wireless signals; and the processor is caused to perform operations comprising:

operate the at least one transceiver to receive geographic location signals from satellites;

calculate a current speed of travel of the safety truck from the geographic location signals;

use the current speed of travel of the safety truck to adjust the indication of the speed of the approaching vehicle; and overlay the textual indication of the speed of the approaching vehicle after the adjustment is performed.

7. The safety truck of claim 1, wherein the processor is caused to perform operations comprising:

receive captured audio from one or more microphones in the vicinity of the safety truck;

store the captured audio in the recording storage as recorded audio; and refrain from overwriting a portion of the recorded audio that was captured starting at the first predetermined period of time leading up to the time and date of the time stamp and ending at the second predetermined period of time following the time and date of the time stamp.

8. The safety truck of claim 1, wherein the processor is caused to perform operations comprising:

receive data concerning operation of the safety truck from at least one sensor of the safety truck, wherein the data concerning operation of the safety truck is selected from a group consisting of: a speed of travel of the safety truck, a direction of travel of the safety truck, an operating characteristic of an engine of the safety truck, and a current state of brakes of the safety truck;

store the data concerning operation of the safety truck in the recording storage as recorded audio; and refrain from overwriting a portion of the recorded data that was received starting at the first predetermined period of time leading up to the time and date of the time stamp and ending at the second predetermined period of time following the time and date of the time stamp.

9. The safety truck of claim 1, wherein:

the display board is movable between a stowed position for travel of the safety truck along the roadway and a deployed position to enhance safety at the roadway work site; and the processor is caused to perform operations comprising:

receive a signal conveying a deployment command;

in response to receipt of the deployment command, operate, for a first predetermined period of time, a TMA actuator to move the TMA from the stowed position of the TMA to the deployed position of the TMA;

await the first predetermined period of time; and in response to passage of the first predetermined period of time, cease operation of the TMA actuator and operate a display board actuator to move the display board from the stowed position of the display board to the deployed position of the display board.

10. The safety truck of claim 9, wherein:

the safety truck comprises a display located within a cab of the safety truck;

the TMA carries a TMA camera able to capture an image of the approaching vehicle, at least when the TMA is moved to the stowed position of the TMA; and the processor is caused to perform operations comprising:

select imagery captured by the TMA camera to be displayed on the display located within the cab in lieu of imagery captured by the display board camera in response to the TMA being moved to the stowed position of the TMA; and select imagery captured by the display board camera to be displayed on the display located within the cab in lieu of imagery captured by the TMA camera in response to the display board being moved to the deployed position of the display board.

11. The safety truck of claim 10, wherein the processor is caused to automatically switch imagery presented on the display to the selected one of the imagery captured by the TMA camera and the imagery captured by the display board camera in response to a detection of the safety truck being driven in reverse.

12. The safety truck of claim 9, wherein the processor is caused to perform further operations comprising:

receive a signal conveying a stowage command;

in response to receipt of the stowage command, operate the display board actuator to move the display board from the deployed position of the display board to the stowed position of the display board;

in response to the display board being moved to the stowed position of the display board, operate, for a second predetermined period of time, the TMA actuator to move the TMA from the deployed position of the TMA to the stowed position of the TMA;

await the second predetermined period of time; and in response to passage of the second predetermined period of time, cease operation of the TMA actuator.

13. The safety truck of claim 1, wherein:

the video captured by the display board camera is of the approaching vehicle and of another approaching vehicle; and the processor is caused to perform operations comprising:

operate a display to provide a user interface to enable personnel to aim a first radar field of view to cover a first lane of the roadway to enable detection of the speed of the approaching vehicle, and to aim a second radar field of view to cover a second lane of the roadway to enable detection of a speed of another approaching vehicle;

receive an indication of the speed of the other approaching vehicle;

overlay a textual indication of the speed of the other approaching vehicle onto the frames of the captured video in addition to the textual indication of the speed of the approaching vehicle; and store the captured video with the overlain textual indications of the speeds of both the vehicle and the other vehicle in the recording storage as the recorded video.

14. The safety truck of claim 13, wherein the processor is caused to perform operations comprising:

operate the display to provide a user interface to enable personnel to select a first position on frames of the captured video over which to overlay the textual indication of the speed of the approaching vehicle and to select a second position on frames of the captured video over which to overlay the textual indication of the speed of the other approaching vehicle;

overlay the textual indication of the speed of the approaching vehicle at the first position onto the frames of the captured video; and overlay the textual indication of the speed of the other approaching vehicle at the second position onto the frames of the captured video.

15. The safety truck of claim 13, wherein:

the speed detection radar comprises a first speed detection radar and a second speed detection radar;

aiming the first radar field of view comprises aiming the first speed detection radar; and aiming the second radar field of view comprises aiming the second speed detection radar.

16. The safety truck of claim 13, wherein:

the speed detection radar comprises a single speed detection radar having both the first and second radar fields of view; and aiming at least one of the first and second radar fields of view comprises adjusting a beam guide that defines at least one of the first and second radar fields of view.

17. The safety truck of claim 13, wherein the processor is caused to perform operations comprising:

analyze at least the speed of the approaching vehicle to determine a degree of likelihood that the approaching vehicle will collide with the rear of the safety truck;

compare the determined degree of likelihood to a threshold degree of likelihood; and in response to a determination that the determined degree of likelihood at least meets the threshold degree of likelihood, perform operations comprising:

operate the at least one transceiver to transmit an audible warning indication of an impending vehicular collision to the set of headsets associated with the controller; and operate the at least one transceiver to transmit the audible warning indication to the other controller to enable the other controller to relay the audible warning indication to the other set of headset associated with the other controller.

18. The safety truck of claim 17, wherein the processor is caused to perform operations comprising:

in response to the determination that the determined degree of likelihood at least meets the threshold degree of likelihood, store, in the recording storage, a timestamp indicating a time and date at which the determination is made; and refrain from overwriting a portion of the recorded video that was captured starting at a first predetermined period of time leading up to the time and date of the time stamp and ending at a second predetermined period of time following the time and date of the time stamp.

19. The safety truck of claim 18, comprising a display located within a cab of the safety truck, wherein the processor is caused to perform operations comprising operate the display within the cab to present the captured video with the overlain textual indication.

20. The safety truck of claim 19, wherein the processor is caused to perform operations comprising, in response to the determination that the determined degree of likelihood at least meets the threshold degree of likelihood, operate the display within the cab to present a visual warning of an impending vehicular collision.

21. The safety truck of claim 13, wherein the processor is caused to perform operations comprising:

analyze at least the speed of the approaching vehicle to determine a degree of likelihood that the approaching vehicle will collide with the rear of the safety truck;

compare the determined degree of likelihood to a threshold degree of likelihood; and in response to a determination that the determined degree of likelihood at least meets the threshold degree of likelihood, perform operations comprising operate a horn of the safety truck to provide an additional audible warning indication of an impending vehicular collision.

22. The safety truck of claim 1, wherein:

the controller comprises at least one transceiver to exchange wireless radio frequency (RF) signals with a set of headsets associated with the controller and to exchange wireless RF signals with another controller of another safety truck, wherein the other controller is associated with and exchanges wireless RF signals with the other set of headsets; and the processor is caused to perform operations comprising:

receive a signal conveying a pairing command;

in response to receipt of the pairing command, operate the at least one transceiver to exchange wireless RF signals with the other controller to establish a wireless link with the other controller; and operate the at least one transceiver to cooperate with the other controller to relay speech sounds between a headset of the set of headsets associated with the controller to another headset of the other set of headsets associated with the other controller through the controller and the other controller.

* * * * *